(12) United States Patent
Makinen et al.

(10) Patent No.: US 12,061,350 B2
(45) Date of Patent: Aug. 13, 2024

(54) 3D DISPLAY DIRECTIONAL BACKLIGHT BASED ON DIFFRACTIVE ELEMENTS

(71) Applicant: InterDigital Madison Patent Holdings, SAS, Paris (FR)

(72) Inventors: Jukka-Tapani Makinen, Oulu (FI); Kai Ojala, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 225 days.

(21) Appl. No.: 17/055,875

(22) PCT Filed: May 8, 2019

(86) PCT No.: PCT/US2019/031332
§ 371 (c)(1),
(2) Date: Nov. 16, 2020

(87) PCT Pub. No.: WO2019/221993
PCT Pub. Date: Nov. 21, 2019

(65) Prior Publication Data
US 2021/0223568 A1 Jul. 22, 2021

Related U.S. Application Data

(60) Provisional application No. 62/673,025, filed on May 17, 2018.

(51) Int. Cl.
*H04N 13/00* (2018.01)
*G02B 27/30* (2006.01)
(Continued)

(52) U.S. Cl.
CPC ............. *G02B 30/33* (2020.01); *G02B 27/30* (2013.01); *G02B 27/4272* (2013.01);
(Continued)

(58) Field of Classification Search
CPC .... G02B 30/33; G02B 27/30; G02B 27/4272; G02B 30/31; H04N 13/31; H04N 13/32;
(Continued)

(56) References Cited

U.S. PATENT DOCUMENTS 5,742,262 A * 4/1998 Tabata ................ H04N 5/7491
348/E5.145
6,064,424 A 5/2000 Van Berkel
(Continued)

FOREIGN PATENT DOCUMENTS

CN 106662700 A 5/2017
CN 106896514 6/2017
(Continued)

OTHER PUBLICATIONS

Invitation to Pay Additional Fees, and Where Applicable, Protest Fee for PCT/US2019/031332 mailed Aug. 1, 2019, 14 pages.
(Continued)

*Primary Examiner* — Audrey Y Chang
(74) *Attorney, Agent, or Firm* — Smadar Gefen

(57) ABSTRACT

Some embodiments of an apparatus may include: a plurality of light sources, wherein each of the plurality of light sources is configured to emit a respective light beam; one or more diffractive layers; and an optical mask configured to be synchronized to an illumination of the respective light beams. Some embodiments of a method may include: emitting a light beam from each of a plurality of light emitting sources to generate a plurality of light beams; diffracting each of the plurality of light beams to generate a plurality of diffracted light beams; and synchronizing an optical mask to the plurality of diffracted light beams.

22 Claims, 59 Drawing Sheets

(51) Int. Cl.
  *G02B 27/42* (2006.01)
  *G02B 30/31* (2020.01)
  *G02B 30/33* (2020.01)
  *H04N 13/31* (2018.01)
  *H04N 13/32* (2018.01)
  *H04N 13/349* (2018.01)
  *H04N 13/398* (2018.01)

(52) U.S. Cl.
  CPC ............ *G02B 30/31* (2020.01); *H04N 13/31* (2018.05); *H04N 13/32* (2018.05); *H04N 13/349* (2018.05); *H04N 13/398* (2018.05)

(58) Field of Classification Search
  CPC ... H04N 13/349; H04N 13/398; H04N 13/315
  USPC .......................................... 359/463, 464, 462
  See application file for complete search history.

(56) References Cited

U.S. PATENT DOCUMENTS

| | | | |
|---|---|---|---|
| 6,118,584 | A | 9/2000 | Van Berkel |
| 6,172,807 | B1* | 1/2001 | Akamatsu .............. H04N 13/31 359/464 |
| 6,999,071 | B2 | 2/2006 | Balogh |
| 7,518,149 | B2 | 4/2009 | Maaskant |
| 7,573,491 | B2 | 8/2009 | Hartkop |
| 7,961,182 | B2 | 6/2011 | Tachi |
| 7,994,527 | B2 | 8/2011 | Denbaars |
| 8,328,360 | B2 | 12/2012 | Gao |
| 8,848,006 | B2 | 9/2014 | Wetzstein |
| 9,298,168 | B2 | 3/2016 | Taff |
| 2003/0176214 | A1 | 9/2003 | Burak |
| 2005/0018288 | A1 | 1/2005 | Redert |
| 2008/0037120 | A1* | 2/2008 | Koo ..................... H04N 13/305 348/E13.044 |
| 2008/0175023 | A1 | 7/2008 | Lee et al. |
| 2013/0077154 | A1 | 3/2013 | Popovich |
| 2014/0016051 | A1* | 1/2014 | Kroll ....................... G03H 1/02 359/15 |
| 2015/0346498 | A1 | 12/2015 | Zhong |
| 2016/0116752 | A1 | 4/2016 | Wu |
| 2016/0291337 | A1* | 10/2016 | Ochiai ................... G02B 30/27 |
| 2017/0068092 | A1 | 3/2017 | Leister |
| 2017/0299793 | A1 | 10/2017 | Fattal |
| 2018/0017801 | A1 | 1/2018 | Chang et al. |
| 2018/0252799 | A1* | 9/2018 | Bakin ............... G02B 19/0061 |
| 2021/0173222 | A1* | 6/2021 | Makinen .............. H04N 13/305 |

FOREIGN PATENT DOCUMENTS

| | | |
|---|---|---|
| CN | 107209393 A | 9/2017 |
| CN | 107390380 A | 11/2017 |
| CN | 107561724 A | 1/2018 |
| EP | 0570179 A2 | 11/1993 |
| KR | 20080069010 A | 7/2008 |
| KR | 20130129256 A | 11/2013 |
| KR | 20180009135 A | 1/2018 |
| WO | WO2003053072 A1 | 6/2003 |
| WO | 2010109170 | 9/2010 |
| WO | 2011149641 | 12/2011 |
| WO | 2016018314 A1 | 2/2016 |

OTHER PUBLICATIONS

International Search Report and Written Opinion of the International Searching Authority for PCT/US2019/031332 mailed Sep. 24, 2019, 20 pages.
Maimone, Andrew, et al., "Focus 3D: Compressive Accommodation Display". ACM Transactions on Graphics, vol. 32, No. 5, Article 153, Sep. 2013, pp. 1-13.
Fattal, David, et. al., "A Multi-Directional Backlight for a Wide-Angle, Glasses-Free Three-Dimensional Display". Nature, vol. 495, No. 7441, (2013), pp. 348-351.
Lee, Vincent W., et al. "Micro-LED Technologies and Applications". Information Display, vol. 6, No. 16, (2016), pp. 16-23.
Takaki, Yasuhiro, "High-Density Directional Display for Generating Natural Three-Dimensional Images". Proceedings of the IEEE, vol. 94, No. 3, Mar. 2006 pp. 654-663 (10 pages).
Templier, François, et. al. "A Novel Process for Fabricating High-Resolution and Very Small Pixel-pitch GaN LED Microdisplays". SID Symposium Digest of Technical Papers, vol. 48, No. 1, (2017), pp. 268-271 (4 pages).
Zhang, Jianlei, et. al., "Energy Efficient Integral Imaging Without Flipped Image Using Directional Backlight". Proceedings of Selected Papers of the Chinese Society for Optical Engineering Conferences, Oct. and Nov. 2016, vol. 10255, pp. 1025505-1 to 1025505-7, International Society for Optics and Photonics, (2017)(8 pages).
"Holovizio Natural 3D Displaying," www.holografika.com/Documents/HoloVizio_C80.pdf, available at Internet Archive Aug. 22, 2017, https://web.archive.org/web/20170822004618/http://www.holografika.com/Documents/HoloVizio_C80.pdf (last accessed Aug. 23, 2021)(1 pages).
"HoloVizio C80 3D Cinema System," www.holografika.com:80/Products/NEW-HoloVizio-C80.html, available at Internet Archive Oct. 18, 2017, https://web.archive.org/web/20171018132225/http://www.holografika.com:80/Products/NEW-HoloVizio-C80.html (last accessed Aug. 23, 2021)(2 pages).

* cited by examiner

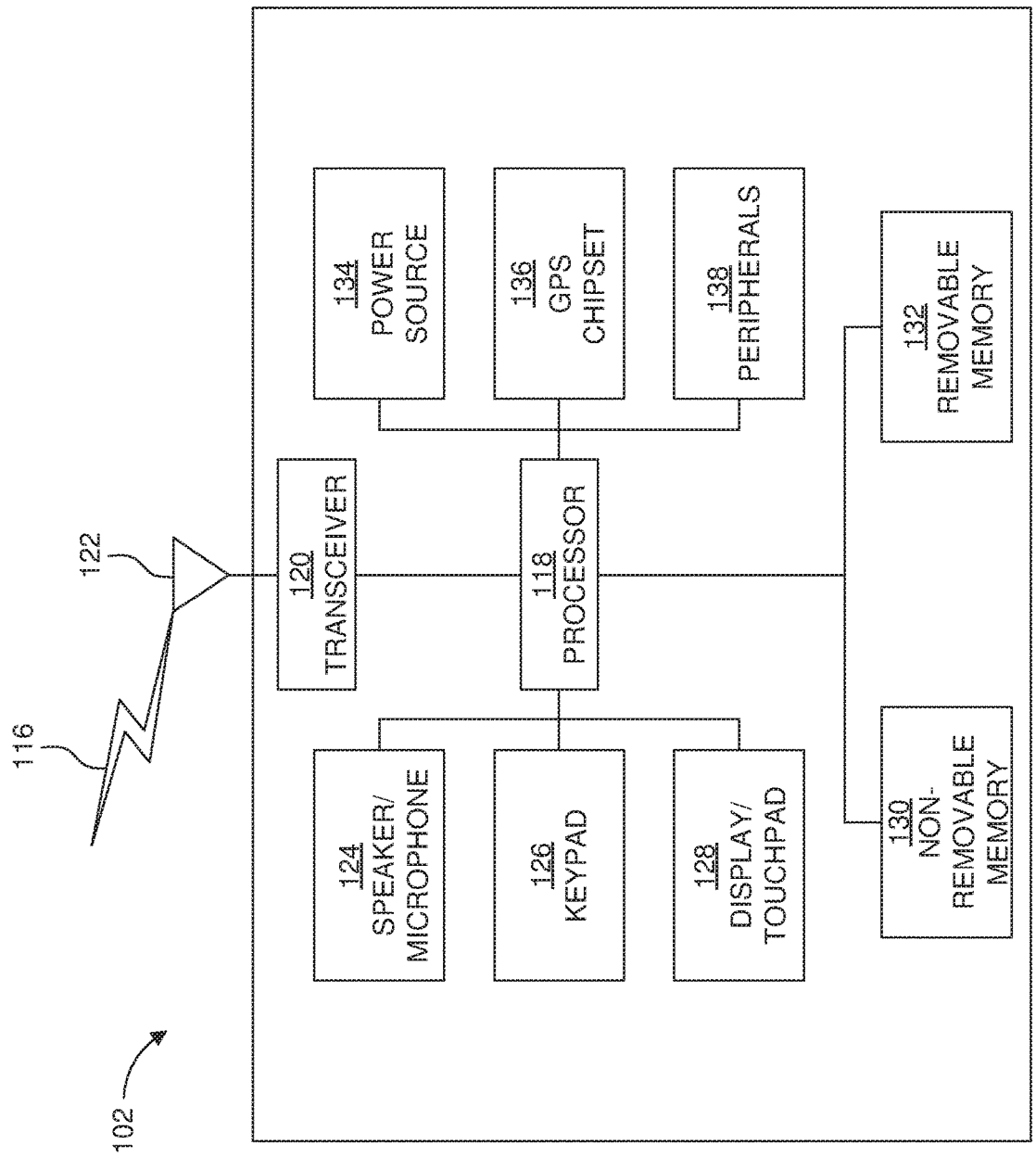

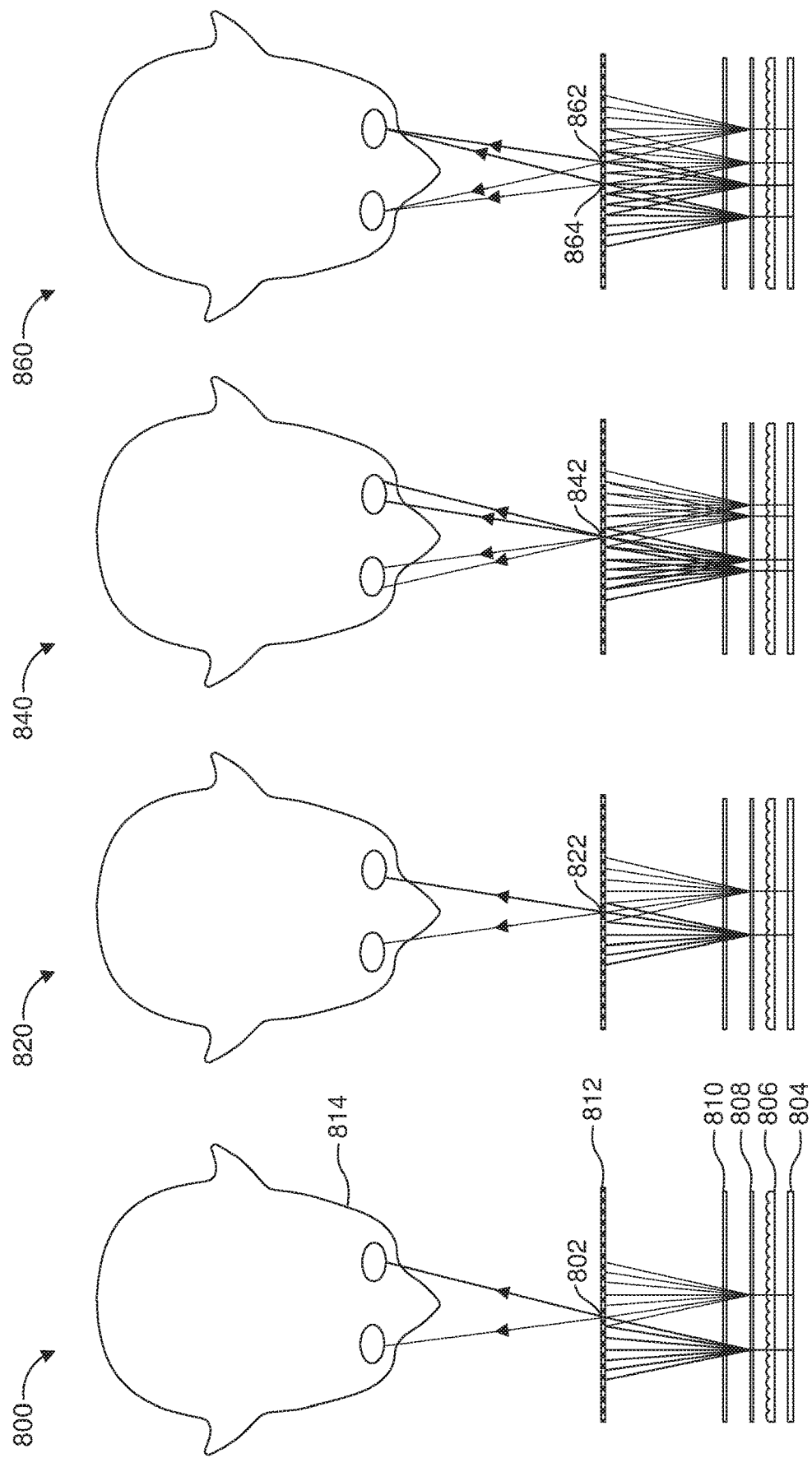

```
┌─────────────────────────────────────┐
│ EMITTING A LIGHT BEAM FROM EACH     │
│ LIGHT-EMITTING ELEMENT OF AN        │
│ ADDRESSABLE ARRAY OF LIGHT-EMITTING │
│ ELEMENTS TO GENERATE A PLURALITY OF │
│ LIGHT BEAMS                         │
│ 1702                                │
└─────────────────────────────────────┘
                  │
                  ▼
┌─────────────────────────────────────┐
│ COLLIMATING EACH OF THE PLURALITY OF│
│ LIGHT BEAMS TO GENERATE A PLURALITY │
│ OF COLLIMATED LIGHT BEAMS           │
│ 1704                                │
└─────────────────────────────────────┘
                  │
                  ▼
┌─────────────────────────────────────┐
│ DIFFRACTING EACH OF THE PLURALITY OF│
│ COLLIMATED LIGHT BEAMS TO GENERATE  │
│ A PLURALITY OF DIFFRACTED LIGHT BEAMS│
│ 1706                                │
└─────────────────────────────────────┘
                  │
                  ▼
┌─────────────────────────────────────┐
│ SYNCHRONIZING AN OPTICAL MASK TO THE│
│ ADDRESSABLE ARRAY OF LIGHT-EMITTING │
│ ELEMENTS BASED ON CONTENT EMBODIED  │
│ IN THE PLURALITY OF DIFFRACTED LIGHT│
│ BEAMS                               │
│ 1708                                │
└─────────────────────────────────────┘
```

3D DISPLAY DIRECTIONAL BACKLIGHT BASED ON DIFFRACTIVE ELEMENTS

CROSS-REFERENCE TO RELATED APPLICATIONS

The present application is a national stage application under 35 U.S.C. § 371 of International Application No. PCT/US2019/031332, entitled "3D DISPLAY DIRECTIONAL BACKLIGHT BASED ON DIFFRACTIVE ELEMENTS," filed on May 8, 2019, which claims benefit under 35 U.S.C. § 119(e) from U.S. Provisional Patent Application Ser. No. 62/673,025, entitled "3D Display Directional Backlight Based on Diffractive Elements," filed May 17, 2018, all of which are hereby incorporated by reference in their entirety.

BACKGROUND

Many devices for presenting three-dimensional (3D) images may be divided into two groups based on hardware. The first technical division based on hardware may be made between devices utilizing glasses or goggles and devices used without glasses or goggles. In both of these device types, there are technologies used that allow multiple users and technologies that work only for a single user. With head mounted displays (HMDs), the level of isolation ranges from complete blockage of the natural view, which is the property of many virtual reality (VR) systems, to the mildly obstructing visors or lightguides placed in front of the eyes that enable augmented reality (AR) and mixed reality (MR) user experiences. Many companies developing MR systems are aiming for a user experience with virtual objects that are nearly visually indistinguishable from real objects. Head mounted devices put the viewer behind a "looking glass" or a "window" that may make the experience feel artificial.

SUMMARY

An example apparatus in accordance with some embodiments may include: an addressable array of light-emitting elements; an array of collimating optical elements; one or more diffractive grating layers; and an array of optical mask elements synchronized to illumination of the addressable array of light-emitting elements based on content displayed.

For some embodiments of an example apparatus, the addressable array of light-emitting elements may include a plurality of sets of light-emitting elements, and each collimating optical element of the array of collimating optical elements may be associated with a particular set of light-emitting elements of the plurality of sets of light-emitting elements.

For some embodiments of an example apparatus, one or more of the light-emitting elements of the addressable array of light-emitting elements may be selected from the group consisting of a μLED and an OLED.

For some embodiments of an example apparatus, the array of optical mask elements may be a spatial light modulator (SLM).

For some embodiments of an example apparatus, the array of optical mask elements may be a liquid crystal display (LCD).

Some embodiments of an example apparatus may further include a color filter.

Some embodiments of an example apparatus may further include an optical element, wherein the optical element may be configured to adjust emission direction angles of one or more of the optical mask elements.

For some embodiments of an example apparatus, the optical element may be configured to adjust the emission direction angles of the one or more of the optical mask elements to align with a viewing window of a viewer.

For some embodiments of an example apparatus, the addressable array of light-emitting elements may include a first plurality of sets of light-emitting elements and a second plurality of sets of light-emitting elements, the first plurality of sets of light-emitting elements may be located less than a threshold distance away from a center of a display and may be arranged with an equal separation between each set of the first plurality of sets of light-emitting elements, and the second plurality of sets of light-emitting elements may be located more than the threshold distance away from the center of the display and may be arranged with an unequal separation between each set of the second plurality of sets of light-emitting elements based on how far each of the second plurality of sets of light-emitting elements is located from the center of the display.

For some embodiments of an example apparatus, the one or more diffractive grating layers may be passive, continuously-diffractive structures.

An example method in accordance with some embodiments may include: emitting a light beam from each light-emitting element of an addressable array of light-emitting elements to generate a plurality of light beams; collimating each of the plurality of light beams to generate a plurality of collimated light beams; diffracting each of the plurality of collimated light beams to generate a plurality of diffracted light beams; and synchronizing an optical mask to the addressable array of light-emitting elements based on content embodied in the plurality of diffracted light beams.

For some embodiments of an example method, synchronizing the optical mask to the addressable array of light-emitting elements may include selectively passing and blocking the diffracted light beams based on the content.

For some embodiments of an example method, selectively passing and blocking the diffracted light beams based on the content may include: multiplexing spatially control of the optical mask to selectively pass and block the diffracted light beams based on the content; and multiplexing temporally control of the optical mask to selectively pass and block the diffracted light beams based on the content.

For some embodiments of an example method, synchronizing the optical mask to the addressable array of light-emitting elements may include rendering a three-dimensional (3D) image.

For some embodiments of an example method, synchronizing the optical mask to the addressable array of light-emitting elements may include: determining a location of a multidirectional display pixel (MDP) within the optical mask based on a selected light beam selected from the plurality of diffracted light beams and the content embodied in the plurality of diffracted light beams; and rendering the optical mask, wherein the selected light beam selected from the plurality of diffracted light beams may pass through the optical mask, and wherein rendering the optical mask may synchronize the optical mask with the content embodied in the plurality of diffracted light beams.

Another example apparatus in accordance with some embodiments may include: a backlight, which may include: a layer of light sources, a collimating lens layer over the layer of light sources, and one or more diffraction grating layers over the collimating lens layer; and a spatial light modulator (SLM) panel configured to process light emitted by the backlight.

For some embodiments of another example apparatus, the layer of light sources may include one or more µLEDs.

For some embodiments of another example apparatus, the layer of light sources may include one or more OLEDs.

For some embodiments of another example apparatus, the SLM panel may be an LCD panel.

For some embodiments of another example apparatus, the SLM panel and the layer of light sources m ay be configured to be operated in synchronization.

Some embodiments of another example apparatus may further include a color filter.

For some embodiments of another example apparatus, the color filter may include quantum dot materials.

Some embodiments of another example apparatus may further include: a camera configured to track eye positions of a viewer; and one or more infra-red (IR) light emitting diodes (LEDs) enabled to illuminate a facial area of the viewer.

For some embodiments of another example apparatus, the camera may be a stereoscopic camera pair.

Another example method in accordance with some embodiments may include: emitting a light beam from each light-emitting element of an addressable array of light-emitting elements to generate a plurality of light beams; collimating each of the plurality of light beams to generate a plurality of collimated light beams; diffracting each of the plurality of collimated light beams to generate a plurality of diffracted light beams; and synchronizing an optical mask to the addressable array of light-emitting elements based on content embodied in the plurality of diffracted light beams.

For some embodiments of another example method, emitting the light beam from each light-emitting element may include illuminating sequentially a sequence of three-dimensional (3D) scene angular projection images.

Some embodiments of another example method may further include diffracting each of the plurality of diffracted light beams to generate a second plurality of diffracted light beams.

For some embodiments of another example method, diffracting each of the plurality of collimated light beams may generate the plurality of diffracted light beams with an off axis angular distribution.

For some embodiments of another example method, synchronizing the optical mask to the addressable array of light-emitting elements may include selectively passing and blocking the diffracted light beams based on the content.

For some embodiments of another example method, synchronizing the optical mask to the addressable array of light-emitting elements may include rendering a three-dimensional (3D) image.

For some embodiments of another example method, synchronizing the optical mask to the addressable array of light-emitting elements may enable more than one diffracted light beam, of the plurality of diffracted light beams, per pixel of the optical mask to pass through the optical mask.

Some embodiments of another example method may further include filtering the plurality of diffracted light beams with one or more color filters.

Some embodiments of another example method may further include adjusting emission direction angles of the optical mask.

For some embodiments of another example method, adjusting the emission direction angles of the optical mask may adjust the emission direction angles of the optical mask to align with a viewing window of a viewer.

Some embodiments of another example method may further include: tracking eye positions of a viewer, wherein synchronizing the optical mask to the addressable array of light-emitting elements may include: selecting a portion of the addressable array of light-emitting elements based on the eye positions of the viewer; and synchronizing the optical mask to the selected portion of the addressable array of light-emitting elements.

Some embodiments of another example method may further include illuminating a facial area of the viewer.

Some embodiments of another example method may further include adjusting a brightness of the plurality of light beams by pulse width modulating the light beam emitted from each light-emitting element of the addressable array of light-emitting elements.

For some embodiments of another example method, synchronizing the optical mask to the addressable array of light-emitting elements may include: determining a location of a multidirectional display pixel (MDP) within the optical mask based on a selected light beam selected from the plurality of diffracted light beams and the content embodied in the plurality of diffracted light beams; and rendering the optical mask, wherein the selected light beam selected from the plurality of diffracted light beams passes through the optical mask, and wherein rendering the optical mask synchronizes the optical mask with the content embodied in the plurality of diffracted light beams.

A further example apparatus in accordance with some embodiments may include: a plurality of light sources, wherein each of the plurality of light sources is configured to emit a respective light beam; one or more diffractive layers; and an optical mask configured to be synchronized to an illumination of the respective light beams.

For some embodiments of a further example apparatus, the optical mask may be a spatial light modulator (SLM).

A further example method in accordance with some embodiments may include: emitting a light beam from each of a plurality of light emitting sources to generate a plurality of light beams; diffracting each of the plurality of light beams to generate a plurality of diffracted light beams; and synchronizing an optical mask to the plurality of diffracted light beams.

For some embodiments of a further example method, synchronizing the optical mask to the plurality of light beams may include: determining a location of a multidirectional display pixel (MDP) within the optical mask based on a selected light beam selected from the plurality of diffracted light beams and content embodied in the plurality of diffracted light beams; and rendering the optical mask, wherein the selected light beam selected from the plurality of diffracted light beams may pass through the optical mask, and wherein rendering the optical mask may synchronize the optical mask with the content embodied in the plurality of diffracted light beams.

Another further example method in accordance with some embodiments may include generating a multiview display comprising generating a directional backlight using a diffraction grating.

Another further example apparatus in accordance with some embodiments may include a multiview display using a plurality of diffraction gratings configured to generate a directional backlight.

An additional example method in accordance with some embodiments may include generating a directional backlight using a sparse array of light-emitting elements.

An additional example apparatus in accordance with some embodiments may include a directional backlight comprising a sparse array of light-emitting elements.

A further additional example method in accordance with some embodiments may include generating an asymmetrical angular distribution of light by generating a directional backlight using a blazed diffraction grating.

A further additional example apparatus in accordance with some embodiments may include: a directional backlight light source; and a blazed diffraction grating configured to generate an asymmetrical angular distribution of light.

BRIEF DESCRIPTION OF THE DRAWINGS

FIG. 1B is a system diagram of an example system illustrating an example wireless transmit/receive unit (WTRU) that may be used within the communications system illustrated in FIG. 1A according to some embodiments.

FIGS. 8A-8D are schematic plan views illustrating an example synchronization of light sources and multidirectional display pixels (MDPs) of an SLM according to some embodiments.

FIG. 17 is a flowchart for an example process for synchronizing a spatial light modulator (SLM) with an illumination of light sources based on the content displayed according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

EXAMPLE NETWORKS FOR IMPLEMENTATION OF THE EMBODIMENTS

A wireless transmit/receive unit (WTRU) may be used, e.g., as a multiview display in some embodiments described herein.

Figure 1A:
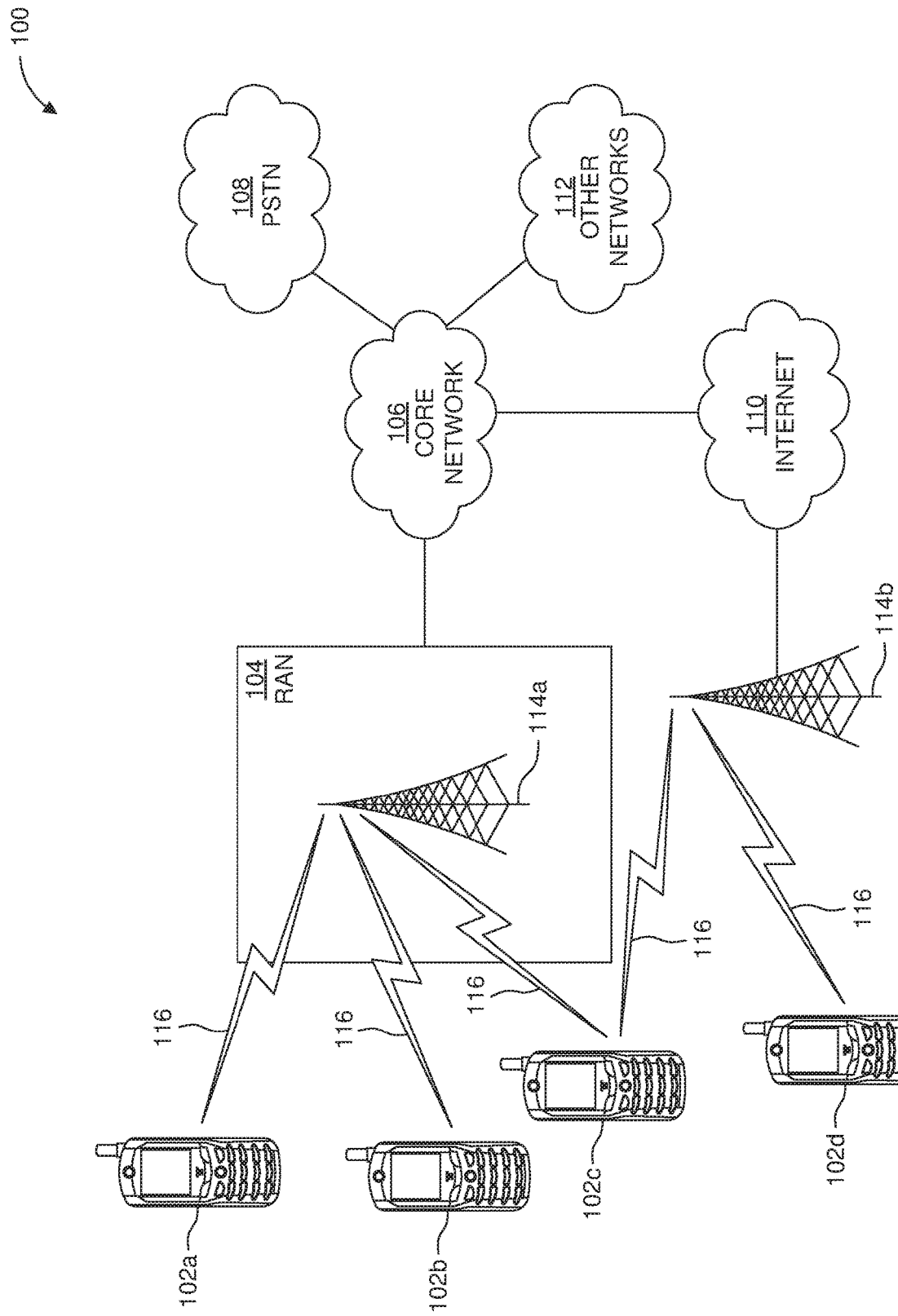
FIG. 1A is a system diagram of an example system illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Only goggleless displays offer a truly shared user experience without obstructing structures that, at least to some degree, isolate the viewer from the surrounding real world. For goggleless 3D display devices, all visual information that a person may use enters the human visual perception system through the eye pupils. By being very close to the eyes, HMDs cover a large Field-Of-View (FOV) with compact optical constructions. HMDs may be more efficient in producing the amount of light, as the "viewing window" is small in a relatively fixed position. The goggleless displays may be physically large to cover a significant portion of the viewer's FOV. In addition, as the user position is generally not fixed to the display device, the projected images may be spread over a large angular range in order to make the picture visible from multiple positions, which may waste most of the emitted light. This situation may be challenging with mobile devices that have a very limited battery life and may be used in environments where the display image contrast is enhanced with high display brightness if the ambient light levels are high.

HMDs may use less 3D image data than goggleless devices. A single user may use one stereoscopic viewpoint to the 3D scene with the display system attached to the head, which moves together with the eyes. In contrast, a user without goggles is free to change position around the 3D display and the system may provide several different "views" of the same 3D scenery. This aspect may multiply the amount of 3D image information that is processed. To reduce data handling with goggleless displays, eye tracking systems may be used to determine the position and line of sight of the user(s). For some embodiments, 3D sub-images may be directed straight towards the pupils and not spread out to the whole surrounding space. By determining the exact position of the eyes, the "viewing window" size may be reduced. In addition to lowering the amount of data, the eye tracking also may be used to reduce power consumption as the light may be emitted towards the eyes only. This technique may limit the number of viewers due to the limited performance of the sub-system.

One technique for presenting three-dimensional (3D) images is stereoscopy. In this method, two two-dimensional (2D) images are displayed separately to the left and right eyes. In US Patent Application 2016/0116752, a parallax barrier method is described to generate two views for a goggleless display. U.S. Pat. Nos. 6,064,424 and 6,118,584 describe using lenticular sheets to generate two views for a goggleless display. Each of these systems may limit the visibility of a pair of light emitting pixels such that pixels are seen only by a designated eye. Perception of depth is created when matrices of these pixel pairs are used to create images taken from slightly different viewing angles and the 3D image is combined in the brain. However, presentation of two 2D images may not be perceptually the same thing as displaying an image in full 3D. The biggest difference may be the fact that head and eye movements do not give more information about the objects being displayed—the 2D images are able to present only the same two slightly different viewpoints. These types of systems are commonly called 3D displays, although stereoscopic displays may be the more accurate term. Many stereoscopic displays are not full 3D displays, but all full 3D displays are also stereoscopic, because full 3D displays are able to present the image pairs to the two eyes of the viewer. The use of only two views may cause the 3D image to be "flipped" if the viewer moves to a wrong position in front of the display or the 3D illusion does not spring up at all if the images are not visible to the correct eyes properly and the brain is not able to process the information. In worst case, the viewer may even feel nauseated and a prolonged use of a low-quality display may lead to headaches and dizziness.

Multiview systems are displays that have taken one step forward from the common stereoscopic displays. In these devices, the light is emitted from a pixelated layer and a microlens or lenticular sheet collimates the emitted light into a set of beams that exit the lens aperture at different propagation directions. The beam directions create the stereoscopic 3D effect when several unique views of the same 3D image are projected to the different directions by modulating the pixels according to the image content. If only two pixels are used for one 3D scene, the result is a stereoscopic image for a single user standing in the middle of the FOV. If more than two pixels are used under one microlens that defines the boundaries of a multiview display cell, the result is a set of unique views spread across the FOV and multiple users may see the stereoscopic images at different positions inside the predefined viewing zone. Each viewer may have his/her own stereoscopic viewpoint to the same 3D content and perception of a three-dimensional image may be generated to enable a shared visual experience. As the viewers move around the display, the image may be changed for each new viewing angle, making the 3D illusion much more robust and convincing for individual viewers and improving the perceived display quality considerably.

Figure 2A:
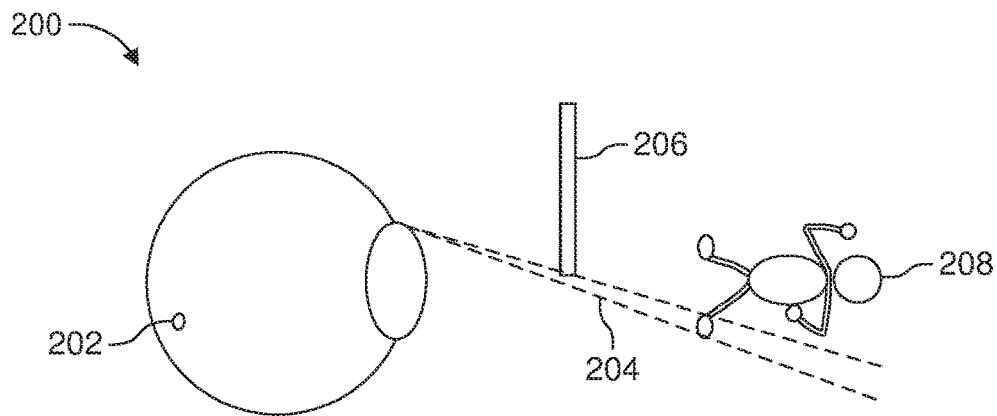
FIGS. 2A-2C are schematic side views illustrating an example scene observed from three views according to some embodiments.
Figure 2B:
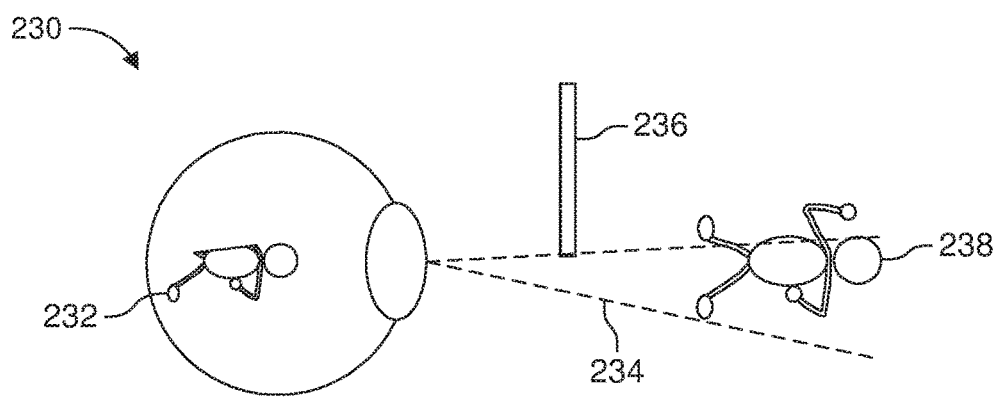
Figure 2C:
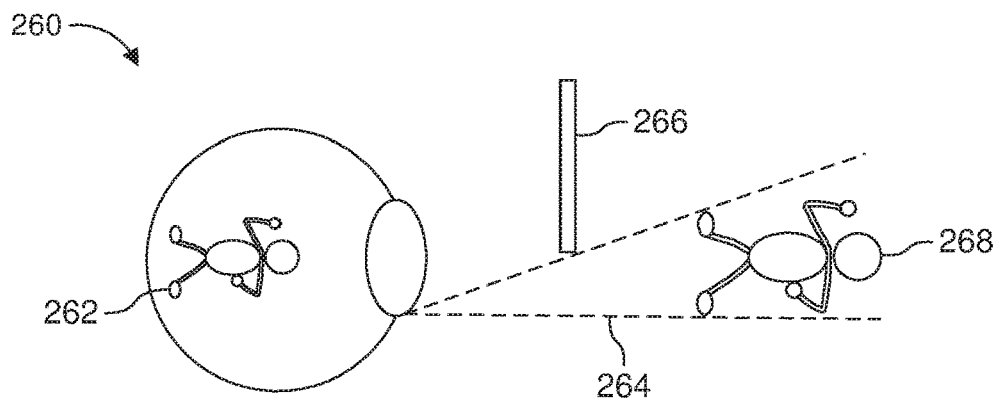

FIGS. 2A-2C are schematic side views illustrating an example scene observed from three views according to some embodiments. FIGS. 2A-2C show occlusion effects for three scenarios 200, 230, 260 with three different views (left 204, central 234, and right 264 fields, respectively) inside an eye pupil. With relatively low-density multiview displays, the views 204, 234, 264 change in a stepwise fashion as the viewer moves in front of the device 206, 236, 266. The portion 202, 232, 262 of a person 208, 238, 268 seen by the user's eye changes as the view moves from the left field view 204 to the center field view 234 to the right view 264. This feature lowers the quality of 3D experience and may even cause a breakup of the 3D perception. In order to mitigate these challenges, some Super Multi View (SMV) techniques have been tested with as many as 512 views. The basic idea is to generate an extremely large number of views that make the transition between two viewpoints very smooth. According to Yasuhiro Takaki, *High-Density Directional Display for Generating Natural Three-Dimensional Images,* 94 (3) PROCEEDINGS OF THE IEEE (2006), if the light from at least two images from slightly different viewpoints enters an eye pupil nearly simultaneously, the viewer has a more realistic visual experience. In this case, motion parallax effects resemble the natural conditions better (see FIGS. 2A-2C) as the brain unconsciously predicts the image change due to motion. The SMV condition may be met by simply reducing the spatial interval between two views at the correct viewing distance to a smaller value than the size of the eye pupil. The two images may be projected into the pupil of a single eye at slightly different points in time, but still inside the timeframe of human persistence-of-vision, in which case the images are perceived as continuous.

At nominal illumination conditions, the human pupil is generally estimated to be ~4 mm in diameter. If the ambient light levels are high (e.g., from sunlight), the diameter may be as small as 1.5 mm and in dark conditions as large as 8 mm. According to A. Maimone, et al., *Focus 3D: Compressive Accommodation Display,* 32(5) ACM TRANSACTIONS ON GRAPHICS (2013), the maximum angular density that may be achieved with SMV displays may be limited by diffraction and there may be an inverse relationship between spatial resolution (pixel size) and angular resolution. Diffraction increases the angular spread of a light beam passing through an aperture and this effect needs to be taken into account in the design of very high-density SMV displays. This may become an issue in use cases where very small display pixels are needed (e.g., mobile displays) and where the display is placed far away from the viewer. In practice, the high angular view density needed is very difficult to achieve with spatial multiplexing only and the only viable method is to use additional temporal multiplexing. In other words, if the high number of views are not generated simultaneously with adequate projected image quality, the SMV condition may still be met by designing a component or system that is capable of producing the views sequentially, but so fast that the human visual system perceives the views as simultaneous.

Some multiview systems use temporal multiplexing only for creation of a large number of images. For example, U.S. Pat. Nos. 7,573,491 and 7,961,182 describe systems that are based on the use of moving parallax barriers. In these cases, the barrier structures positioned in front of the light emitting pixels limit the visibility of the pixels to very narrow apertures and as the barriers move with very fast pace, the images are projected to different viewpoints sequentially. In these cases, the light emitting elements are modulated much faster than the barriers move. U.S. Patent Application 2003/0176214 describes using a combination of spatial and temporal multiplexing. In this case, the spatial multiplexing is made with a very fast projector system that generates 2D images, which are then reflected from a moving screen to different directions. Rotational movement of the screen creates the different viewpoints at slightly different times and more than two images may be projected to one eye if the image projector is fast enough. Systems such as these produce fast optical component movements with actuators that may be bulky or energy consuming. All the components generally may be reliable enough for extended time of use, which is difficult to achieve with any mechanical movement. Optical systems tend to have very strict tolerances for positioning, and any wear in the movement mechanism may easily translate to lowered image quality. These issues may occur with mobile device displays that, e.g., may need to be flat, robust, and have low power consumption.

One example of a multiview display device seemingly based only on spatial multiplexing only is the HoloVizio C80 system understood to be disclosed in U.S. Pat. No. 6,999,071. The system is sometimes called a Light Field (LF) display, but as the system features only one image focal plane, the system may be thought of as a multiview display. HoloVizio system is based on the use of multiple image projectors that create a dense multiview image by projecting several different views to a screen from slightly different angles. U.S. Pat. No. 8,328,360 describes a screen that combines images and scatters the light towards viewers that are able to see the 3D content from different viewpoints. Systems such as the ones described may be highly complex and expensive since such systems may use so much optical hardware that may need to be fitted together into a system. Certain of these projection techniques may also not be suitable, e.g., to mobile display use as the components and devices seemingly use large amounts of space. Holografika's U.S. Pat. No. 6,999,071 describes a system based on dense light emitting diode (LED) arrays and lenticular sheet. This structure may have a flat form factor display, but such systems may still be limited by the fixed number of light emitters that are used for the creation of the multiple views. Similar devices may also become easily very expensive to manufacture due to the extremely large number of components seemingly needed in the light emitting layer.

One potential method to create a multiview 3D display suitable for a mobile device is by using a directional backlight structure behind an ordinary liquid crystal display (LCD). In this technique, two or more light sources (at least one for each eye's view) are be used together with a lightguide. The lightguide has out-coupling structures that project the display back-illumination to two or more different directions according to which light source is used. By alternating the display image content in unison with the light sources, a stereoscopic view pair or set of views of the 3D scene may be created, which is described in PCT Application WO2011149641. Another company utilizing directional backlight is LEIA, which is developing goggleless, small form-factor 3D displays especially for mobile devices and automotive. LEIA's technology appears to be based on structured backlighting and ordinary LCDs. See, e.g., journal article David Fattal, Zhen Peng, Tho Tran, Sonny Vo, Marco Fiorentino, Jim Brug and Raymond G. Beausoleil, *A multi-directional backlight for a wide-angle, glasses-free three-dimensional display*, 495 NATURE 348-351 (2013) and U.S. Pat. No. 9,298,168. In LEIA's system, light emitted from LEDs is collimated and coupled into a lightguide that has diffractive dots for light extraction. The special grating patterns are deposited or molded on the surface of a glass or plastic lightguide. The diffractive patterns scatter the light out of the lightguide to different directions determined by the pattern orientation. The patterns may be designed to generate multiple views and even different focal planes for light field effects. A prototype has been created with as many as 64 different views and 90° FOV.

One of the main potential challenges with many of the described backlight systems is the fact that there may be a very limited number of sources and out-coupling structures that may be used in a thin structure used for a mobile device and only a few unique views may be realized in practice. This is connected to the fact that when using side-emitting LEDs, even illumination may be difficult to achieve to the whole display area with a relatively large and flat lightguide. Good uniformity may be achieved, but usually with the cost of illumination efficiency and directionality. The normal light diffuser and recycling structures may face implementation challenges when being used in the directed backlight systems, as the structures may deteriorate the needed illumination directionality. Furthermore, it may be the case that the diffractive structures usually used in the lightguides for light out-coupling cannot be designed and manufactured with good efficiency for all colors in a full-color display. The diffractive structures also produce large amounts of stray light that lowers the display contrast especially when the illumination needs to be contained inside a specific angular region. Although backlight systems may be fitted to a thin form-factor, such systems are quite inefficient from the point-of-view of power consumption and/or are able to generate only multiview images at very coarse angular intervals.

One further challenge associated with some backlight systems is connected to the use of relatively slow LCD displays. The backlight module produces a set of directional illumination patterns that go through a single LCD, which is used as a light valve that modulates the images going to different directions. LEDs commonly used as light sources may be modulated much faster than the few hundred cycles per second that the LCDs are capable of. But as all of the directional illumination patterns go through the same display pixels, the display refresh rate generally becomes the limiting factor to how many flicker-free views may be created. The human eye limit for seeing light intensity modulation is generally set to a value of 60 Hz. As an example, if the LCD display may be modulated with the frequency of 240 Hz, only 4 unique views may be generated with the display without inducing eye straining flicker to the image. In general, the same refresh frequency limitation applies to all 3D display systems that are based on the use of LCDs. One additional example of such a system is the tensor display that uses at least two LCD layers for the creation of a 3D image, which is described in U.S. Pat. No. 8,848,006.

Goggleless systems, which are intended for a single user, may generate the 3D image with a minimum of two different views—one for each eye. If the system is intended for multiple users, the system may need to provide multiple different viewing directions and at least two images to each direction for the stereoscopic effect. In addition, if the system aims for realistic presentation, each viewing direction may also have image content specifically created for that particular point-of-view from the same 3D scene. This potential constraint for multiple directions and multiple image content may place hard system demands not only to the graphical processing and data transfer speeds, but also to the optical hardware that may be used to handle the multiplexing task with a single display and by taking into account the "refresh rate" of the human visual system.

Functioning of many flat-panel-type goggleless multiview displays is generally based on spatial multiplexing only. A row or matrix of light emitting pixels is placed behind a lenticular lens sheet or microlens array and each pixel is projected to a unique view direction in front of the display structure. A row of light emitters is used together with a special lightguide for the creation of directional backlight. The more light emitting pixels there are on the light emitting layer, the more views may be generated. This leads to a direct trade-off situation between number of unique views generated and spatial resolution. If smaller pixel size is desired from the 3D display, the sizes of individual subpixels need to be reduced or a smaller number of viewing directions may be generated. A high-quality 3D display may have both high spatial and angular resolutions in order to provide the user a natural view with smooth transitions between different viewpoints and many flat form-factor displays are very much limited in this respect.

One main challenge to be addressed in many goggleless 3D displays aimed for consumer use is how to create all the necessary light emission angles and multiple views that may be needed for the complex light output with a system that is not overly complicated and large. A complex optical system more likely may use high cost components and accurate alignment between the components, which may make the systems easily too expensive and difficult to handle for average consumers. A large form-factor system may use a lot of space, which is usually not easily available at home settings making, e.g., the volumetric 3D display types often much less desirable for consumers than the flat panel 3D display types. New light emitting optoelectronic components like µLEDs present high potential for increasing the number of separately controlled emitters and with it, for increasing the number of separate views. However, as the number of components increases, the complexity and manufacturing costs of the device may become higher. A good consumer targeted 3D display may have both good quality and low cost comparable to, e.g., the standard 2D TV displays in use today.

One emerging display technology is based on the use of so-called µLEDs, which is described in, e.g., Vincent W. Lee, Nancy Twu, and Ioannis Kymissis, *Micro-LED Technologies and Applications*, INFORMATION DISPLAY 6/16 (2016). These are LED chips that are manufactured with the same basic techniques and from the same materials as the standard LED chips in use today. However, the µLEDs are miniaturized versions of the commonly available components that may be made as small as 1 µm-10 µm in size. One main challenge in this technology is how to handle the very small components in display manufacturing, but different techniques for addressing this are being developed fast as the area is under heavy research. The densest matrix that has been manufactured so far had 2 µm×2 µm chips assembled with 3 µm pitch, as described in François Templier, Lamine Benaïssa, Bernard Aventurier, Christine Di Nardo, Matthew Charles, Anis Daami, Franck Henry, Ludovic Dupré, *A Novel Process for Fabricating High-Resolution and Very Small Pixel-pitch GaN LED Microdisplays*, SID 2017 DIGEST 268-271 (2017). The µLEDs have been used so far as backlight components in TVs, but µLEDs are also expected to challenge OLEDs in the µ-display markets in the near future. When compared to OLEDs, the µLEDs are much more stable components and µLEDs may reach very high light intensities, which often makes µLEDs ideal for many applications from head mounted display systems to adaptive car headlamps (LED matrix) and TV backlights. The µLEDs may also be seen as high-potential technology for 3D displays, which often use very dense matrices of individually addressable light emitters that may be switched on and off very fast.

One bare µLED chip is emitting a specific color with spectral width of ~20-30 nm. A white source may be created by coating the chip with a layer of phosphor, which converts the light emitted by blue or UV LEDs into a wider white light emission spectrum. A full-color source may also be created by placing separate red, green and blue LED chips side-by-side as the combination of these three primary colors creates the sensation of a full color pixel when the separate color emissions are combined by the human visual system. A very dense matrix may allow the manufacturing of self-emitting full-color pixels that have a total width below 10 µm (3×3 µm pitch).

Light extraction efficiency from the semiconductor chip is one of the key parameters that determine electricity-to-light efficiency of LED structures. There are several techniques that aim to enhance the extraction efficiency and thus make it possible to build LED-based light sources that use the available electric energy as efficiently as possible, which is especially important with mobile devices that have a limited power supply. One technique presented in U.S. Pat. No. 7,994,527 is based on the use of a shaped plastic optical element that is integrated directly on top of a LED chip. Due to lower refractive index difference, integration of the plastic shape extracts more light from the chip material in comparison to a case where the chip is surrounded by air. The plastic shape also directs the light in a way that enhances light extraction from the plastic piece and makes the emission pattern more directional. Another technique is presented in U.S. Pat. No. 7,518,149, which describes enhancing light extraction from a µLED chip. This is done by shaping the chip itself to a form that favors light emission angles that are more perpendicular towards the front facet of the semiconductor chip and makes it easier for the light to escape the high refractive index material. These structures also direct the light emitted from the chip. In the latter case, the extraction efficiency was calculated to be twice as good when compared to regular µLEDs and considerably more light was emitted to an emission cone of 30° in comparison to the standard chip Lambertian distribution where light is distributed evenly to the surrounding hemisphere.

Some embodiments disclosed herein include an optical method and construction of an autostereoscopic multiview 3D display. For some embodiments, an apparatus may be based on the use of small light collimating lenses and very small light emitting elements that form a directional backlight module together with beam multiplying diffractive elements. For some embodiments, an apparatus may be used with a mask, such as a Spatial Light Modulator (SLM), to form a good quality 3D multiview display. For some embodiments, very small light sources (e.g. µLEDs) are bonded to a substrate as a sparse array and placed behind an array of microlenses that collect the emitted light and collimate the emitted light into highly directional beams. For some embodiments, if one beam of light generated by a single source hits one or more diffractive elements, the beam splits into several child beams that have the same divergence as the original beam. These child beams propagate to different directions. For some embodiments, the diffractive elements enable the number of directional beams emitted from a single source to be multiplied without increasing the number of components in the system. For some embodiments, an SLM positioned in front of the backlight structure may be used as an adaptive mask that selectively passes or blocks the beams generated in a backlight projector cell group. For some embodiments, an SLM component, e.g., may be a standard LCD panel with or without color filters. For some embodiments, a full multiview 3D display may be created by covering the whole display surface area with the described structure. For some embodiments, rendering of a 3D image may be achieved by showing the different 3D scene angular projection images sequentially by activating the appropriate light emitters and SLM masks according to the image content. For some embodiments, the only active elements in the stack are the light emitting layer and SLM.

For some embodiments, the diffractive layers are passive foils. For some embodiments, no polarization controlling elements are used. For some embodiments, direct back illumination of the SLM is used and not a lightguide. For some embodiments, the diffractive structures are continuous gratings and not locally-patterned gratings. For some embodiments, the diffractive layers are passive foils without controls. For some embodiments, two layers that may be used for pixel-level image modulation: the μLED matrix and the SLM (which may be an LCD). This example structure in accordance with some embodiments enables use of passive diffractive layers. For some embodiments, a balanced combination of temporal and spatial multiplexing may be used with two pixel-level modulation layers. For some embodiments, diffraction gratings and beam collimating optics are used for the generation of multiple view directions, in which the beams are multiplied by diffraction. For some embodiments, horizontal and vertical views are generated.

For some embodiments, an autostereoscopic 3D display may be created by using layers of passive diffraction gratings together with a combination of pixelated light emitters and SLM. Some embodiments use direct back illumination methods. Some embodiments perform beam multiplication with diffraction gratings. For some embodiments, only passive continuous diffractive structures are used.

For some embodiments, small light collimating lenses and very small light emitting elements that form a directional backlight module are used together with beam multiplying diffractive elements. These elements may be used, e.g., with a Spatial Light Modulator (SLM) to form a good quality 3D multiview display. Very small light sources (e.g. μLEDs) may be bonded to a substrate as a sparse array and placed behind an array of microlenses that collect the emitted light and collimate the emitted light into highly directional beams. When one beam of light generated by a single source hits one or more diffractive elements, the beam of light is split into several child beams that have the same divergence as the original beam. These child beams propagate to different directions. The diffractive elements enable the number of directional beams emitted from a single source to be multiplied without increasing the number of components in the system.

In some embodiments, an SLM positioned in front of the backlight structure is used as an adaptive mask that selectively passes or blocks the beams generated in a backlight projector cell group. This component may be e.g., a standard LCD panel with or without color filters. In accordance with some embodiments, a full multiview 3D display may be created by covering the whole display surface area with the described structure. Rendering of a 3D image may be achieved in accordance with some embodiments by showing the different 3D scene angular projection images sequentially by activating the appropriate light emitters and SLM masks according to the image content. As the diffraction gratings are continuous micro-optical elements, diffraction gratings may be used without alignment in the direction of the display pixel matrix, making the module easier to manufacture than many 3D display integral imaging solutions.

Systems and methods disclosed herein in accordance with some embodiments may, e.g., lack moving parts. Some embodiments offer a high number of view directions, thereby improving 3D picture quality. In some embodiments, the number of active light emitting optoelectronic components may be reduced using spatial multiplexing instead of multiplying the number of sources. One potential issue with μLED-based displays relates to component handling and bonding as well as the design of driver electronics. Some embodiments of systems and methods disclosed herein use μLEDs for the light emitter matrix that is used by multiview displays. As the number and density of physical sources on the back-panel is reduced, the manufacturing costs may be reduced.

For some embodiments, a backlight structure may be used for showing both 3D and 2D images with the same hardware. If a white backlight is used, the image mode may be changed by control electronics without physical movements. For some embodiments, 4K LCD screens may be used as the SLM, in which a 2D image may have a 4K resolution, and a 3D image may be made with a Full HD pixel matrix. Some embodiments of a method enable building a display structure that generates views in both horizontal and vertical directions. This feature may be used by 2D mobile displays that may be rotated freely and adapted to a user application. Unique views in both directions may enable more realistic images and a higher quality 3D viewing experience.

Figure 3:
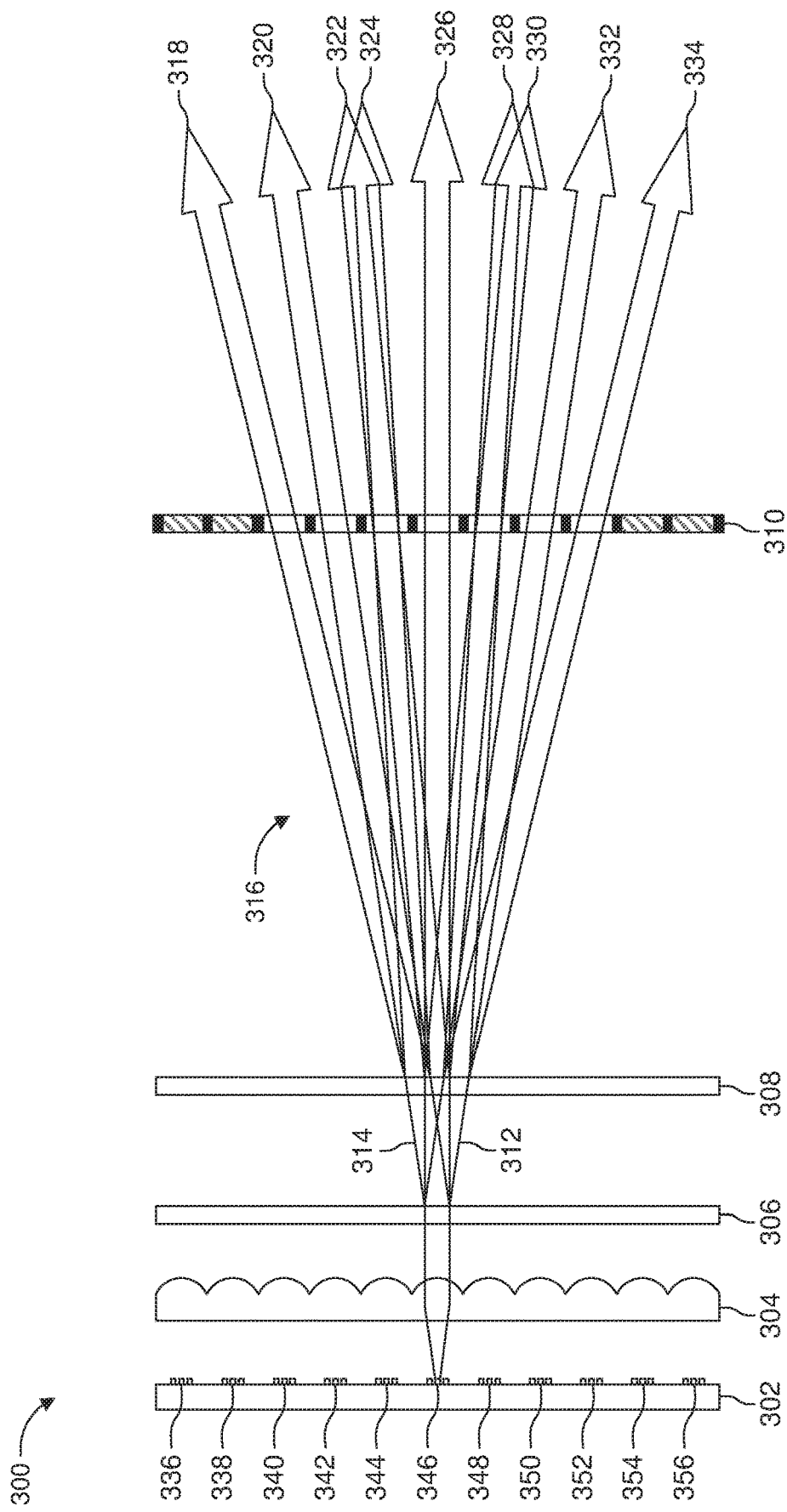
FIG. 3 is a schematic plan view illustrating an example light beam propagating through a collimator, two diffractors, and a spatial light modulator (SLM) according to some embodiments.

FIG. 3 is a schematic plan view illustrating an example light beam propagating through a collimator, two diffractors, and a spatial light modulator (SLM) according to some embodiments. Some embodiments of an apparatus may use very small light emitting elements, collimating microlenses, and diffractive structures that may form a high-quality directional backlight module. For some embodiments, such an apparatus 300 may be used with an SLM (e.g., an LCD panel) 310 to form a 3D multiview display. FIG. 3 shows the schematics of an example backlight structure of multiple directional light beams created with a combination of light-emitting device (e.g., μLED) rows 302, a microlens array 304, and two successive diffraction gratings 306, 308 according to some embodiments.

In the example structure 300, the light-emitting devices (e.g., μLEDs 336, 338, 340, 342, 344, 346, 348, 350, 352, 354, 356) may be bonded to a substrate as a sparse array, for example, an array having elements, e.g., less closely or tightly spaced. For some embodiments, a structure with a diffractive layer may have a sparse array of light-emitting elements in which there is more space between light emitting components or component groups than a structure without a diffractive layer. For example, an array of light-emitting elements may be bonded to a substrate with a sparse spacing between elements such that the spacing is greater than the spacing of a backlighting optics structure that lacks a continuous, passive diffractive layer. For example, without a diffractive layer, a backlighting optics structure may have three light emitters located in proximity for an associated single collimating lens, but with a diffractive layer, a backlighting optics structure may have one light emitter located in proximity for an associated single collimating lens because the emitted light beam is split into, e.g., three child beams that propagate in different directions. Light emitted from a single μLED may hit one microlens in the microlens array sheet 304, which may be manufactured, e.g., by hot embossing from polymer material or by UV-curing to a flexible polymer substrate sheet in a roll-to-roll process. A microlens (e.g., collimator optics 304) may collimate the light into a beam, which then hits a transmissive diffraction grating foil (e.g., first diffraction grating 306) that splits the beam into several child beams. These child beams propagate to different directions depending on the diffraction orders. If the first-generation child beams (e.g., with an order of −1 (312) and an order of +1 (314)) hit the second diffraction grating 308, the first generation child beams 312, 314 are split again to a larger group of second generation child beams 316.

The gratings (e.g., 306, 308) may multiply the number of directional beams emitted from a single source without increasing the number of light-emitting source components or by increasing the separate beam divergence. The grating structures may be manufactured e.g., on polymer foils by hot embossing, UV curing or by holographic techniques. A Spatial Light Modulator (SLM) positioned in front of the backlight structure may be used for selectively passing and blocking directional beams. For example, this component may be a standard LCD panel with or without color filters. For some embodiments, if the light emitting elements produce the three main colors separately, no color filters is used, and the LCD may be used only for light intensity modulation. If the light emitting elements produce white light (e.g., phosphor coated blue µLEDs), color filters may be used for additional color image generation.

For some embodiments, the first diffraction grating 306 may generate first generation child rays with, for example, an order of +1 (312), an order of 0, and an order of −1 (314). The second diffraction grating 308 may generate second generation child rays 316 with, for example, a first grating order of −1 and a second grating order of −1 (318); with a first grating order of −1 and a second grating order of 0 (320); with a first grating order of −1 and a second grating order of +1 (322); with a first grating order of 0 and a second grating order of −1 (324); with a first grating order of 0 and a second grating order of 0 (326); with a first grating order of 0 and a second grating order of +1 (328); with a first grating order of +1 and a second grating order of −1 (330); with a first grating order of +1 and a second grating order of 0 (332); and with a first grating order of +1 and a second grating order of +1 (334). A single diffraction grating may be used to produce multiple diffraction orders that have multiple intensity maxima of light propagating in different directions after the grating. The grating may split a single light beam into several child beams that are, e.g., +1st, 0th, and −1st order diffracted beams.

For some embodiments, an example backlighting and SLM structure 300 may include: an addressable array of light-emitting elements 302; an array of collimating optical elements 304; one or more diffractive grating sheets (e.g., layers) 306, 308; and an array of optical mask elements 310 synchronized to illumination of the addressable array of light-emitting elements 302 based on content (e.g., a 3D image) displayed. For some embodiments, the active addressable array of light-emitting elements 302 and the active SLM 310 are synchronized to enable a viewer's eye to view specific light beams with the correct color and light intensity for an image pixel or voxel at a specific spatial location and angular direction. For example, if a light emitter emits a beam that is split into three child beams with orders of +1, 0, and −1 and the 3D image has a pixel that should be visible to the left eye in the +1st order direction, the SLM opens a first pixel to enable the +1st order light beam to pass. If, at the same time, the diffracted negative 1st order would hit the right eye at a particular pixel that should not be visible, the SLM closes a second pixel so that the negative 1st order light beam is blocked. The SLM may be used to generate an adaptive mask that selectively blocks or passes beams created with the light emitters and diffractive layer. Some embodiments may use temporal multiplexing of the array of light-emitting elements and the SLM to generate such an adaptive mask. For some embodiments, the addressable array of light-emitting elements 302 may include a plurality of sets of light-emitting elements (such as, e.g., groups of 3 LEDs as shown in FIG. 3), and each collimating optical element of the array of collimating optical elements 304 may be associated with a particular set of light-emitting elements of the plurality of sets of light-emitting elements. For some embodiments, an example backlighting and SLM structure 300 may include: a backlight structure comprising: a layer of light sources 302, a collimating lens layer 304 over the layer of light sources, and one or more diffraction grating layers 306, 308 over the collimating lens layer; and a spatial light modulator (SLM) panel 310 over the backlight.

For some embodiments, an optical mask (such as an SLM) 310 may be synchronized to the addressable array of light-emitting elements 302, which may enable more than one diffracted light beam per pixel of the optical mask to pass through the optical mask, such as the example second generation child rays 322, 324 (or 328, 330) that pass through the same pixel of the SLM 310. For some embodiments, an example structure 300 may include: a plurality of light sources 302 that are each configured to emit a light beam; one or more diffractive layers 306, 308; and an optical mask (e.g., an SLM) 310 configured to be synchronized to an illumination of the light beams.

Figure 4:
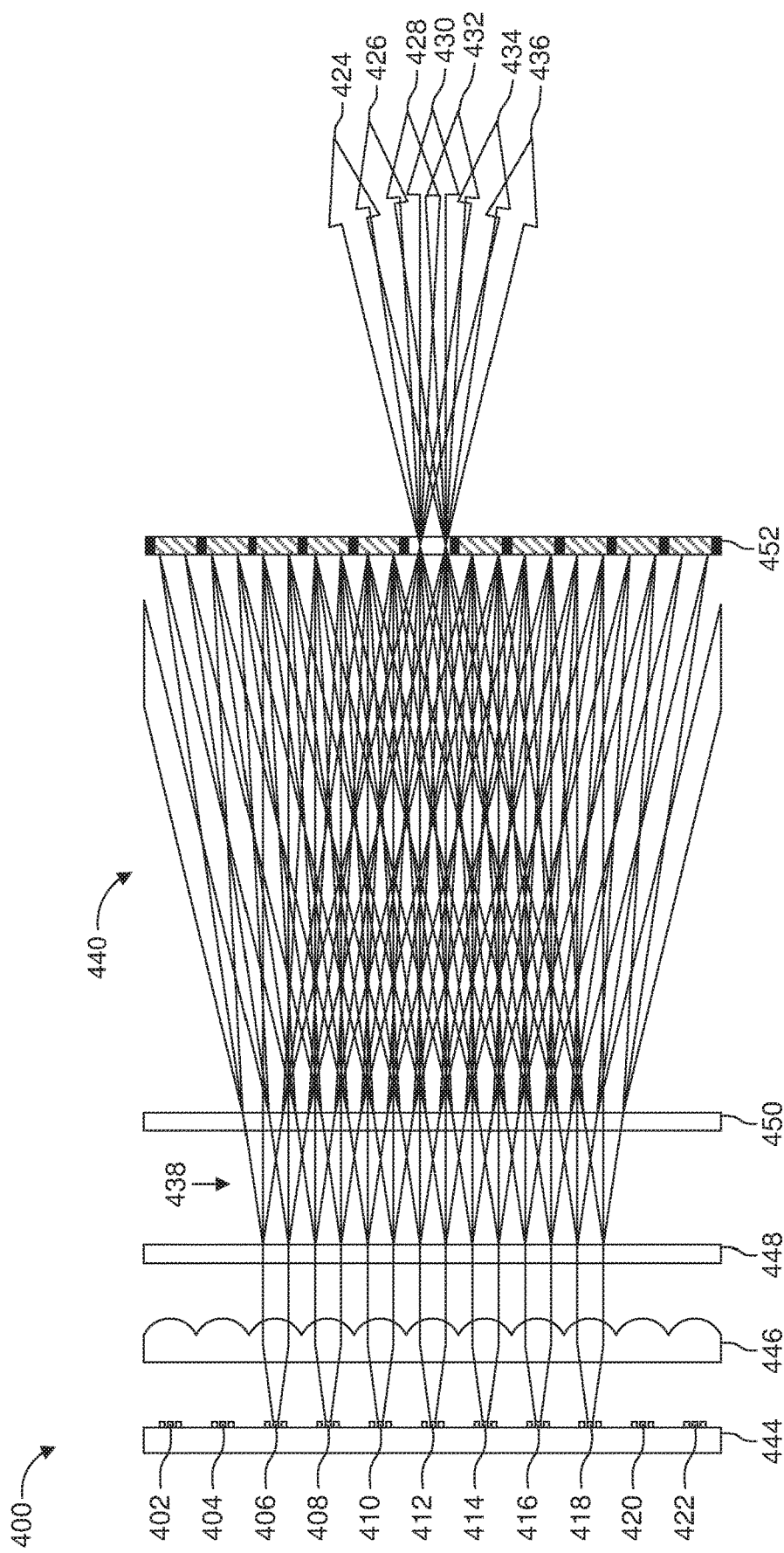
FIG. 4 is a schematic plan view illustrating an example set of light beams with a portion of the light beams propagating through an SLM according to some embodiments.

FIG. 4 is a schematic plan view illustrating an example set of light beams with a portion of the light beams propagating through an SLM according to some embodiments. For some embodiments, light emitting components, microlenses, and diffractive elements may form a backlight module that is capable of producing a large number of directional light beams, which travel in different directions. Diffraction gratings with continuous micro-optical elements may be used without alignment in the direction of the display pixel matrix. Multiple beams generated in neighboring backlight projector cells (as determined based on the microlens aperture) may overlap between the light source layer 444 and an SLM layer 452 as shown in FIG. 4. One Multidirectional Display Pixel (MDP) may be formed by an SLM positioned on top of a backlight structure and used as an adaptive mask that selectively passes or blocks beams generated in a projector cell group, for example a set of LEDs 402, 404, 406, 408, 410, 412, 414, 416, 418, 420, 422 as shown in FIG. 4. FIG. 4 shows an example set of beams 424, 426, 428, 430, 432, 434, 436 that passed through an MDP of an SLM 452. A full multiview 3D display may be created by covering the whole display surface area with the structure described above. For some embodiments, a 3D image may be rendered by showing the different 3D scene angular projection images sequentially by activating the appropriate light emitters and SLM masks according to the image direction. For some embodiments, a backlighting and optical mask structure 400 may include a light emitting layer with light sources 444, a collimator optics layer 446, one or more diffractive grating layers 448, 450, and an array of optical mask elements (e.g., SLM) 452. For some embodiments, a first diffractive grating layer 448 may be used to generate a first generation of diffracted light beams 438, and a second diffraction grating layer 450 may be used to generate a second generation of diffractive light beams 440.

For some embodiments of a backlighting and optical mask structure 400, each optical mask element in the array of optical mask elements may include a configurable optical mask element capable of blocking light in a first state and letting light pass through the optical mask element in a second state. FIG. 4 shows some light beams that are blocked by an optical mask element (or e.g., MDP) in a first (closed) state and some light beams 424, 426, 428, 430, 432, 434, 436 that pass through an optical mask element (e.g., a Multidirectional Display Pixel (MDP) in a second (open) state. For some embodiments, emitting a light beam from a light-emitting element may include illuminating sequentially a sequence of three-dimensional (3D) scene angular projection images. For some embodiments, diffracting a light beam may include diffracting an input light beam to generate a first diffracted light beam and diffracting the first diffracted light beam to generate a second diffracted light beam. For some embodiments, the optical mask may be synchronized with the light emitting layer with light sources based on content embodied in the set of second diffracted light beams. For some embodiments, synchronizing the optical mask (e.g., SLM) with the addressable array of light-emitting elements may include selectively passing and blocking the diffracted light beams based on the content embodied in the emitted light (or, for some embodiments, in the set of second diffracted light beams). For some embodiments, synchronizing the optical mask (e.g., SLM) with the addressable array of light-emitting elements may include rendering a three-dimensional (3D) image. Rendering may include transforming the artificial light manipulation properties of a 3D geometry into a set of parameters that may be used to generate pixel colors and intensities of a 2D display. For example, a graphics card may be used to generate rendering data, which may be sent to a display device. In some embodiments, additional rendering calculations may be performed by a display device. Some embodiments may send 3D geometry and other visual information to a control unit for controlling the light-emitting elements, the SLM, and other active components. This 3D geometry and other visual information may be used to correctly display a 3D image. For some embodiments, a 3D image (which corresponds to 3D image data) may be generated with a combination of spatial and temporal multiplexing of the light-emitting elements and the SLM. For some embodiments, rendering may include transforming the 3D image data into control parameters for controlling the light-emitting elements and the SLM. Such control parameters may be used to perform a combination of spatial and temporal multiplexing and to generate the 3D image.

For some embodiments, generating a multiview display may include generating a directional backlight using a diffraction grating. For some embodiments, an apparatus may be configured to generate a directional backlight using a plurality of diffraction gratings. For some embodiments, generating a directional backlight may use a sparse array of light-emitting elements (such as LEDs 402, 404, 406, 408, 410, 412, 414, 416, 418, 420, 422). For some embodiments, a directional backlight may include a sparse array of light-emitting elements.

Figure 5:
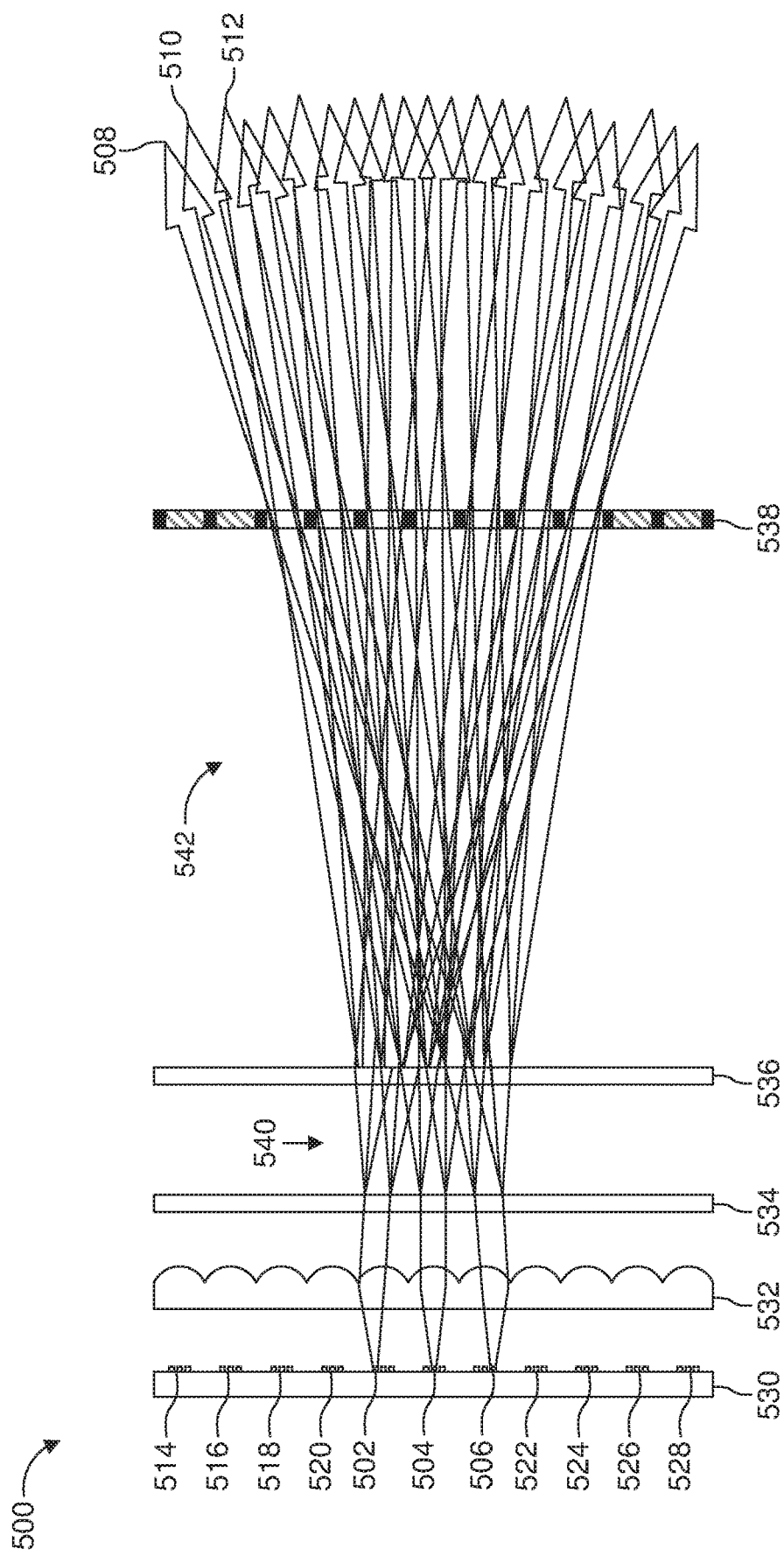
FIG. 5 is a schematic plan view illustrating an example set of green, blue, and red light beams generated from different light emitter positions and propagated through a collimator, two diffractors, and an SLM according to some embodiments.

FIG. 5 is a schematic plan view illustrating an example set of green, blue, and red light beams generated from different light emitter positions and propagated through a collimator, two diffractors, and an SLM according to some embodiments. FIG. 5 shows, for some embodiments, a structure 500 for generation of multiple beam directions 508, 510, 512 with a combination of diffraction gratings and different light emitter positions (such as sets of LEDs with, e.g., a green LED 502, a blue LED 504, and a red LED 506). For some embodiments, the field-of-view (FOV) of a single MDP may be determined by the diffraction grating parameters (such as the spacing between grating lines, diffraction grating angles, incident light wavelength, blazing, optical efficiency, and how light is divided between different diffraction orders) and the positioning of the light emitting components with respect to the beam collimating microlens optical axis. For some embodiments, only one grating, which is capable of generating multiple orders of diffraction, may be used. For some embodiments, two or more (several) gratings may be used to generate a "cascade" of beams, with child beams being split again in successive layers and an increase of the Beam Multiplication Factor (BMF). For example, two successive holographic grating foils may be optimized for, e.g., splitting the incident beam energy evenly to three diffraction orders of −1, 0 and +1 that have a total BMF of 9 (3×3). For some embodiments, each light source may generate 9 beams of light that propagate in different directions. In a standard multiview configuration, generation of 9 beams uses 9 separate light sources. For some embodiments, the standard spatial multiplexing scheme also may be used together with an example method disclosed herein. For example, if a second source is added behind the microlens in the two-layer-structure, a single backlight projector cell may produce 18 (2×9) beams that may be used for creating 18 view directions to the multiview display. For some embodiments, depending on the geometry and optical parameters of the backlight layers, the light emitters of a single MDP may be at the same position (as shown FIG. 4) or at different positions with respect to the optical axis of the respective microlens (as shown in FIG. 5). For some embodiments, a backlighting and optical mask structure 500 may include a light emitting layer with light sources 530 (which may include an array of, e.g., μLEDs 514, 516, 518, 520, 502, 504, 506, 522, 524, 526, 528), a collimator optics layer 532, one or more diffractive grating layers 534, 536, and an array of optical mask elements (e.g., an SLM) 538. For some embodiments, a first diffractive grating layer 534 may be used to generate a first generation of diffracted light beams 540, and a second diffractive grating layer 536 may be used to generate a second generation of diffractive light beams 542.

For some embodiments, an array of optical mask elements may be a spatial light modulator (SLM). For some embodiments, the array of optical mask elements may be a liquid crystal display (LCD). For some embodiments, an SLM panel may be an LCD. For some embodiments, a structure 500 may include a plurality of optical elements configured to shape light beams emitted from an addressable array of light-emitting elements (such as an array of LEDs). For some embodiments, the SLM panel and the layer of light sources may be configured to be operated in synchronization.

Figure 6:
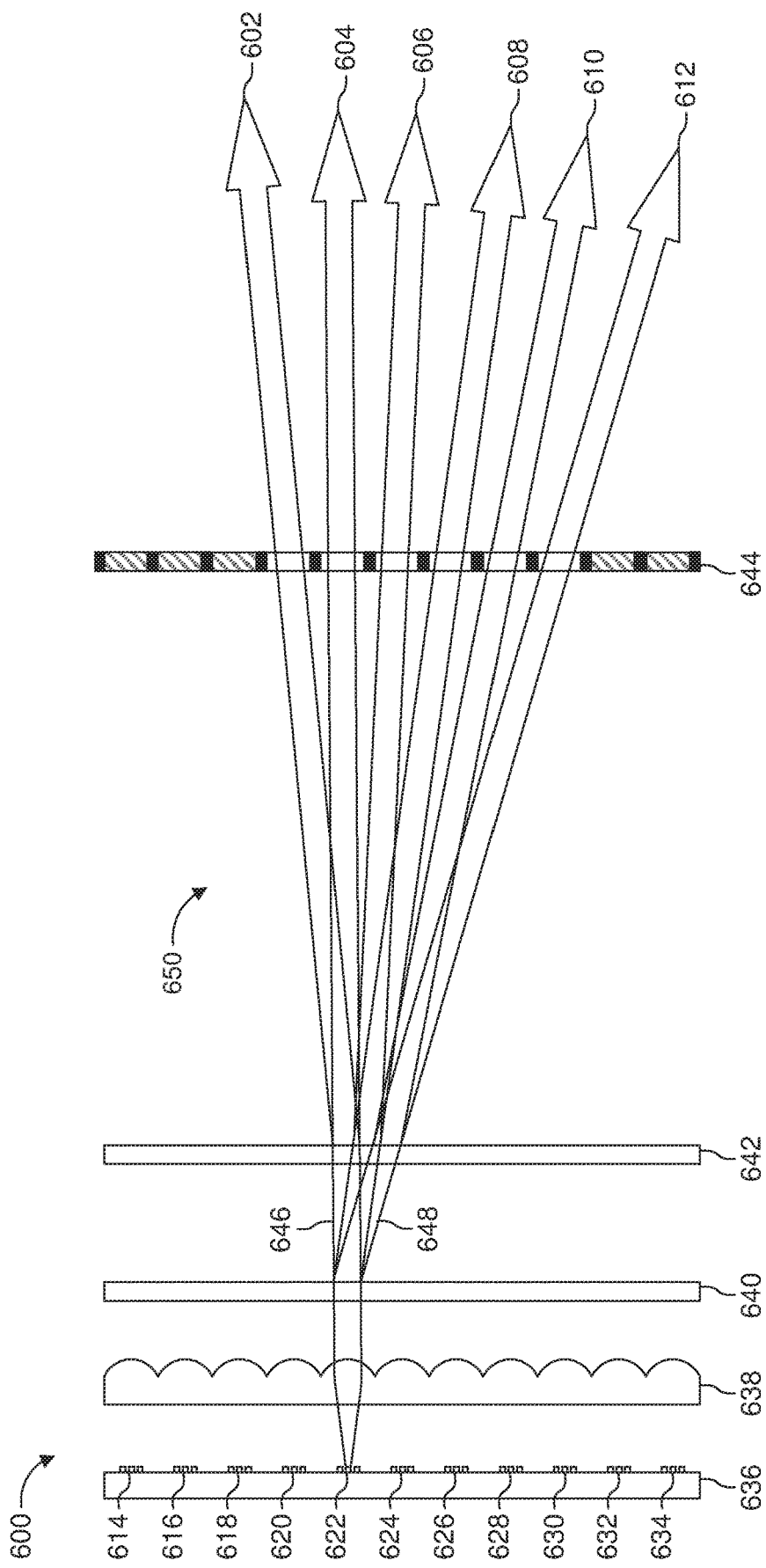
FIG. 6 is a schematic plan view illustrating an example light beam with an off axis angular distribution of diffracted light beams according to some embodiments.

FIG. 6 is a schematic plan view illustrating an example light beam with an off axis angular distribution of diffracted light beams according to some embodiments. For some embodiments of a structure 600, blazed gratings may be used to direct beams to a non-symmetrical angular distribution. For some embodiments, a blazed grating may have a sawtooth-type shape. For some embodiments, the diffraction gratings may be optimized to produce either symmetric or non-symmetric beam angular distributions with respect to a display surface's normal vector. A symmetric distribution, with optical power evenly divided into positive and negative diffractions orders on both sides of the zeroth order, may be used if a viewer is positioned straight in front of the display surface's normal direction (which is aligned with a vector normal to the display surface). A blazed grating may be used if the viewer is positioned off-axis from the display's normal direction. This type of grating splits the optical power unevenly to the positive and negative orders around the zeroth order and enables tilting of a beam bundle to an off-axis direction. In addition to tuning the grating design parameters, this directionality may be adjusted with a two-layer structure if separate blazed gratings have opposite directions, as shown in FIG. 6. Such a directional distribution may be helpful if a large flat screen is used for generating 3D images towards a centrally-positioned viewer, and the backlight projector cells at display edges project the beams to an off-axis direction in order to make the MDPs visible.

For some embodiments, the backlight projector cells (or, e.g., addressable array of light-emitting elements) (which may be µLEDs) may be positioned with an equal separation between backlight projector cells for backlight projector cells located less than a threshold distance from the center of the display. For some embodiments, the backlight projector cells may be positioned with an unequal separation between backlight projector cells for backlight projector cells located more than a threshold distance from the center of the display, wherein the unequal separation between backlight projector cells may be based on how far each of the second plurality of light emitting element blocks are located from the center of the apparatus. For some embodiments, an addressable array of light-emitting elements may be separated into two groups: a first plurality of sets of light-emitting elements and a second plurality of sets of light-emitting elements. Each group of sets of addressable array of light-emitting elements may include a plurality of sets of, e.g., 3, light-emitting elements. The first plurality of sets of light-emitting elements may be located less than a threshold distance away from a center of the display, and the first plurality of sets of light-emitting elements may be arranged with an equal separation between each set of the first plurality of sets of light-emitting elements. The second plurality of sets of light-emitting elements may be located more than the threshold distance away from the center of the display, and the second plurality of sets of light-emitting elements may be arranged with an unequal separation between each set of the second plurality of sets of light-emitting elements based on how far each of the second plurality of sets of light-emitting elements is located from the center of the display.

For some embodiments, a light emitting layer with light sources may be used to generate light beams that are collimated with collimator optics, diffracted into first generation child rays with, for example, orders of 0, +1, and +2 using a first diffraction grating, and diffracted into second generation child rays with, for example, orders of 0 and −1 using a second diffraction grating. The second generation child rays may include light rays with, for example, a first grating order of 0 and a second grating order of −1 (602); a first grating order of 0 and a second grating order of 0 (604); a first grating order of +1 and a second grating order of −1 (606); a first grating order of +1 and a second grating order of 0 (608); a first grating order of +2 and a second grating order of −1 (610); and a first grating order of +2 and a second grating order of 0 (612).

For some embodiments, generating an asymmetrical angular distribution of light may include generating a directional backlight using a blazed diffraction grating, such as using the example structure 600 shown in FIG. 6. For some embodiments, a structure 600 may include a directional backlight; and a blazed diffraction grating configured to generate an asymmetrical angular distribution of light. For some embodiments, a backlighting and optical mask structure 600 may include a light emitting layer with light sources 636 (which may include an array of, e.g., µLEDs 614, 616, 618, 620, 622, 624, 626, 628, 630, 632, 634), a collimator optics layer 638, one or more diffractive grating layers 640, 642, and an array of optical mask elements 644. For some embodiments, a first diffractive grating layer 640 may be used to generate a first generation of diffracted light beams (e.g., with an order of −1 (646) and an order of +1 (648)), and a second diffractive grating layer 642 may be used to generate a second generation of diffractive light beams 650.

Color filters commonly used in LCDs may be used for generating a full-color image from a white backlight, for example created with blue or UV µLEDs coated with a thin phosphor layer that transforms the narrow single-color emission spectra into a wider white light emission spectrum. For some embodiments, a backlighting optical structure may include one or more color filters, such as separate red, blue, and green filters, which may be used to generate a full-color image. For some embodiments, a white backlight is used, and single-color components are used on the light emitting layer. For some embodiments, the number of emitted beams per emitter may be multiplied, thereby reducing the total number of emitters used.

For some embodiments, full color images may be generated with separate red, green, and blue emitter components and no color filters in the LCD structure. For some embodiments, µLED sizes and bonding accuracy enable three-color pixels to be under 10 µm in size. For some embodiments, different colors may be created by using single color emitters that are coated, e.g., with quantum dot materials that transform the single-color emissions to the three primary colors. For some embodiments, an integrated optics apparatus may be used in which a light mixing lightguide structure may be integrated directly on top of a µLED cluster.

For some embodiments, diffractive gratings may separate colors if the light wavelengths are diffracted to somewhat different angles. Such gratings make the longer wavelength colors (red) spread more than the short wavelength colors (blue), and color separation may be more visible at the edges of the backlight angular spread. For some embodiments, grating and other optical parameters of the backlight module may be selected so that each color component is able to produce almost continuous distribution of illumination angles, and the overlapping angular ranges at the center of the distributions contain full color components. Light diffusers may be used to enhance further the uniformity of angular spreads. For some embodiments, light diffusers may be used with separate red, green, and blue emitters that have narrow spectral ranges. The angular spread may become more natural as different wavelength components are spread evenly without spectral discontinuities. Some of the light emitted with red and green components or at the red end of the white spectra may be lost as the angular spread is wider for these colors than with blue.

For some embodiments, the backlight module may provide controllable directional illumination for a 3D display SLM, which may act as an image modulation component. As the two modules have separate optical functions, the modules may be optimized separately for different embodiments. For example, the size of the backlight projector cells may be much larger than the size of the MDPs to ease manufacturing. The child beam intensities and overall angular distribution may be adjusted with the grating design parameters.

However, the spatial distribution of light on the SLM surface may be fairly even to avoid uneven modulation of different view directions.

This adjustment may be difficult to achieve as various edge effects are commonly found from illumination structures that are in array format. An example standard method for improving spatial distribution homogeneity is to add light diffusing elements or features that widen the angular distribution of illumination. In the case of a multiview display, widening of the angular distribution may be done if the quality of illumination directionality is not lowered below a threshold as too wide a beam divergence may result in lower contrast 3D images if the different view direction channels overlap. For some embodiments, this potential issue may be avoided by reducing the size of the backlight beams below the threshold of human visual acuity or by fitting the size of the backlight beams to the size of the MDP.

For some embodiments, different methods may be used to make color images with a three-color backlight or with a module that provides a wider white light spectrum. For example, color filters may transmit light differently if light comes from different angles. Filters based on material absorbance may do this due to the different attenuation lengths connected to layer thickness and geometry, whereas filters based on dielectric layers may generate different transmission properties due to light interference differences connected to incidence angles. Both of these filter types may be optimized for specific angular range and wavelengths. For some embodiments of white light illumination, the different view directions may be created by shining LCD color filters from different directions, and the absorption lengths in the color filter material layers may become different. This may cause somewhat different colors to appear in the view directions and colors may be calibrated with LCD pixel transmissions. For some embodiments, phosphor material applied on top of the µLEDs may be adjusted to compensate for this effect. As the µLEDs emitting light to different directions are located at different spatial positions, the phosphor materials with slightly different color characteristics may be applied selectively.

Beams exiting the optical structure may be collimated to limit the visibility of a single beam to only one eye at a time. The average interpupillary distance between adult humans is ~64 mm, which may be the upper limit for beam size at the viewing distance of some embodiments. If the visibility of each display pixel is limited to a single eye at a time, the stereoscopic effect may be created with unique 2D images projected to different eyes. For some embodiments, this may be achieved by activating the appropriate light emitters (e.g., µLEDs) in synchronization with the SLM (e.g., LCD). If only two images are used, two images may be produced with very wide illuminating beams that are visible only to one half of the facial area of a single user, but the 3D effect may be low quality. For some embodiments, quality of the display may be increased by increasing the number of views with more than two illumination beams per each MDP and/or by showing more than two images sequentially. Generally, the more views that are inside the viewing window, the better the illusion of a 3D image as the transition between views becomes smoother and the user is able to "look around" the object by moving his/her head or the display device. If two or more emitter rows are used, different views may be generated for both horizontal and vertical directions, which may enable display view rotation and better-quality 3D images.

In some embodiments, other light sources (e.g., OLEDs) that may be miniaturized may be used in the light emitting layer in addition to (or, e.g., instead of) µLEDs, which are very small and have high brightness. An increase in light source size may use larger microlenses to achieve the same level of beam collimation. For some embodiments, light emitters may be made as separate components. By multiplying the number of directional beams, spatial multiplexing may be done with low cost optical components instead of multiple emitters that are bonded to the backplane and have separate electronic features for controlling such components. Laser diodes or RC LEDs may be used, for example, with optoelectronic characteristics similar to µLEDs.

For some embodiments, this optical method may be used with different displays. Achievable backlight illumination beam collimation level may be the determining factor for the suitable viewing distance of the display, which also largely determines the optimal configurations. The separate beams emitted from single MDPs may cover only the area of approximately one eye. If the beam has too large a divergence, the beam may be visible with both eyes simultaneously, corrupting a stereoscopic image. The theoretical lower limit for beam divergence is based on eye pupil size, as only a few beams hitting the pupil simultaneously is adequate for fulfilling the SMV condition. The lower limit may be set by the achievable size of the backlight module light emitter and the size of the collimating lens elements. With very small sources and collimator lenses, beam divergence may have diffraction effects that cause a hard physical limit to the achievable spot size at the viewing distance.

Table 1 lists a set of calculated values for typical example maximum viewing distances for different size light emitters and small collimating lenses based only on a geometric analysis. The light emitting element may be positioned at the same distance from the microlens as the lens aperture size, making the system f-number equal to 1. For Table 1, the lenses are ideally shaped, and the light emitting element is placed at the focal distance to maximize beam collimation. Maximum viewing distance is set to the distance where the generated beam size is 50 mm. With this size, the beam may fit comfortably over the area of only one eye at a time. For example, as shown in table 1, if a 10 µm emitter is used together with a 100 µm microlens, the display may be viewed from ~0.5 m distance, which corresponds to an average viewing distance of a mobile device. This value may represent the approximate maximum distance, and the device may be used at a closer range as the diverging beam size is smaller closer to the display surface. Some other values for the maximum viewing distance may be obtained with different optical f-numbers, but as most of light emitters have a fairly large numerical aperture (NA), the small f-number is desirable from the illumination efficiency point-of-view. If the system f-number and/or emitter NA are very large, a lot of light that misses the lens aperture may be wasted. This wasted light may cause more crosstalk between pixels and stray light that lowers image contrast.

TABLE 1

Calculated typical maximum viewing distances for different backlight module designs

| Emitter Size (µm) | Typical Maximum Viewing Distance (mm) with Different Backlight Module Collimating Microlens Sizes | | | |
|---|---|---|---|---|
| | 100 µm Lens | 250 µm Lens | 500 µm Lens | 1000 µm Lens |
| 5 | 1000 | 2500 | 5000 | 10000 |
| 10 | 500 | 1250 | 2500 | 5000 |

TABLE 1-continued

Calculated typical maximum viewing distances for different backlight module designs

| Emitter Size (μm) | Typical Maximum Viewing Distance (mm) with Different Backlight Module Collimating Microlens Sizes | | | |
|---|---|---|---|---|
| | 100 μm Lens | 250 μm Lens | 500 μm Lens | 1000 μm Lens |
| 25 | 200 | 500 | 1000 | 2000 |
| 50 | 100 | 250 | 500 | 1000 |

Figure 7A:
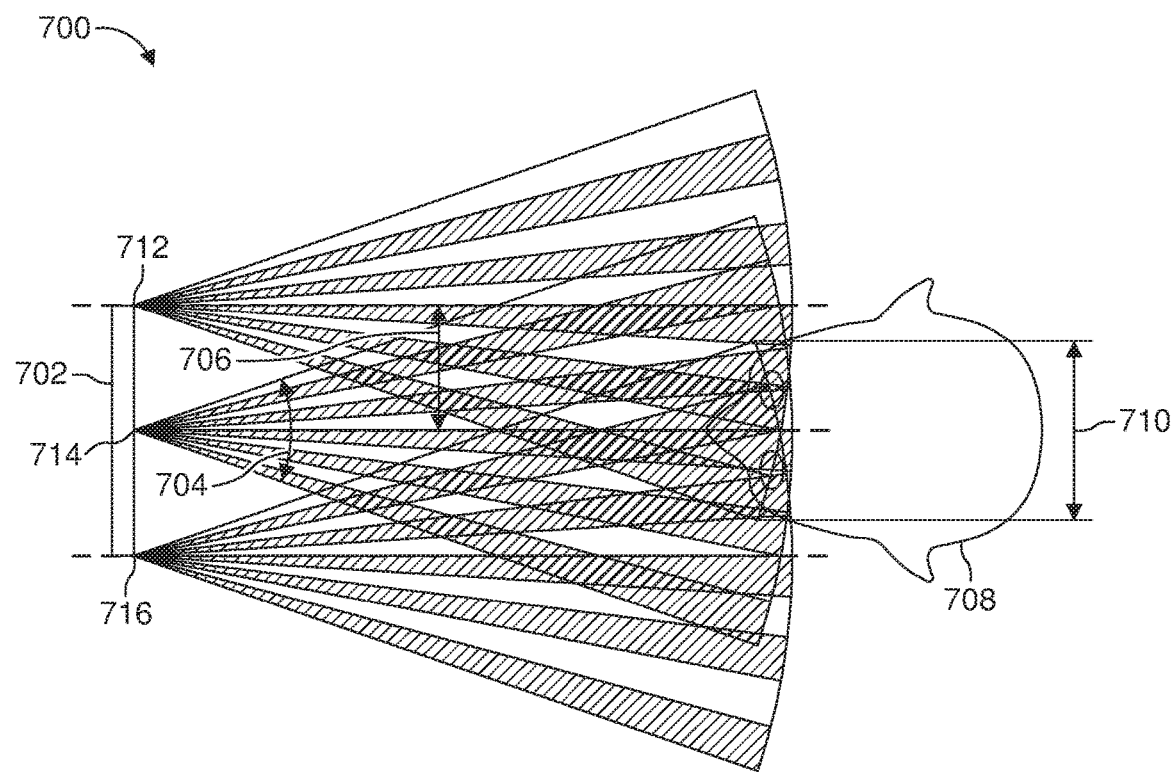
FIGS. 7A and 7B are schematic plan views illustrating an example set of light beams adjusting emission direction angles (EDAs) to match a viewing window according to some embodiments.
Figure 7B:
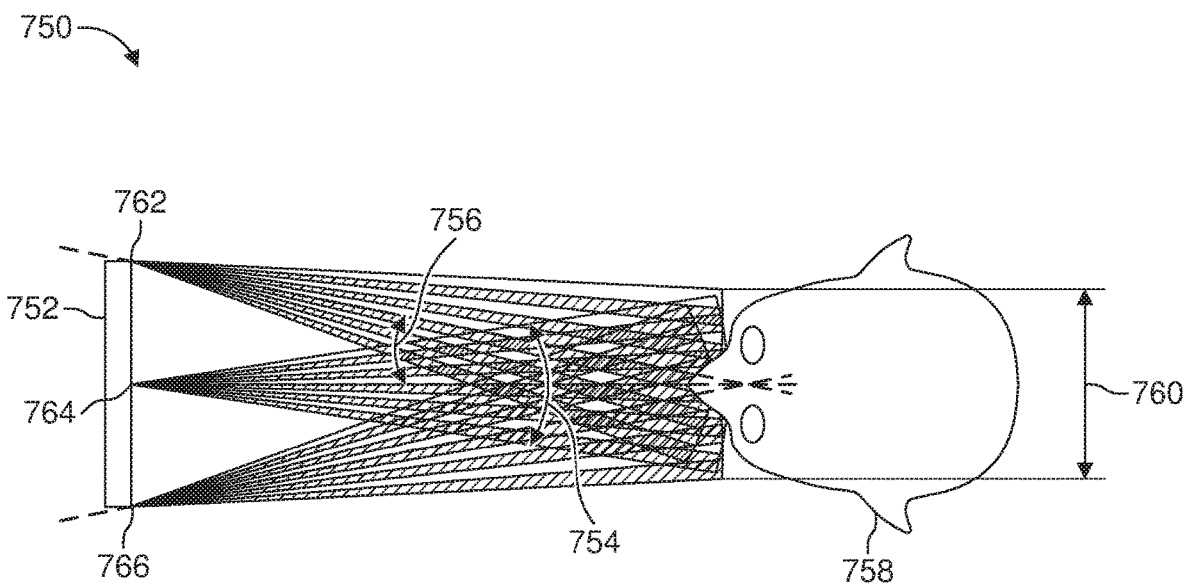

FIGS. 7A and 7B are schematic plan views illustrating an example set of light beams adjusting emission direction angles (EDAs) to match a viewing window according to some embodiments. To make a full display, the small MDPs may be copied over a finite display area for some embodiments. A single MDP generates a limited set of beams that have a limited angular extent, and a single MDP also has a limited Total Divergence Angle (TDA) 704. The TDA parameter measures the total FOV of one MDP, and the MDP is visible only inside this particular angular range. If the display is large, the TDAs of the MDPs located at the edges of the display 702 may use an overlap region. Without overlapping areas, the edges may not be visible simultaneously, making the whole display image only partially visible. FIG. 7A shows a viewing geometry 700 if the overlapping TDAs 704 form a viewing window 710 around the facial area of a viewer 708 with parallel EDAs 706 emanating from MDPs 712, 714, 716. For some embodiments, such as FIG. 7B, the Emission Direction Angles (EDAs) 756 of the MDPs located at the edges of a display 752 may be tilted towards the display central line. For some embodiments, such as the viewing geometry 750 of FIG. 7B, converging emission direction angles emanating from MDPs 762, 764, 766 may enable denser views for a viewing window 760 around the facial area of a viewer 758 because the TDAs 754 may be narrower. In practice, narrowed TDAs 754 may be achieved by shifting the nominal positions of light sources slightly inside the MDPs and by increasing the value of this shift for light sources near the display edges. For some embodiments, a blazed grating may be used, and the diffractive foils may have different grating parameters near the display edges. For some embodiments, tilting may be done optically by placing an extra optical element (such as a combination of a Fresnel lens and a protective window) on top of the SLM. For some embodiments, the whole display surface is made with a specific curvature for a predetermined viewing distance.

For some embodiments, the optical display structure may include an optical element (for example, one or more lenses (such as collimating lenses) located between the optical mask elements and the viewer) configured to adjust emission direction angles of one or more of the optical mask elements (e.g., pixels of an LCD). For some embodiments, one or more of the optical mask elements may be configured to adjust the emission direction angles of the one or more of the optical mask elements to align with a viewing window of a viewer.

For some embodiments, the switching speed of the SLM may be a limiting factor in the number of views in a multiview 3D display. For a refresh rate of 240 Hz, an LCD may display flicker free images for only 4 unique views because the threshold value for the human eye is about 60 Hz.

However, if, e.g., eye tracking is used, a 240 Hz refresh rate may be sufficient because the minimum number of views used by an autostereoscopic 3D image is only two, and eye tracking may be used to determine the exact location of the viewer. For some embodiments, the LCD adaptive masks produce only those images that are used for the two eye directions. Four views may be used to improve the stereoscopic effect by enabling two slightly different images to be used for each eye and satisfying the SMV condition.

Light intensity of each display pixel may be controlled through a certain dynamic range in order to make a display with good image quality. With LCDs, the light intensity is commonly adjusted by controlling the amount of light passing through each pixel by using two polarizers and electrically controllable liquid crystal material that twists the polarization state of the passing light. A combination of backlight intensity adjustment and LCD pixel absorbance may be used (such as to achieve a higher contrast ratio picture). For many LED TV products, this technique is called "local dimming". For some embodiments, this technique may be done by continuously adjusting the electric current flowing through each light emitting component. For some embodiments, the component brightness may be adjusted digitally by pulse width modulation (PWM). LEDs, in general, are components that may be switched extremely fast and adequate dynamic range for a flicker free image may be achieved. For some embodiments, the backlight module single beam size (or, e.g., microlens aperture size) may be matched to the size of the LCD pixel. For some embodiments, a pixel-level intensity adjustment may be made with a combination of the backlight module and the LCD. For some embodiments, this method may be used for larger dynamic range image pixels and to allow faster display panel switching speeds as the intensity adjustments may be partially-handled by the backlight module.

For some embodiments, each MDP may have a group of light emitting components used with adaptive masks created with SLM pixels that are dedicated to specific view directions. A matrix of emitters may be activated and synchronized to SLM masks that selectively pass or block the specific set of diffraction order beams for the formation of directional 2D views of a 3D scene. The images projected in different directions may be created sequentially, and masks may be applied in an interlaced manner that handles backlight projector cell grouping. For some embodiments, this multiplexing scheme may be based on balancing temporal and spatial multiplexing.

For some embodiments, the SLM may use a progressive scanning method for rendering images. In this method, the display lines are drawn by sequentially activating all the pixels in a row, one after each other. The light emitters on a backplane corresponding to a display pixel location and view direction may be selectively activated. These emitters and the SLM pixels may be "scanned." All light beams emitted by a single MDP go through the same SLM pixel at almost the same time and within the refresh frequency of the SLM. As the individual beams going in different directions have different light intensities, the separate beams may be modulated individually. For some embodiments, the emission of the single light emitters may be modulated with electric current or a PWD (or, e.g., PWM). For some embodiments, the control signals to the light emitting backplane may have individual values for each emitter component, and the SLM pixel may be used only as an on-off switch. For some embodiments, very exact timing may be used for emitter activations. In this method, the different source components may be activated at slightly different times and as the SLM goes through one refresh cycle allowing light to pass the pixel at different intensities between relative values from 0 to 1, the intensity modulation for the different beams may depend on the exact timing of light emissions. For example, LCD panel pixels have specific response time curves, and the timing of μLED emissions may be fitted according to the image content.

For some embodiments, a method for generating a multidirectional display image may include adjusting emission direction angles of the optical mask. For some embodiments, adjusting the emission direction angles of the optical mask may include adjusting the emission direction angles of the optical mask to align with a viewing window of a viewer. For some embodiments, the method for generating a multidirectional display image may include adjusting brightness of the plurality of light beams by pulse width modulating the light beam emitted from each light-emitting element of the addressable array of light-emitting elements.

FIGS. 8A-8D are schematic plan views illustrating an example synchronization of light sources and multidirectional display pixels (MDPs) of an SLM according to some embodiments. FIGS. 8A-8D show some example visualizations 800, 820, 840, 860 of how the light emitter grouping and SLM pixel activation may be synchronized to each other for stereoscopic image rendering. For some embodiments, an optical backlighting structure may include a light emitting layer light sources 804, a collimator optics layer 806, one or more diffractive grating layers 808, 810, and an array of optical mask elements (e.g., an SLM) 812. FIGS. 8A and 8B each show embodiments that use one SLM pixel and two emitters. For FIG. 8A, the two beams used by the two eyes of a viewer 814 may be generated with backlight projector cells that are, e.g., five cell widths away from each other. All orders of diffraction except the ones travelling directly towards the viewer's eyes are blocked by the SLM pixels. Both passed beams travel through the same SLM pixel 802 and, for some embodiments, the beam intensity may be modulated by adjusting the source emittances. For FIG. 8B, the addressed pixel 822 on the SLM has been changed to the next pixel on the row, and the activated sources have been selected differently so that the spacing between the emitters is now four cell widths. These examples illustrate that the spacing between cells may be changed to enable different angles. Changing the SLM pixel enables the projection angle to change without moving parts for a system that may make the beam directions continuous. Individual beams may be wide enough to enable overlapping.

Uniformity of image intensity over a single eye box area may be improved by allowing more than two beams to propagate through a single SLM pixel. For FIG. 8C, four light sources are used to create two different views of light beams passing through a single SLM 842. The expanded eye box feature may be used to fulfill the Super Multi View (SMV) condition by allowing a smoother transition between views. FIG. 8D shows activation of two separate SLM pixels 862, 864 simultaneously together with four sources to speed up the rendering or to reduce bandwidth through image interlacing. These benefits may be performed if the system has proper geometry, and SLM masks are synchronized with the backlight projector cell groups. For some embodiments, eye tracking may be used to enable more SLM masking configurations and to ensure that extra beams allowed to pass (such as the example shown in FIG. 8D) are not seen by the wrong eye.

For some embodiments, synchronizing an optical mask (e.g., SLM) to an addressable array of light-emitting elements (or, for some embodiments, a single light emitting element) (such as, one or more μLEDs) may include: determining a location of a multidirectional display pixel (MDP) within the optical mask based on a light beam selected from the diffracted light beams and the content embodied in the diffracted light beams; and rendering the optical mask, wherein the light beam selected from the diffracted light beams passes through the optical mask, and wherein rendering the optical mask is synchronized with the content embodied in the diffracted light beams.

For some embodiments, the redundancy of image content in 3D scenes may be used in a rendering scheme to save energy and to enable brighter pictures. As one example, U.S. Pat. No. 8,848,006 describes a rendering scheme for a tensor display. Any variety of rendering techniques using, e.g., redundancy of image content in 3D scenes, may be applied to the displays described herein in accordance with some embodiments.

Figure 9:
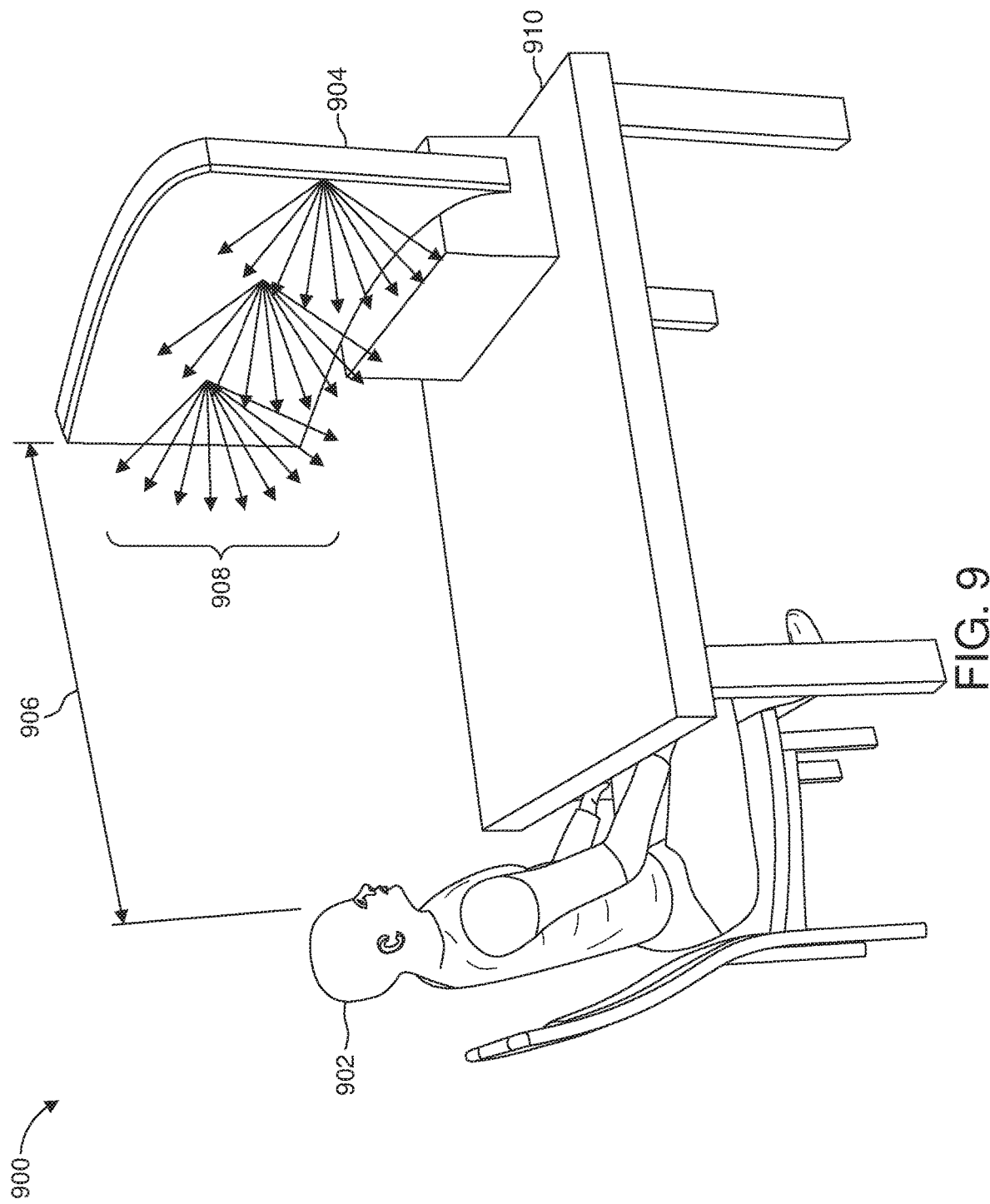
FIG. 9 is a schematic perspective view illustrating an example curved multiview display according to some embodiments.

FIG. 9 is a schematic perspective view illustrating an example curved multiview display according to some embodiments. In the environment 900 of FIG. 9, an example 50" curved, 3D multiview display 904 and eye tracking device (not shown) is viewed by a user 902 sitting at a table 910 from a distance of 1 meter (1000 mm) 906. Example diffraction angles 908 are shown for light beams passing through a pixel. For the example of FIG. 9, the device has a stereoscopic camera pair and IR LEDs that illuminate the facial area of the viewer. The cameras used for eye tracking may be capable of determining 3D locations of the viewer's eye pupils and direction of gaze. This information may be used for projecting a stereoscopic 3D image to the eye directions. For some embodiments, this information also may be used to reduce the number of image rendering calculations made because the images are directed only to the two eyes instead of to the whole surrounding space. For some embodiments, one or more cameras may be configured to track eye positions of a viewer. For some embodiments, a method to generate a multidirectional display image may include tracking eye positions of a viewer. For some embodiments, synchronizing the optical mask to the addressable array of light-emitting elements may include: selecting a portion of the addressable array of light-emitting elements based on the eye positions of the viewer; and synchronizing the optical mask to the selected portion of the addressable array of light-emitting elements. For some embodiments, the facial area of the viewer may be illuminated, such as with an IR LED.

Figure 10:
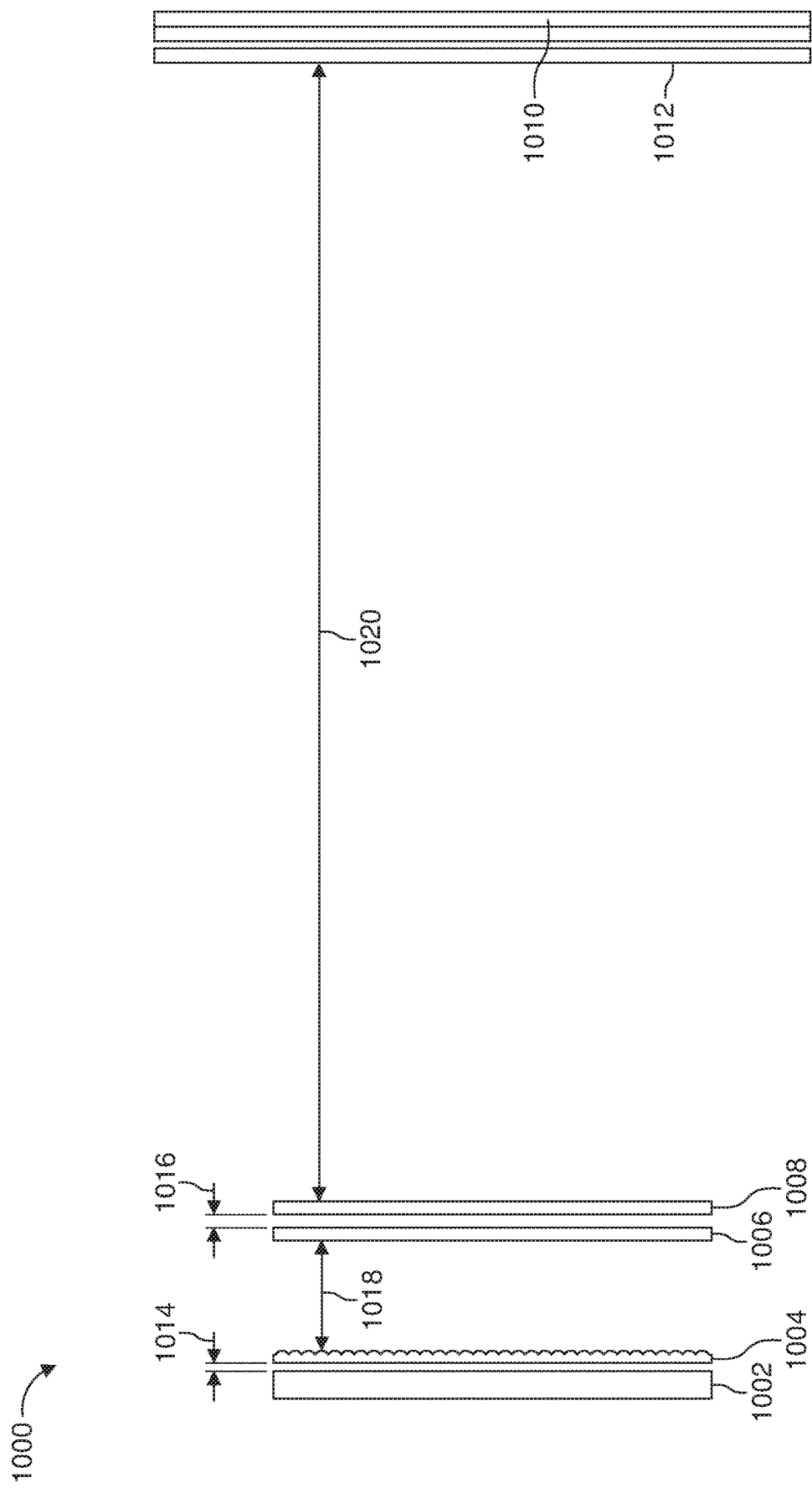
FIG. 10 is a schematic plan view illustrating an example set of measurements of system components according to some embodiments.

FIG. 10 is a schematic plan view illustrating an example set of measurements of system components according to some embodiments. For some embodiments of a multidirectional display structure 1000, clusters of μLEDs may be bonded to a backplane 1002, and each of these clusters may be centered to one 0.5 mm diameter collimating microlens contained in a 0.5 mm thick microlens sheet 1004. The embossed polycarbonate lens sheet 1004 with 1940×1100 microlenses may be positioned at 0.3 mm distance 1014 from the light emitting components (e.g., light emitting layer with μLEDs). For some embodiments, light extraction efficiency of the μLEDs may be increased by shaping the chips, making the emission directional and concentrating most of the optical power inside a ±20° emission angle. A numerical aperture (NA) value of ~0.34 may be large enough for covering most of a microlens' 0.5 mm aperture from a distance of 0.3 mm and may be small enough to reduce wasted light outside the aperture. For some embodiments, two 0.5 mm thick diffraction grating foils 1006, 1008 separated by a distance 1016 of 0.5 mm may be positioned in front of the lens sheet at distances of 4.3 mm (1018) and 5.3 mm. These gratings 1006, 1008 may be made from polystyrene and both gratings 1006, 1008 may be optimized to divide the optical power evenly to the three first diffraction orders of −1, 0, and +1. The first grating 1006 may have a resolution of 195 line pairs per millimeter (lp/mm), and the second grating 1008 may have a resolution of 65 lp/mm. For some embodiments, a 4K 50″ black & white LCD panel without color filters and with ~0.25 mm square pixels may be positioned at a distance 1020 ~43 mm from the second grating 1008. For some embodiments, a 0.5 mm thick polycarbonate diffuser sheet 1010 may be attached in front of the LCD panel 1012 (e.g., a 4K LCD panel with 0.25 mm pixels). For the example shown in FIG. 10, the total thickness of the optical display structure 1000 from the light emitters to the front diffuser is <55 mm.

Figure 11:
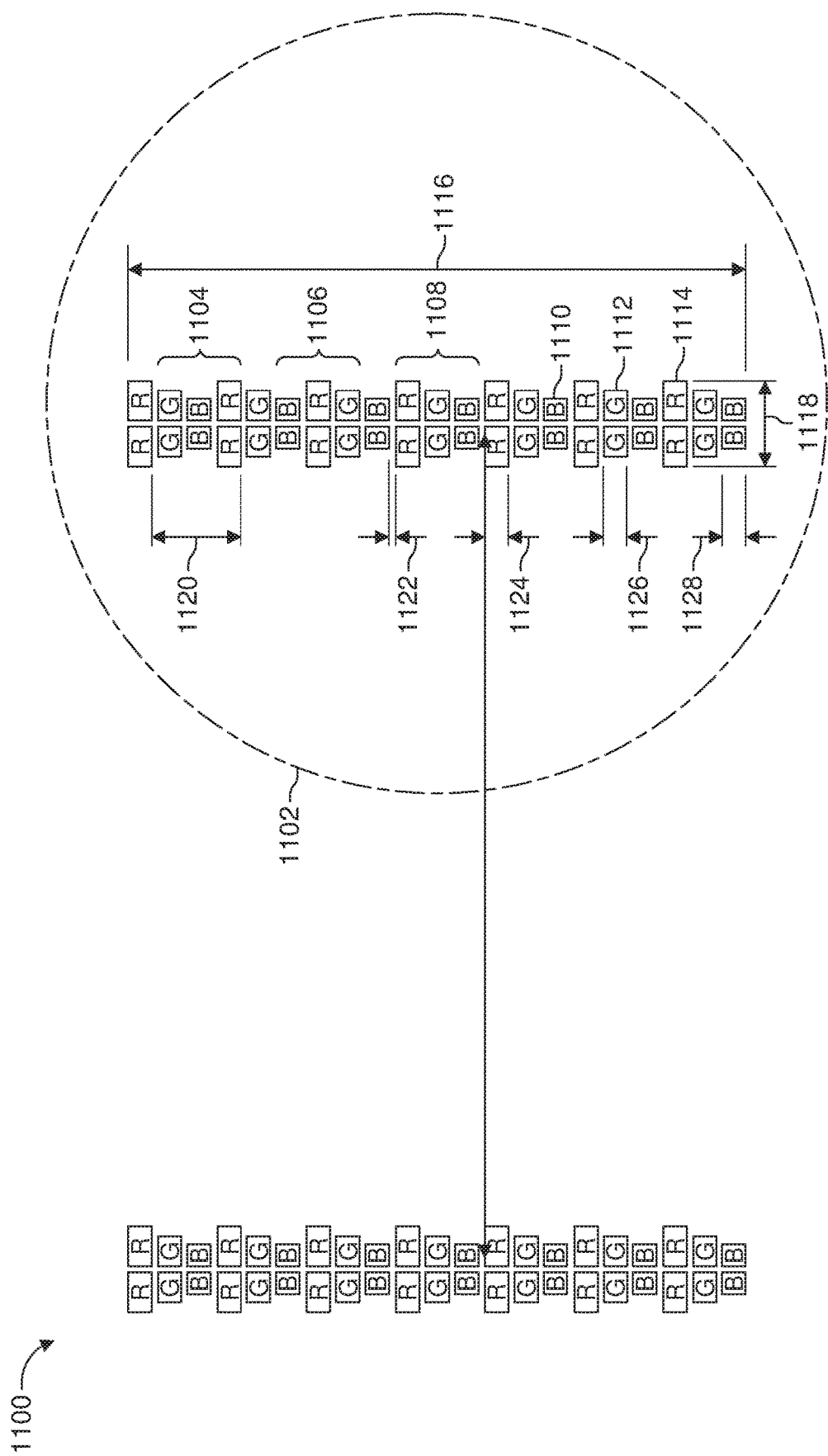
FIG. 11 is a schematic front view illustrating an example arrangement of µLED light source clusters according to some embodiments.

FIG. 11 is a schematic front view illustrating an example arrangement of μLED light source clusters according to some embodiments. FIG. 11 shows an arrangement 1100 of μLED clusters for some embodiments. The components may be bonded to ~0.2 mm high vertical columns with alternating red (wavelength of ~650 nm), green (wavelength of ~550 nm) and blue (wavelength of ~450 nm) μLED pairs. For some embodiments, red μLED chips 1114 may be 11 μm×7 μm (1124), green μLED chips 1112 may be 9 μm×7 μm (1126), and blue μLED chips 1110 may be 7 μm×7 μm (1128). For some embodiments, all components are positioned with 2 μm gaps 1122 between the chips in both horizontal and vertical directions. For some embodiments, a μLED cluster may have a horizontal height 1120 of 27 μm. For some embodiments, the red μLED pairs may have a wider vertical distance 1118 (e.g., 24 μm) than the green and blue component pairs. These size difference may be used to counteract the diffraction angle differences. Red light, if diffracted in a grating foil, has a larger angle than green and blue. The emitter component width increase may be used to increase the width of separate colored beams and to fill the gaps that otherwise may be visible in the total angular spread of the total beam group. A pair of μLEDs may be used in order to increase the number of horizontal beam directions. For some embodiments, the distance between two successive μLED clusters may be 0.5 mm, which also is the distance between two collimating microlenses. Such a μLED layout may enable easier access for individual electrical contacts.

For some embodiments, both gratings in the double grating structure may be oriented vertically, and the emitted beams may be split only in the horizontal direction. For some embodiments, the grating pair may create 9 collimated beams for each single μLED component emission, and these beams are directed in different horizontal directions. With a horizontally positioned emitter pair, the single projector cell may generate as many as 18 beams. For some embodiments, the grating parameters and component pair spacings may be selected such that nine angular emission pattern peaks from two components are interlaced. This arrangement may allow better control over the rendering of the stereoscopic 3D image as successive beams in the beam bundle may be separately activated. In the vertical direction, the separate view beams may be created by selecting μLED components from a column corresponding to image projection for the vertical direction. For some embodiments, each μLED cluster may have 7 red, green and blue component triplets (RGB pixels) on top of each other arranged with a horizontal distance 1116 of 187 μm. For some embodiments, at least 7 full-color unique vertical views may be created separately. For some embodiments, this number of full-color unique vertical views may be increased by activating the red, green and blue components in the column without grouping the components to fixed order RGB pixels but with adaptive activation, such that the order of red, green, and blue components in the column may be selected with more flexibility (e.g., as a GBR pixel 1104, a BRG pixel 1106, or a RGB pixel 1108). For some embodiments, this rendering scheme may almost triple the number of vertical view directions, increasing the total number of views in the whole system to 342 (18 horizontal×19 vertical).

For some embodiments, microlenses on the collimator sheet may have a plano-convex shape such that the first optical surface facing the μLEDs may be flat, and the second aspheric lens surface may have a radius of 0.37 mm and a conic constant of −0.5. The shapes may be, e.g., replicated to a polycarbonate foil by hot embossing. For some embodiments, there are no color correcting optical features on the microlens sheet. The beams emitted from a single backlight projector cell may have somewhat different divergence values due to color dispersion in the lens material and due to the different sizes of the emitter components. This difference may be seen in the optical performance simulation results but for some embodiments, this difference does not have a large effect on the overall performance of the system because the total variation is relatively small, and a diffuser sheet positioned in front of the display may even out beam intensity profile differences. Some beam divergence deteriorating diffraction effects may occur. Due to the relatively large size of the emitters and the microlens' low f-number (~1) for some embodiments, diffraction blurring is a minor effect that may help to diffuse the separate directional beams together and make the transitions between individual views smoother.

For some embodiments, illuminating beams exit the backlight structure from the top surface of the second grating sheet. The multiple beams hit the LCD panel and form a local illumination pattern that may be homogeneous on the pixelated LCD layer. A homogeneous pattern may be obtained by moving the LCD to a suitable distance from the grating structure. As the gratings split the beams into (nearly) evenly spaced angular intervals, the identical beams may be arranged into an even spatial distribution if the distance between the splitting sheet and LCD is increased. For some embodiments, an example distance of ~43 mm was large enough for this effect, and the beams spatially separated on the LCD surface for individual beam modulation. At this distance of ~43 mm, the beam diameter is still ~0.5 mm due to the microlens aperture size. For some embodiments, the microlens aperture diameter 1102 may be 500 μm. The 4K LCD panel used had 0.25 mm square pixels, so a cluster of 4 neighboring pixels may be used for blocking or passing each directional beam. The resulting 3D image resolution is full HD (1920×1080), but the display also may be used in 2D image mode with native 4K resolution by activating all the backlight sources simultaneously. For some embodiments, a thin polycarbonate diffuser foil may be positioned on top of the LCD. For some embodiments, the diffuser may cause a small 1°×3° (FWHM) widening of the beam divergence and may help make the far field illumination patterns more even.

For some embodiments, the light emitting backplane has separate red, green, and blue components, and the LCD lacks a color filter. Different color components of a full-color image may be created by activating the different color emitter components successively. For some embodiments, black and white LCD pixels may be used for modulating the intensity of beams, and the μLEDs may be just switched on and off. For some embodiments, the intensity may be modulated partially or completely by the μLED control electronics. For some embodiments, the LCD may be used as an on-off light valve masking the extra beams with specific pixel patterns. For some embodiments, the rendering schemes may use a higher refresh rate. For some embodiments, the µLEDs may be controlled with much higher switching speeds than the LCD refresh rate, and a fixed LCD mask pattern series may be used for faster 3D image refresh rates.

For some embodiments, each light-emitting elements of an addressable array of light-emitting elements may be a µLED. For some embodiments, the layer of light sources may include one or more µLEDs. For some embodiments, the layer of light sources may include one or more OLEDs, e.g., in addition to, or instead of, the µLEDs.

Figure 12A:
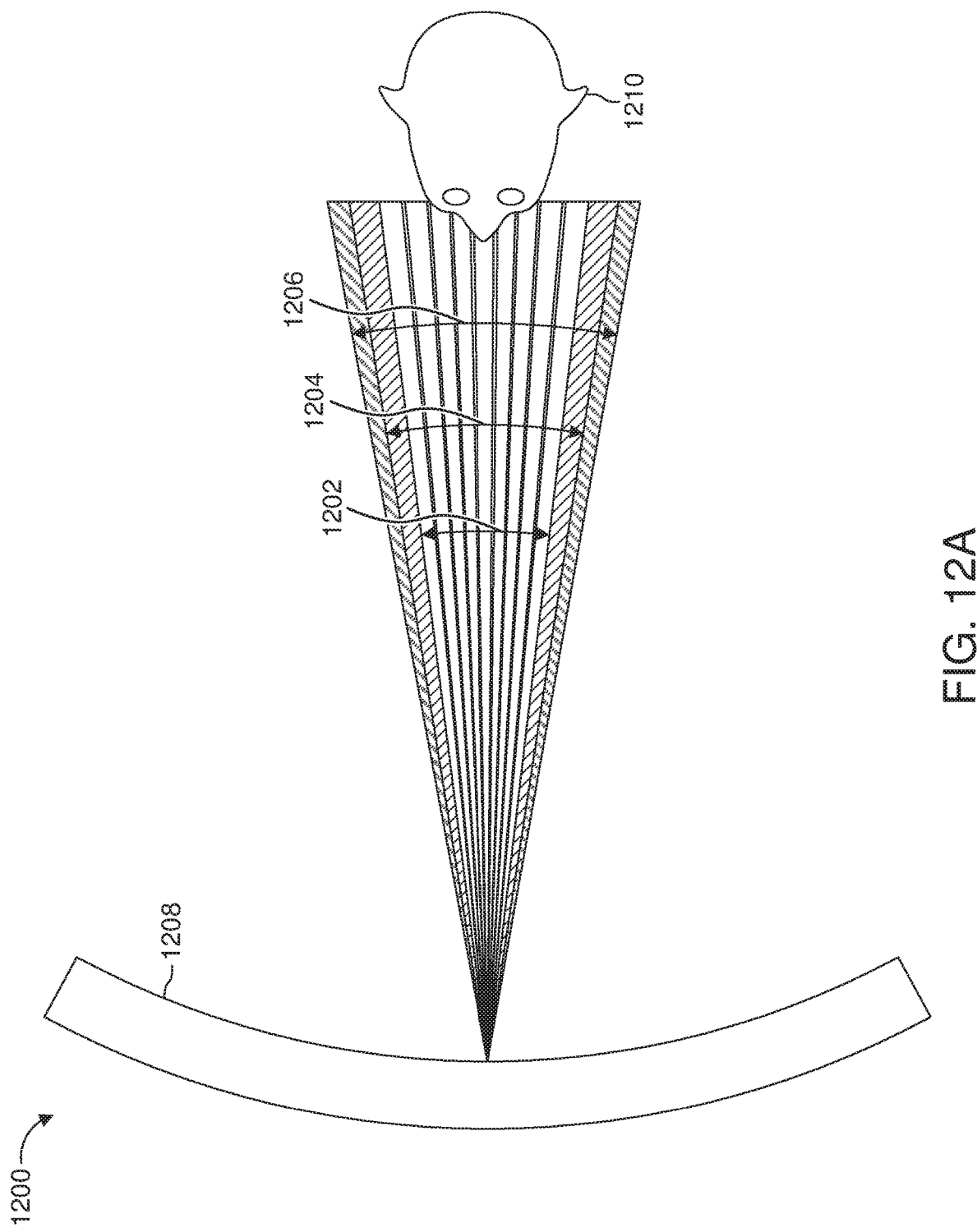
FIGS. 12A and 12B are schematic plan views illustrating example viewing geometries for a curved display according to some embodiments.
Figure 12B:
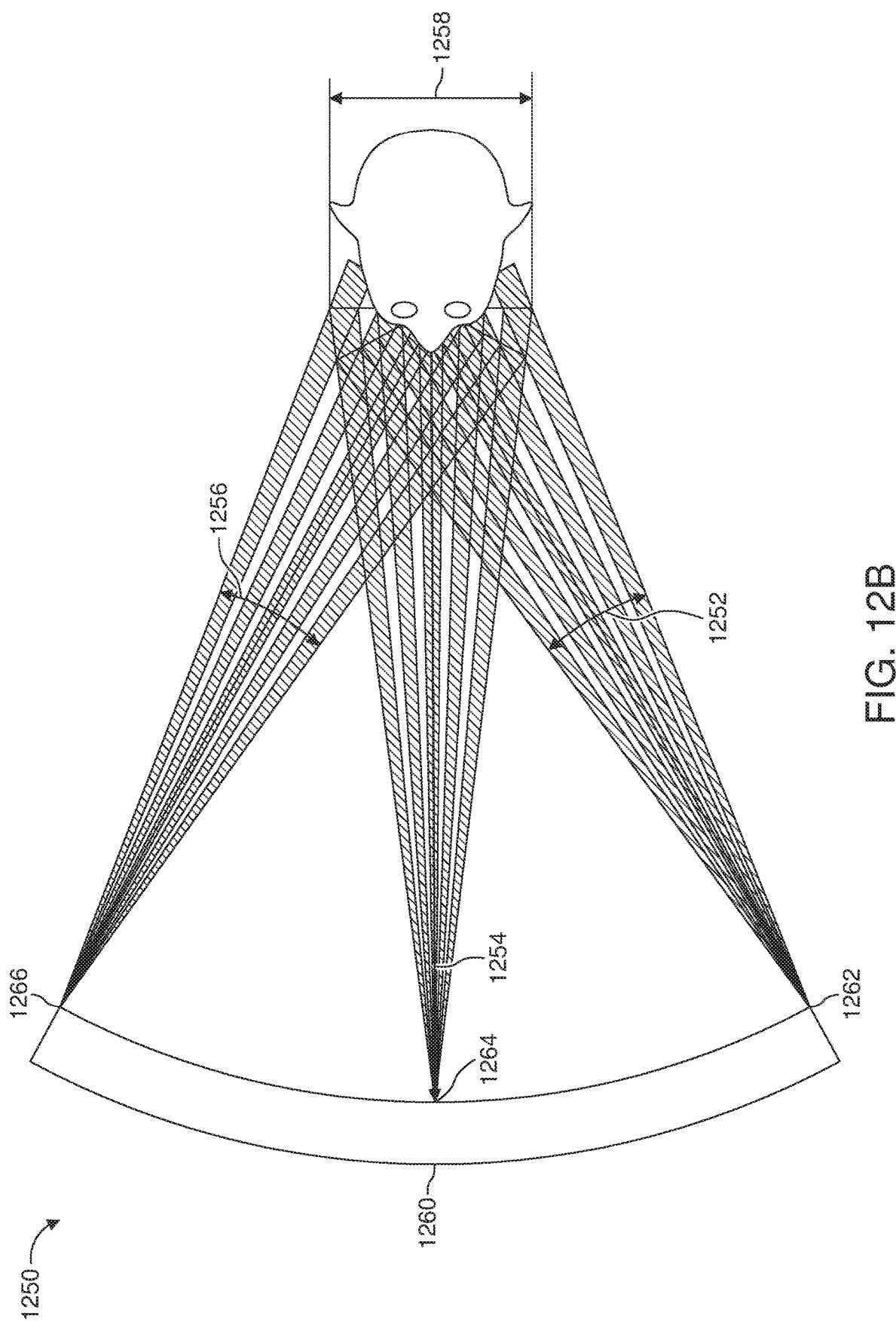

FIGS. 12A and 12B are schematic plan views illustrating example viewing geometries for a curved display according to some embodiments. FIG. 12A illustrates color separation for red, green, and blue light sources due to different example backlight diffraction angles. For some embodiments, a single backlight projector cell and the diffractive foil pairs of a display 1208 may be used to generate example beams that have total FOV of ±7.2° in the horizontal and ±7.5° in the vertical direction. In the horizontal direction of a viewing geometry 1200 of a viewer 1210, the green bundle 1204 and red beam bundle 1206 have wider FOVs (17.6° (±8.8°) and 20.4° (±10.2°), respectively) than the blue bundle 1202 (14.3° (±7.2°)) due to color dispersion in the gratings. A full-color image may be obtained only inside the innermost blue beam FOV, so the extra angles in these two colors may be blocked.

FIG. 12B shows the viewing geometry 1250 of a curved display 1260 used to overlap the multidirectional display pixel (MDP) FOVs at the viewer position in the horizontal direction. In the vertical direction, the µLED cluster spacing may be increased slightly towards the upper and lower edges 1266, 1262 of the panel, which may make the beam bundles 1252, 1256 tilt towards the display's center (normal) position. This µLED cluster spacing may allow the vertical MDP FOVs to overlap. For some embodiments, the measurements shown in FIG. 12B may be maximum values. By using eye tracking, light may be directed only to the viewer's pupils. A 250 mm×260 mm viewing window 1258 may be formed at a viewing distance 1254 of 1 m (1000 mm as shown) from a center point 1264 of the display 1260. If both of the viewer's eyes are inside the viewing window 1258, the viewer may see all of the MDPs of the display and a stereoscopic 3D multiview image may be generated. According to the example, the size of the viewing window is large enough for head movement of a single person.

To test optical functions, raytrace simulations were generated with optical simulation software (OpticsStudio 18.1). Physical widths of the sources were set to the values selected for the different color components and emission angular divergence was set to a Gaussian distribution with full-width-half-maximum (FWHM) value of ±20°. Unlike some embodiments of physical light sources, the simulated light sources had square apertures instead of rectangular. This difference had little effect on the results shown for the horizontal direction because the apertures are the same size for the horizontal direction. Simulation geometries and optical parameters were set based on physical directional backlight design parameters. Detector surfaces were placed at 1000 mm distance from the structures to get a view of the illumination patterns at a far field viewing distance. Another detector surface was placed at a distance of 43 mm from the backlight structures to measure near field illumination patterns that are falling on the LCD panel pixels.

Figure 13A:
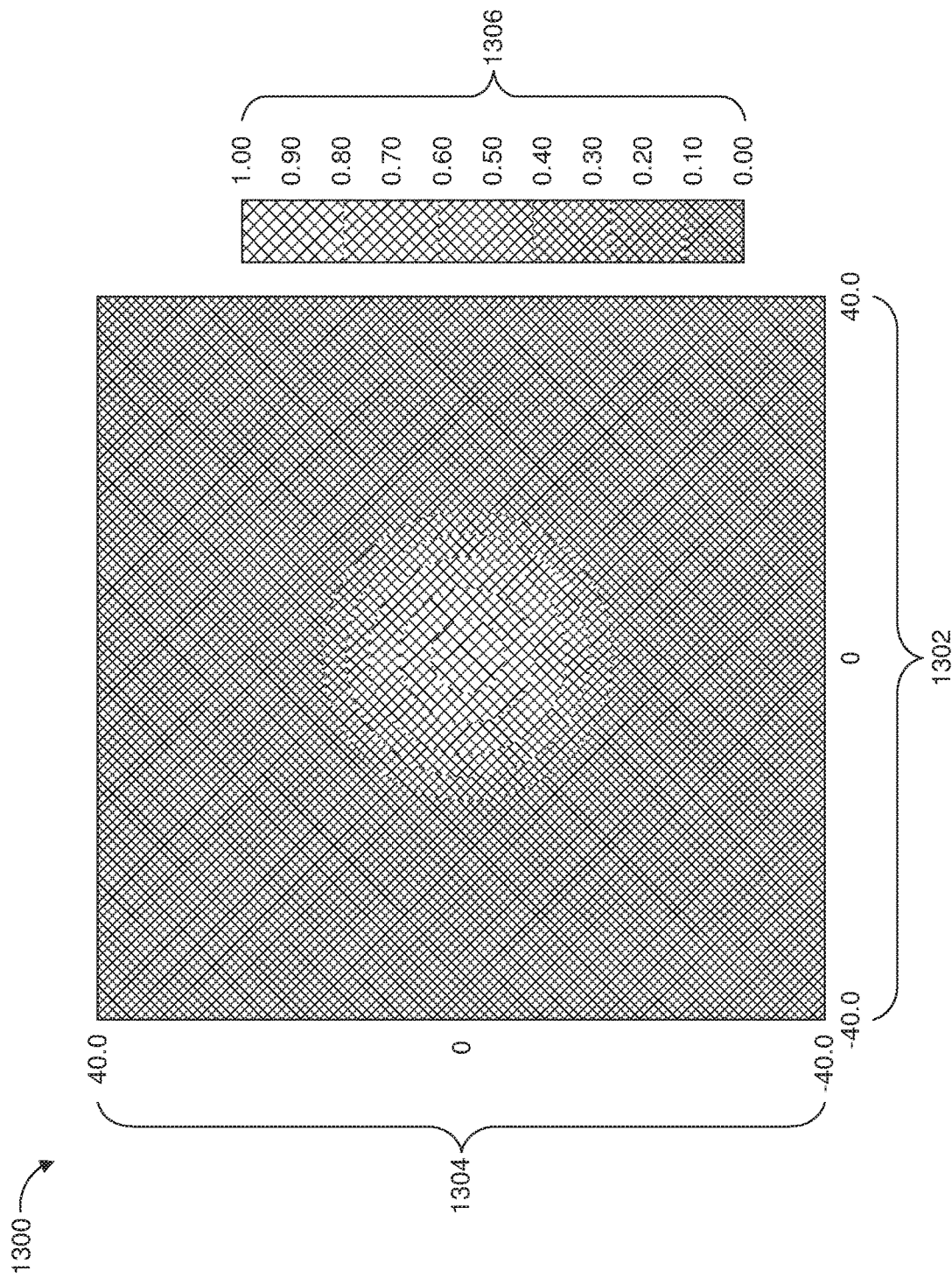
FIGS. 13A-13C are graphs of incoherent irradiance (respectively) for example red, green, and blue light sources without a diffuser according to some embodiments.
Figure 13B:
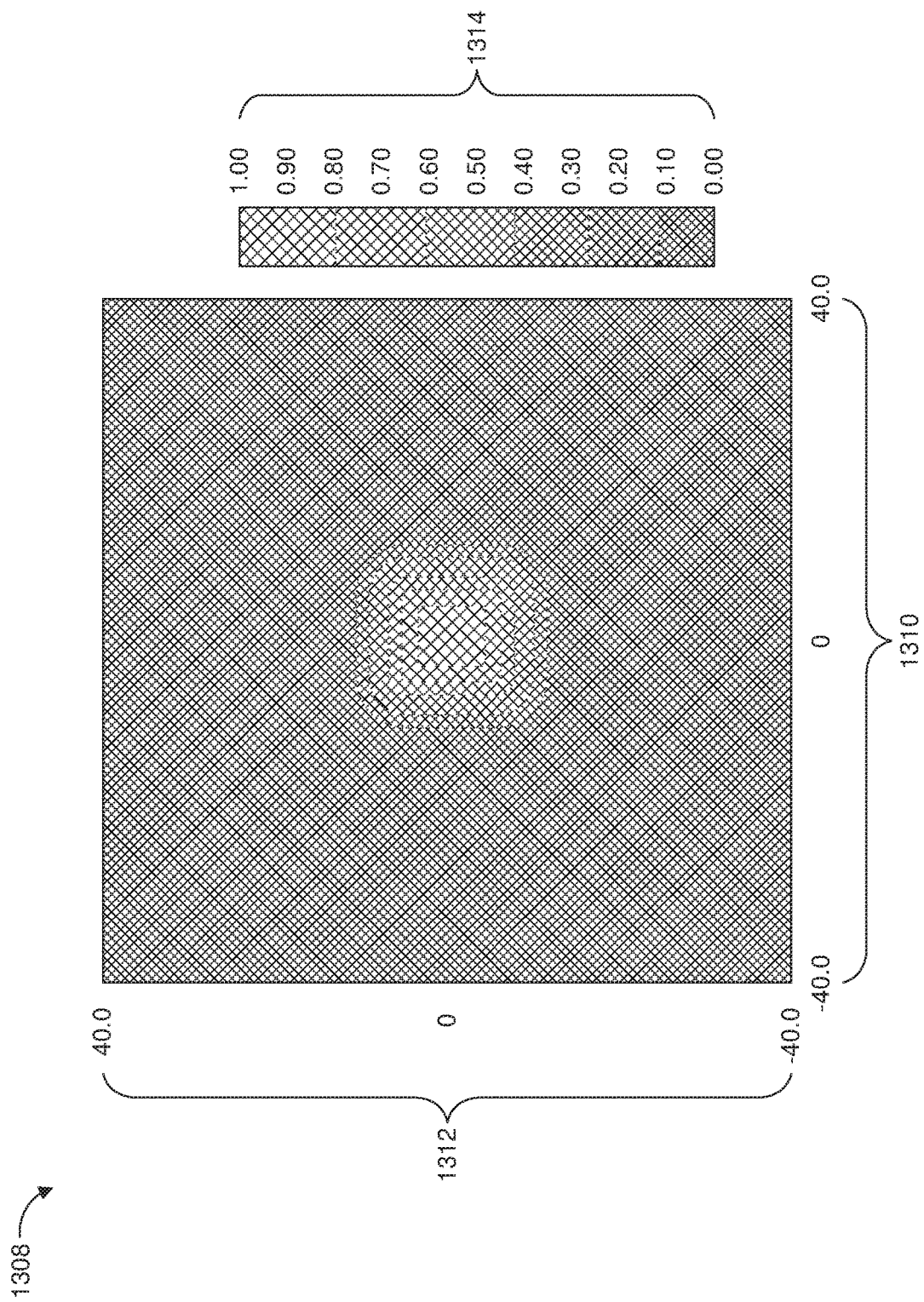
Figure 13C:
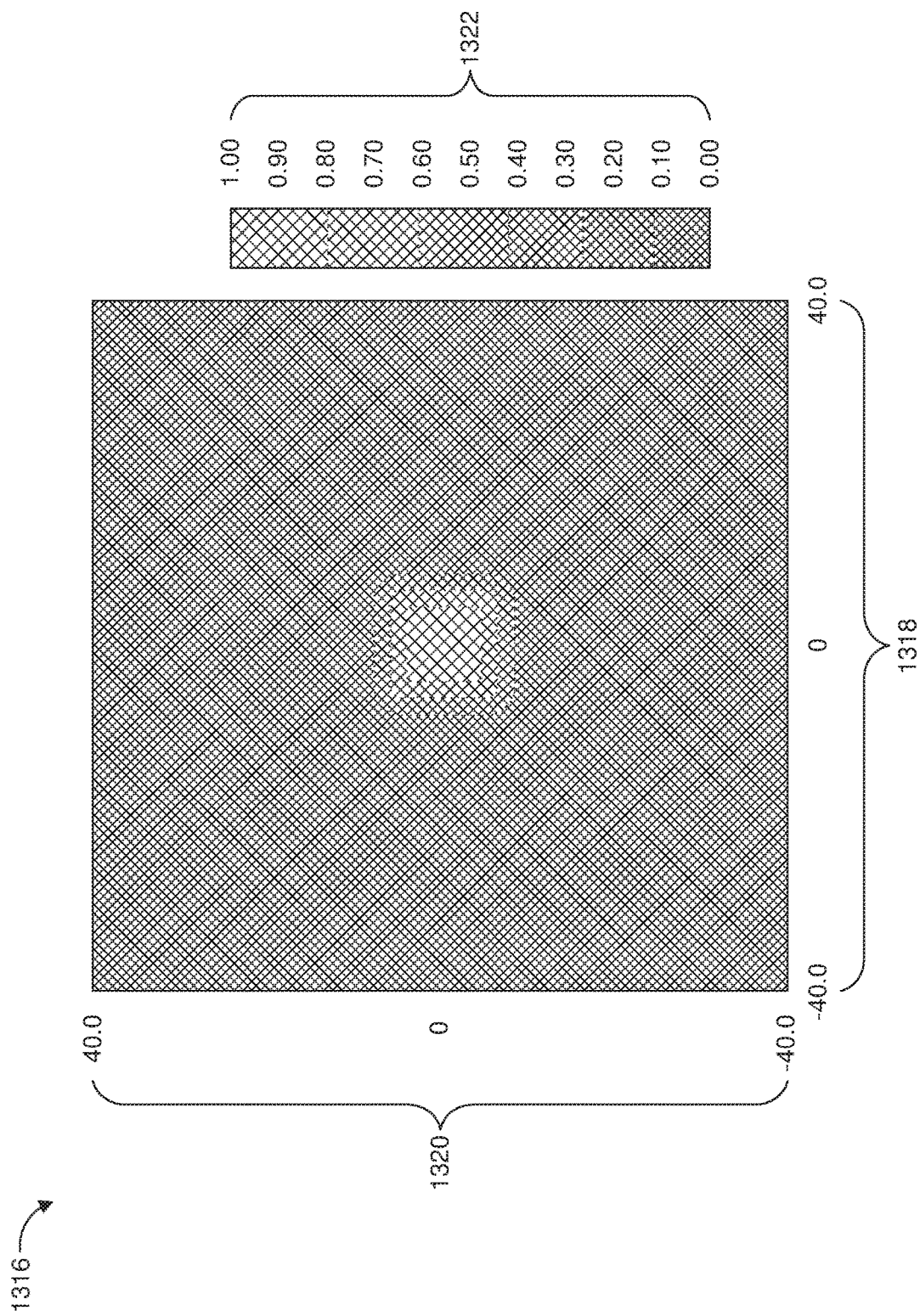

FIGS. 13A-13L illustrate single beam illumination spots simulated with three different colors at a distance of 1000 mm. FIGS. 13A-13C are graphs of incoherent irradiance (respectively) for example red, green, and blue light sources without a diffuser according to some embodiments. FIG. 13A shows a graph 1300 of incoherent irradiance 1306 for a red light source without a diffuser centered at (0,0) in an x-coordinate value 1302 and y-coordinate value 1304 spatial environment. FIG. 13B shows a graph 1308 of incoherent irradiance 1314 for a green light source without a diffuser centered at (0,0) in an x-coordinate value 1310 and y-coordinate value 1312 spatial environment. FIG. 13C shows a graph 1316 of incoherent irradiance 1322 for a blue light source without a diffuser centered at (0,0) in an x-coordinate value 1318 and y-coordinate value 1320 spatial environment.

Figure 13D:
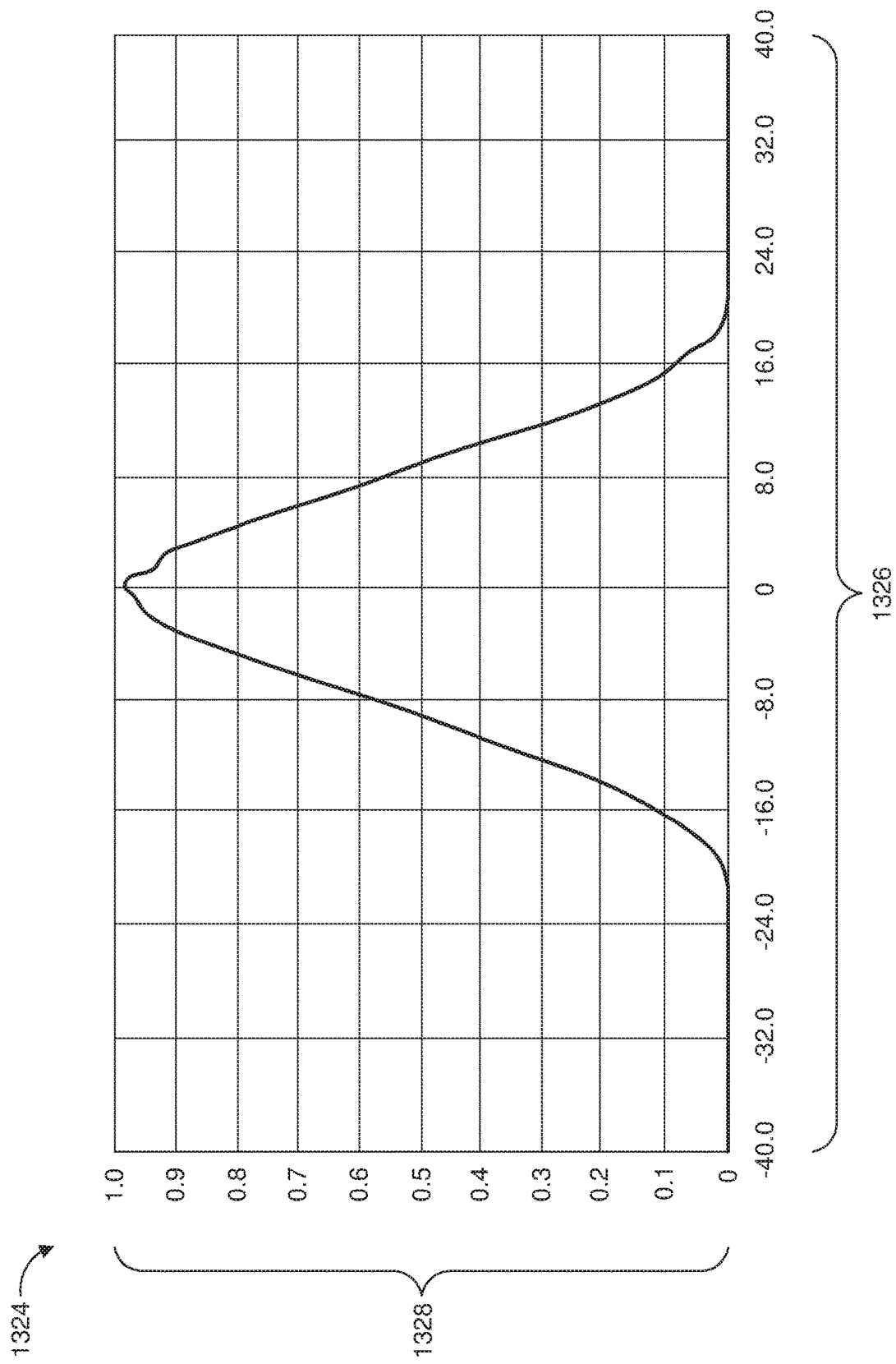
FIGS. 13D-13F are graphs of incoherent irradiance (respectively) for example red, green, and blue light sources without a diffuser for a horizontal cross section according to some embodiments.
Figure 13E:
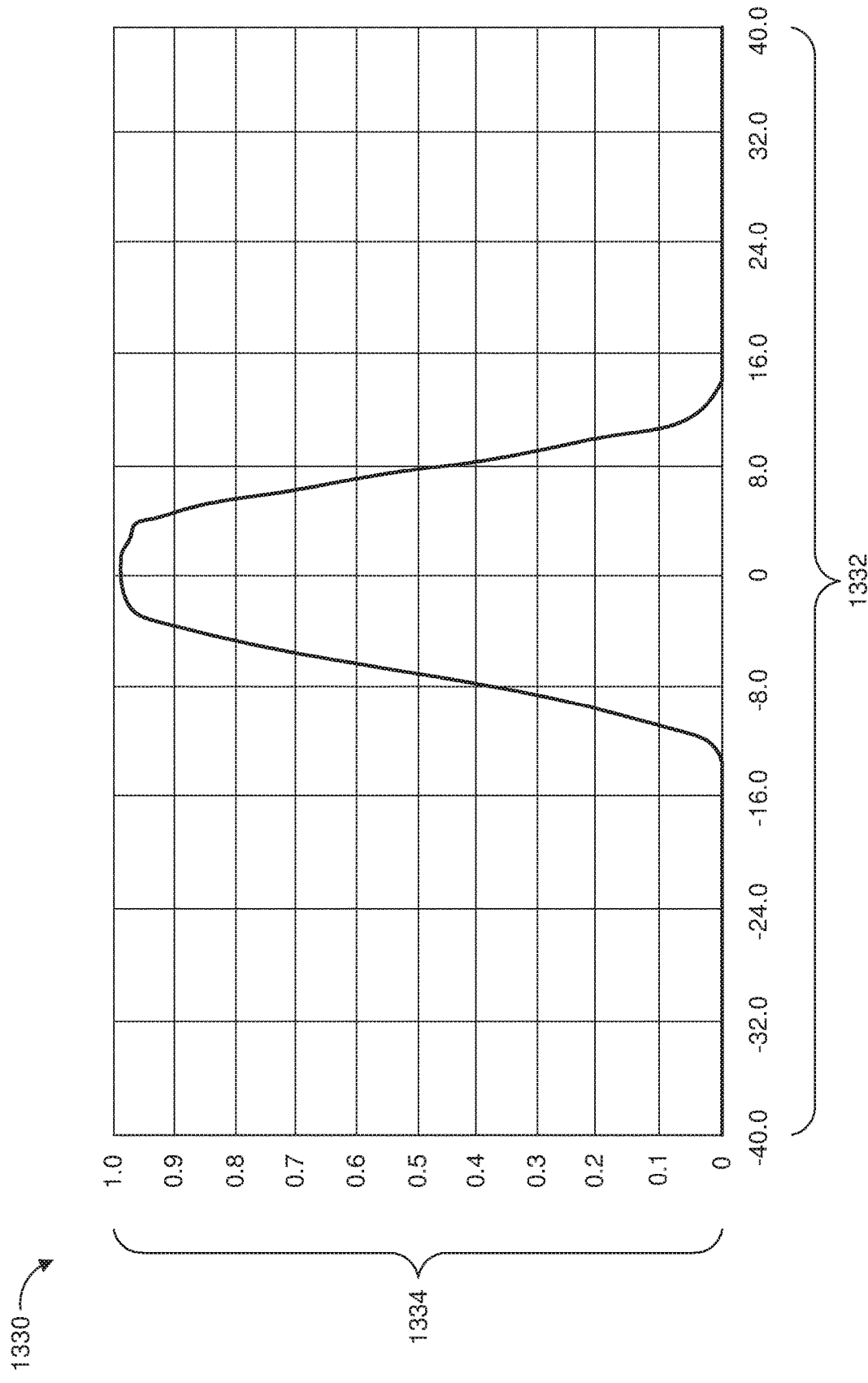
Figure 13F:
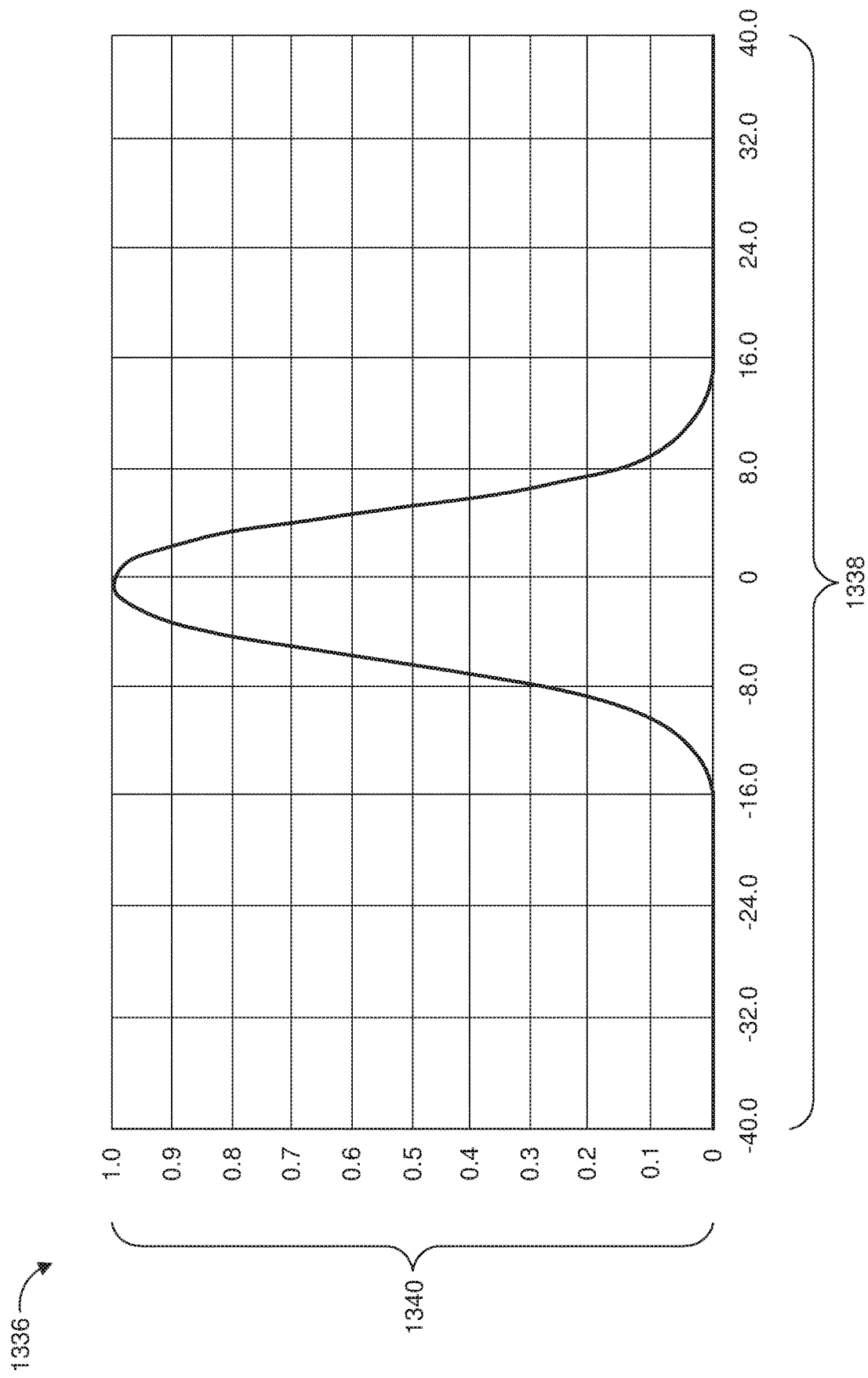

FIGS. 13D-13F are graphs of incoherent irradiance (respectively) for example red, green, and blue light sources without a diffuser for a horizontal cross section according to some embodiments. FIG. 13D shows a graph 1324 of incoherent irradiance 1328 vs. x-coordinate value 1326 for a red light source without a diffuser centered at x=0. FIG. 13E shows a graph 1330 of incoherent irradiance 1334 vs. x-coordinate value 1332 for a green light source without a diffuser centered at x=0. FIG. 13F shows a graph 1336 of incoherent irradiance 1340 vs. x-coordinate value 1338 for a blue light source without a diffuser centered at x=0.

FIGS. 13A-13C show that the rectangular sources are imaged to the viewing distance as roughly rectangular spots with somewhat blurred edges. The amount of blurring may depend on the source color as color aberrations become more visible in a non-color-corrected microlens. The clearest image is obtained with the central wavelength of green color. The different color spot sizes are different from each other due to the unequal component sizes and also due to the color dispersion. For some embodiments, the diffuser sheet may be used to make the spots sizes more even and to modify the spot intensity profile from a top-hat-type distribution to a distribution closer to a Gaussian distribution, in which shapes may be combined much better for a uniform total illumination distribution. Without a diffuser, the MDP image may be lost or have a lower light intensity level between the spots because the distribution may have gaps between the beams.

Figure 13G:
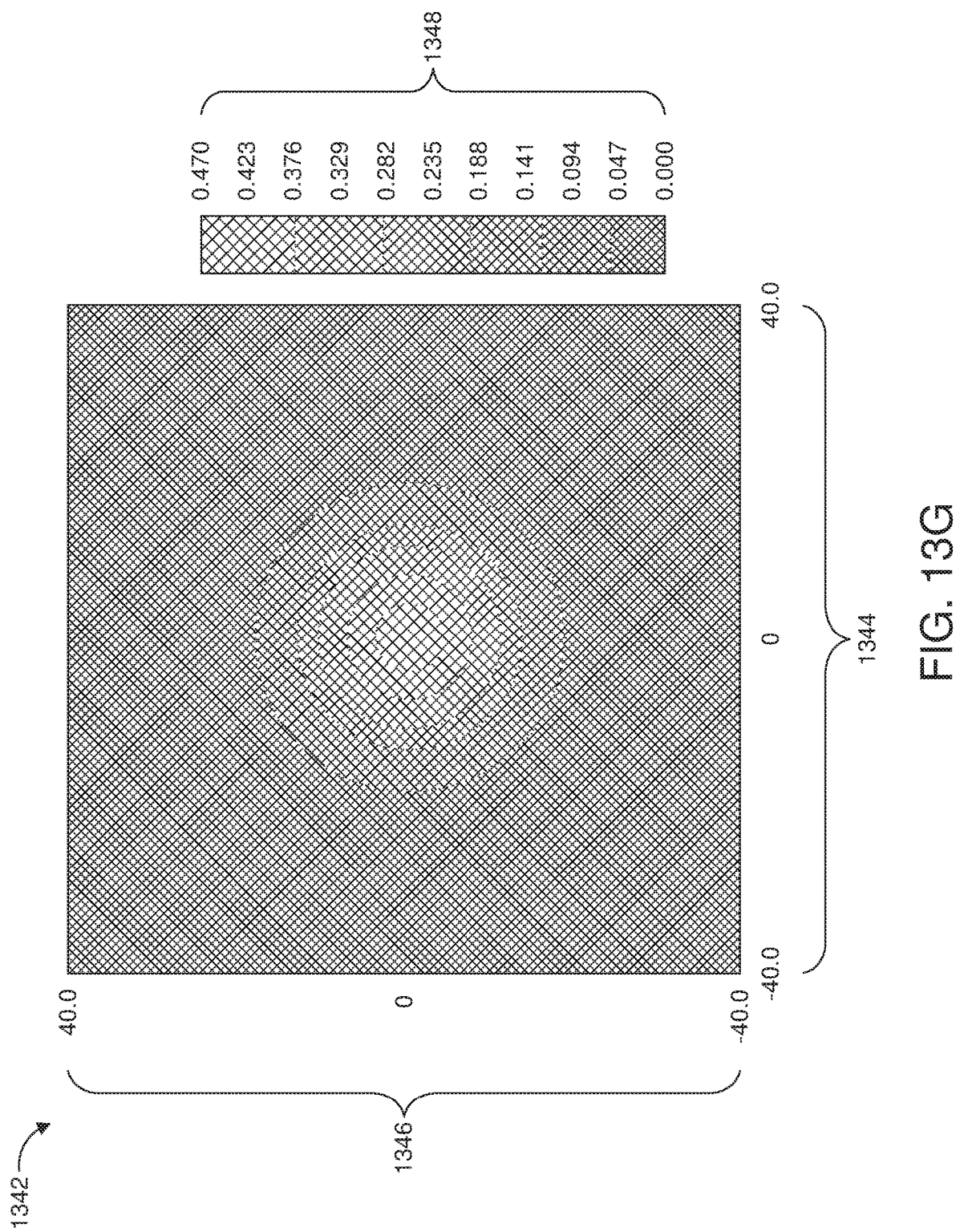
FIGS. 13G-13I are graphs of incoherent irradiance (respectively) for example red, green, and blue light sources with a diffuser according to some embodiments.
Figure 13H:
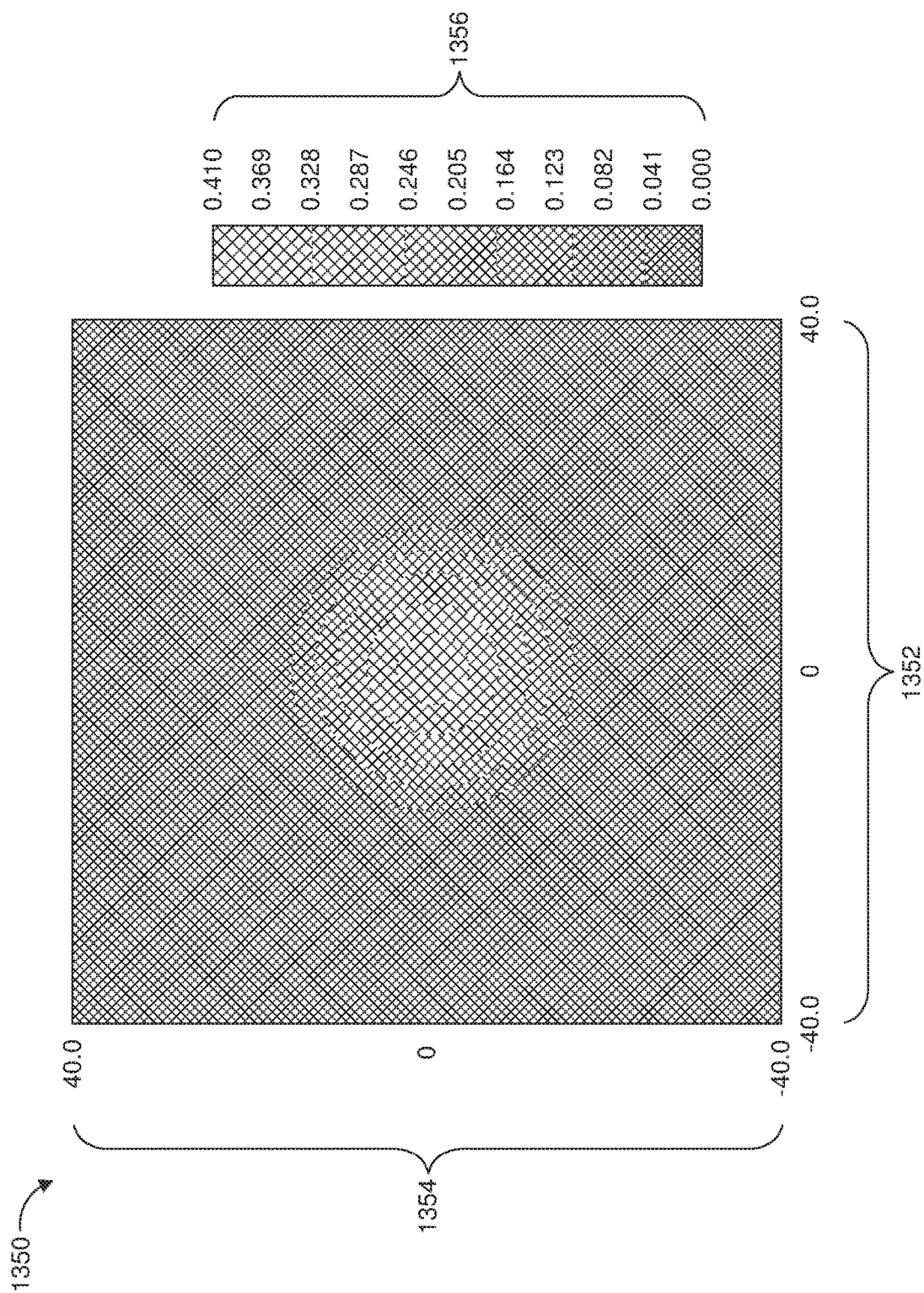
Figure 13I:
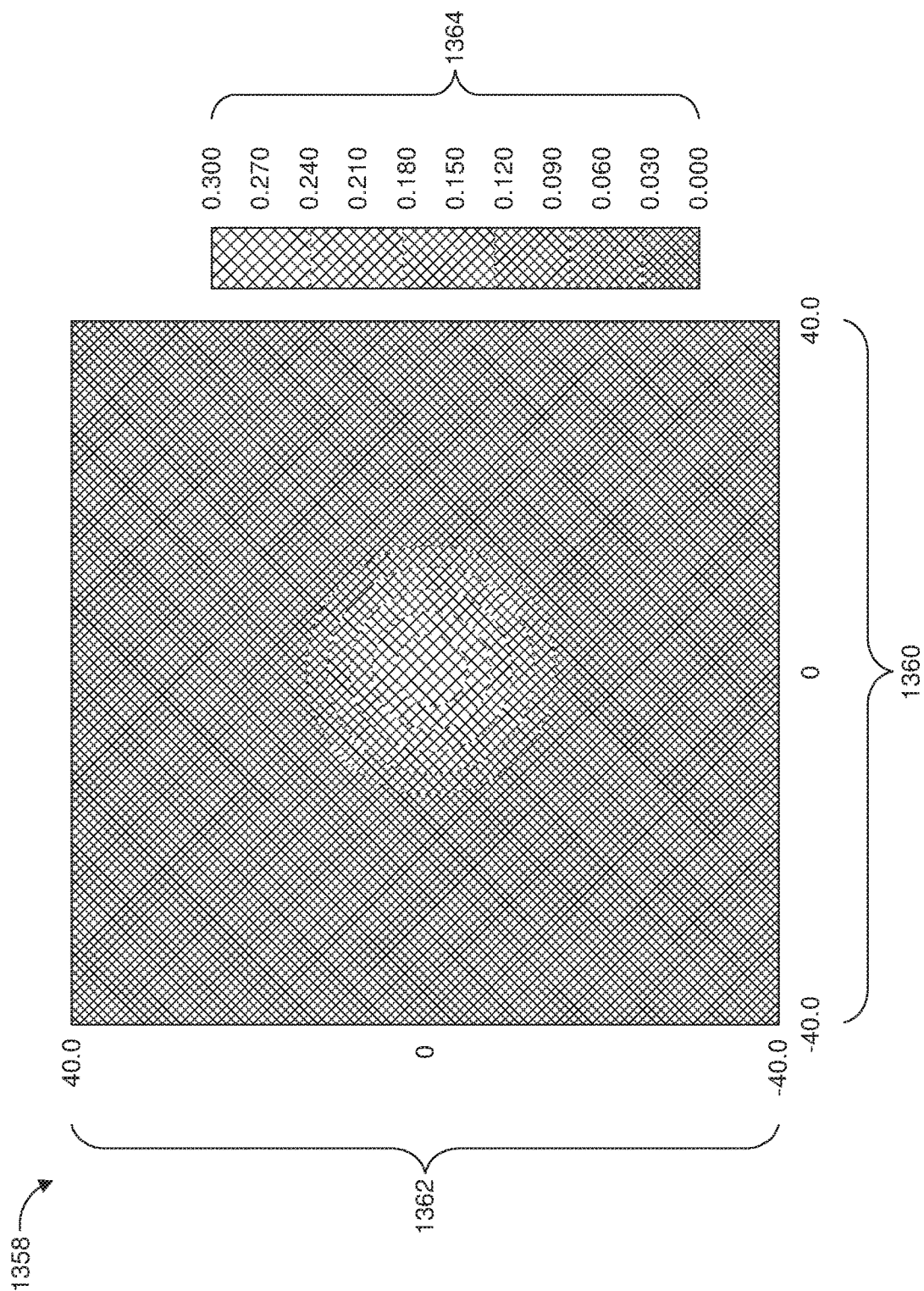

FIGS. 13G-13I are graphs of incoherent irradiance (respectively) for example red, green, and blue light sources with a diffuser according to some embodiments. FIG. 13G shows a graph 1342 of incoherent irradiance 1348 for a red light source with a diffuser centered at (0,0) in an x-coordinate value 1344 and y-coordinate value 1346 spatial environment. FIG. 13H shows a graph 1350 of incoherent irradiance 1356 for a green light source with a diffuser centered at (0,0) in an x-coordinate value 1352 and y-coordinate value 1354 spatial environment. FIG. 13I shows a graph 1358 of incoherent irradiance 1364 for a blue light source with a diffuser centered at (0,0) in an x-coordinate value 1360 and y-coordinate value 1362 spatial environment.

Figure 13J:
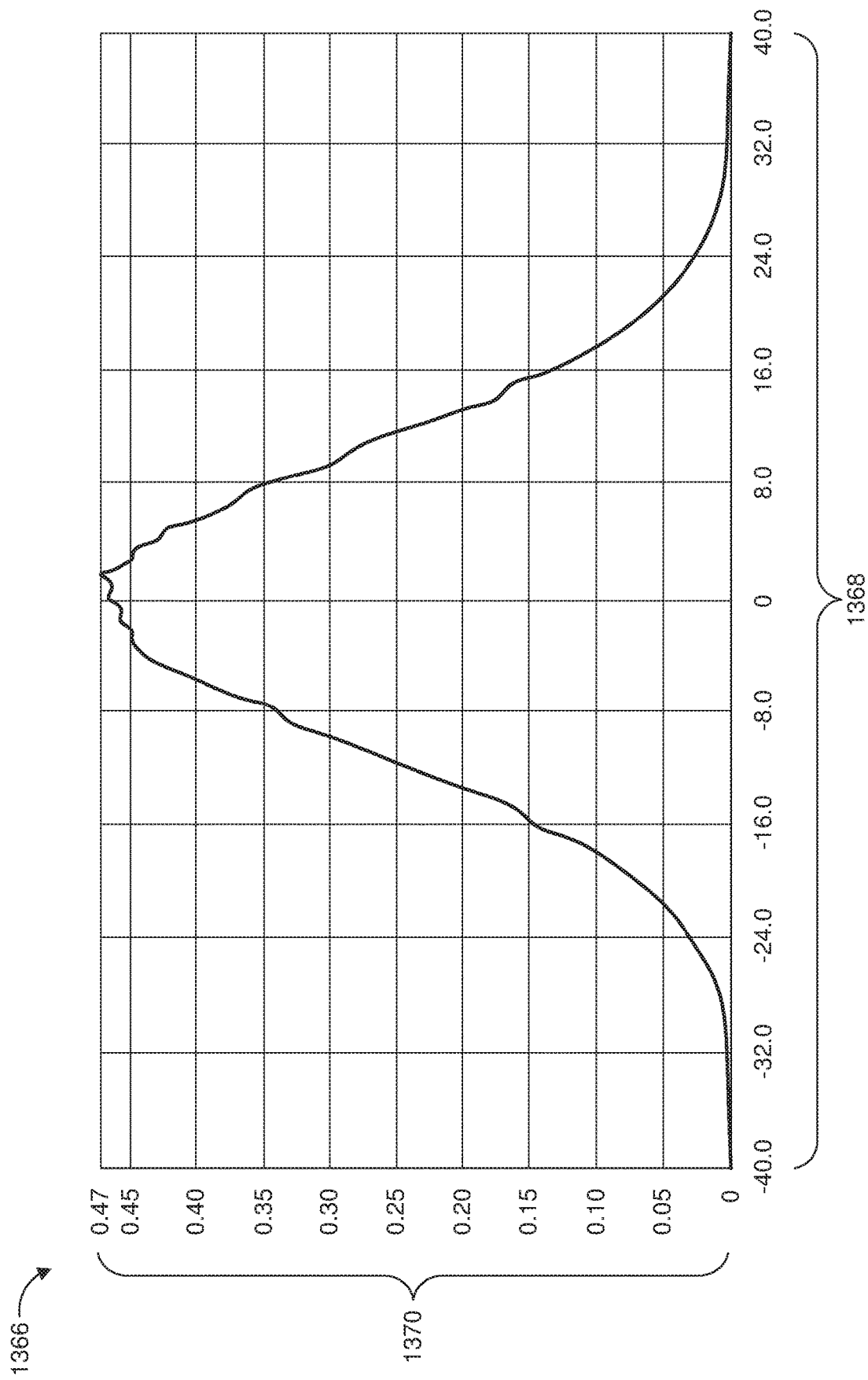
FIGS. 13J-13L are graphs of incoherent irradiance (respectively) for example red, green, and blue light sources with a diffuser for a horizontal cross section according to some embodiments.
Figure 13K:
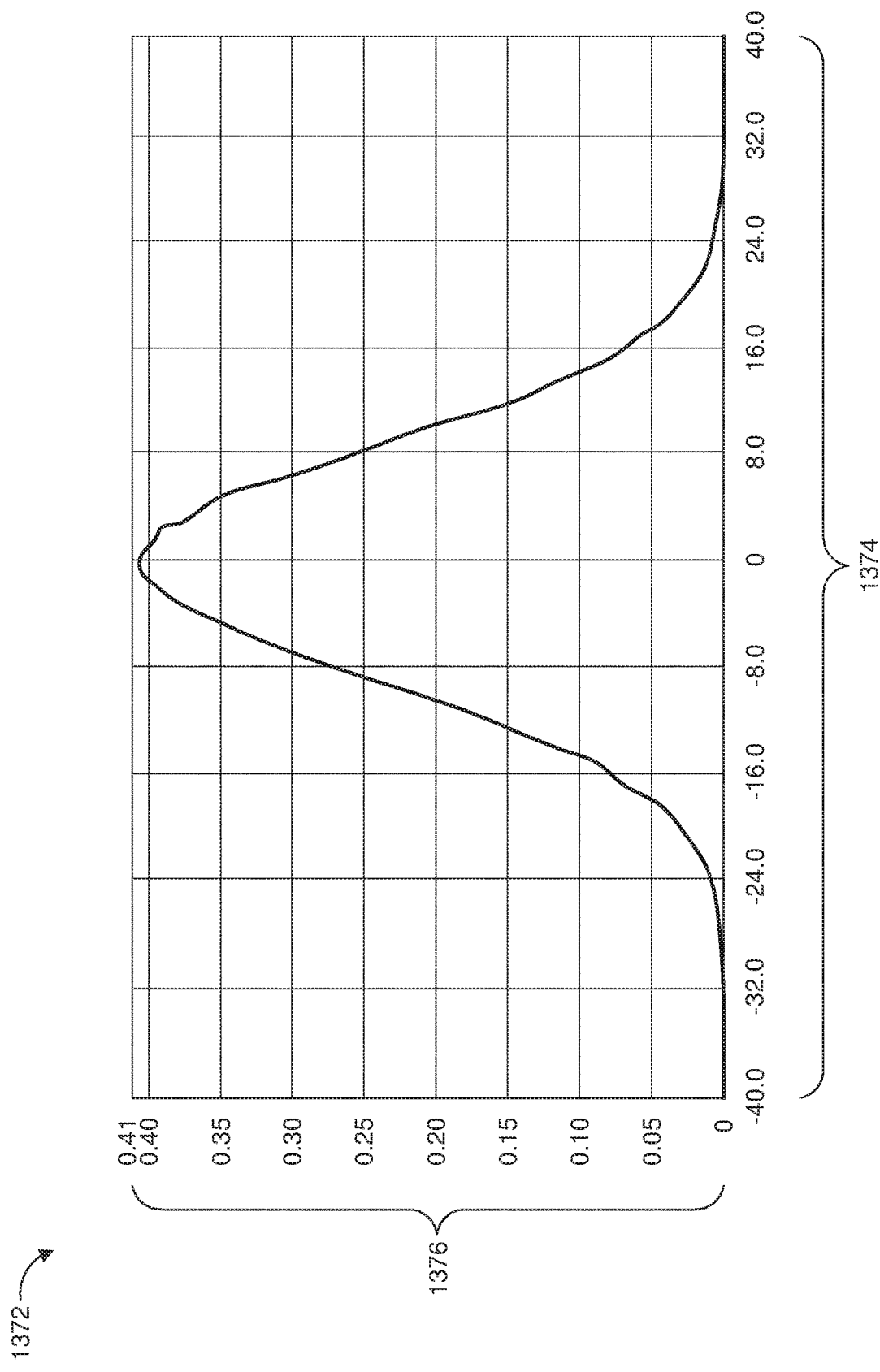
Figure 13L:
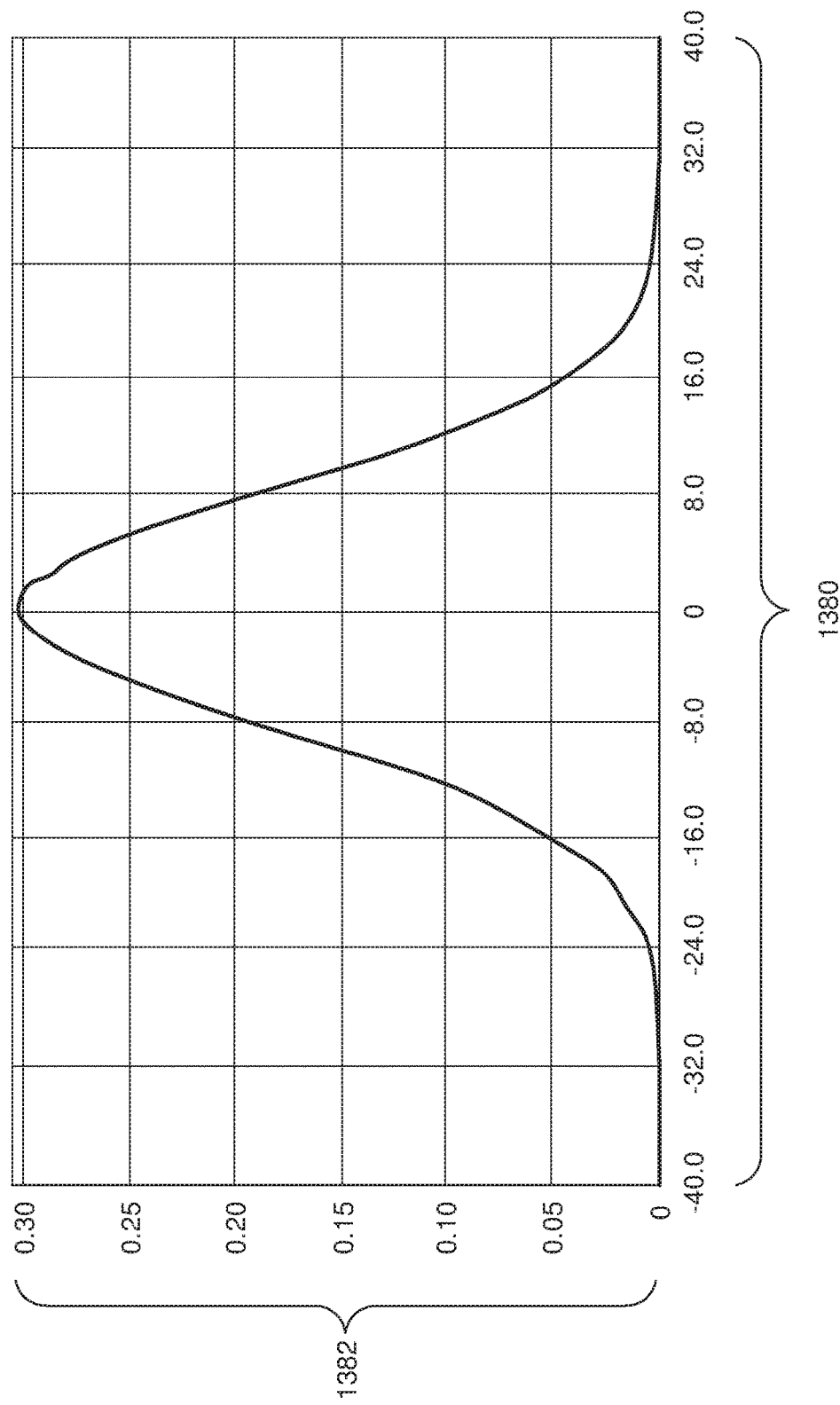

FIGS. 13J-13L are graphs of incoherent irradiance (respectively) for example red, green, and blue light sources with a diffuser for a horizontal cross section according to some embodiments. FIG. 13J shows a graph 1366 of incoherent irradiance 1370 vs. x-coordinate value 1368 for a red light source with a diffuser centered at x=0. FIG. 13K shows a graph 1372 of incoherent irradiance 1376 vs. x-coordinate value 1374 for a green light source with a diffuser centered at x=0. FIG. 13L shows a graph 1378 of incoherent irradiance 1382 vs. x-coordinate value 1380 for a blue light source with a diffuser centered at x=0.

FIGS. 13G-13L show that, with a diffuser, the spot sizes and shapes are more uniform across all three colors. For some embodiments, the diffuser may not increase the beam divergence (or, for some embodiments, may increase the beam divergence by only a small amount) so that the spot size at the viewing distance is below ~50 mm diameter in order to keep the single pixel FOV limited to one eye at a time. For some embodiments, this value has been reached with a 1° diffuser and designed component sizes.

FIGS. 14A-14H show the simulated irradiance distributions obtained with one projector cell and three pairs of red, green and blue µLEDs. For this simulation, the red component pair was placed 0.02 mm below the projector cell center point and blue component pair 0.02 mm above it. With these off-axis locations, the resulting horizontal beam spot series became separated from each other by ~40 mm at the 1 m viewing distance in the vertical direction.

Figure 14A:
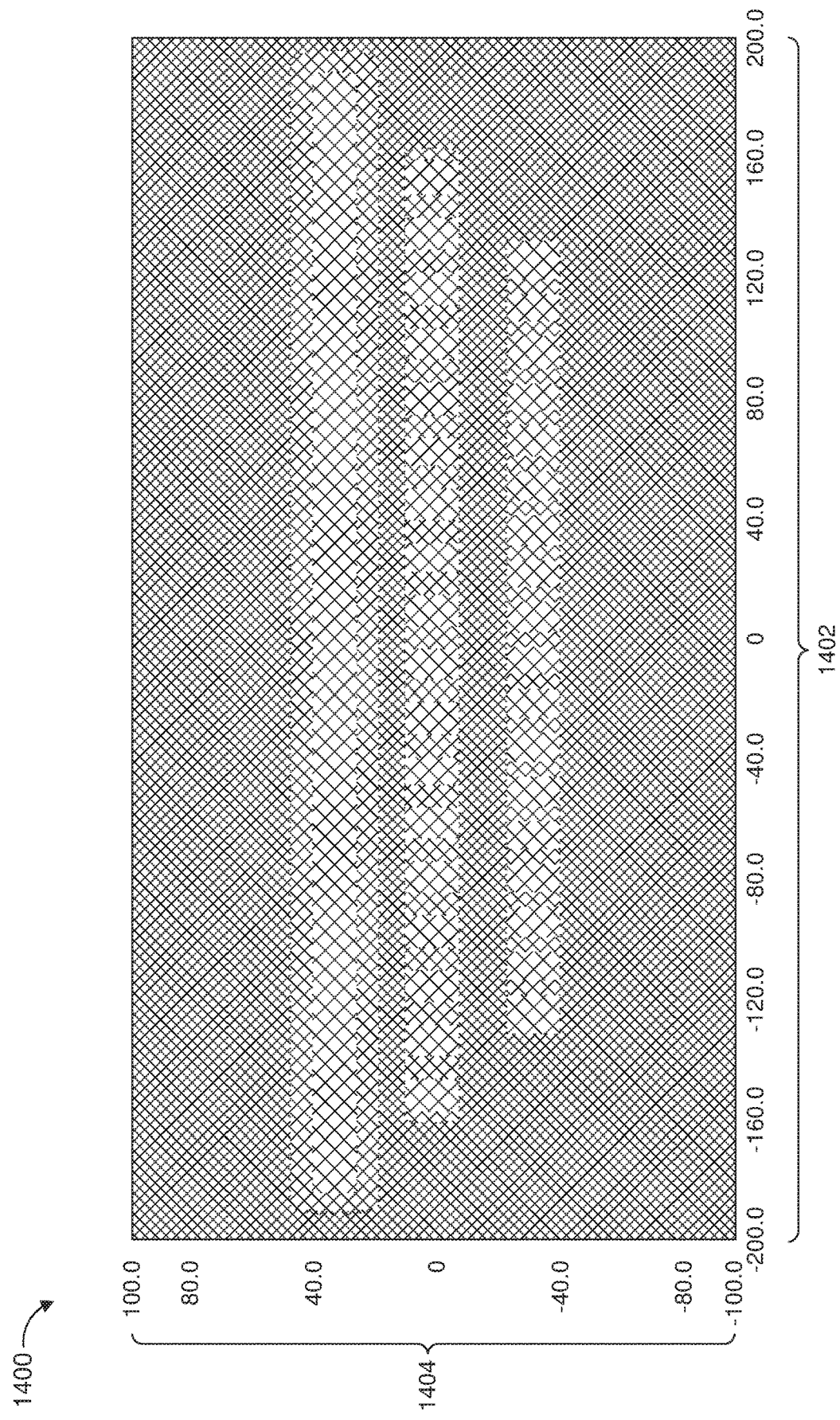
FIG. 14A is a graph of incoherent irradiance for example red, green, and blue light sources without a diffuser according to some embodiments.

FIG. 14A is a graph of incoherent irradiance for example red, green, and blue light sources without a diffuser according to some embodiments. FIG. 14A shows a graph 1400 of a distribution without a front diffuser in an x-coordinate value 1402 and y-coordinate value 1404 spatial environment. In FIG. 14A, the top line series of illuminated spots was formed with a red µLED pair. The middle line series of illuminated spots was created with a green µLED pair. The bottom line of illuminated spots was generated with a blue µLED pair. The graph shows that the beams are separated by equal amounts from each other at the viewing distance of 1000 m.

Figure 14B:
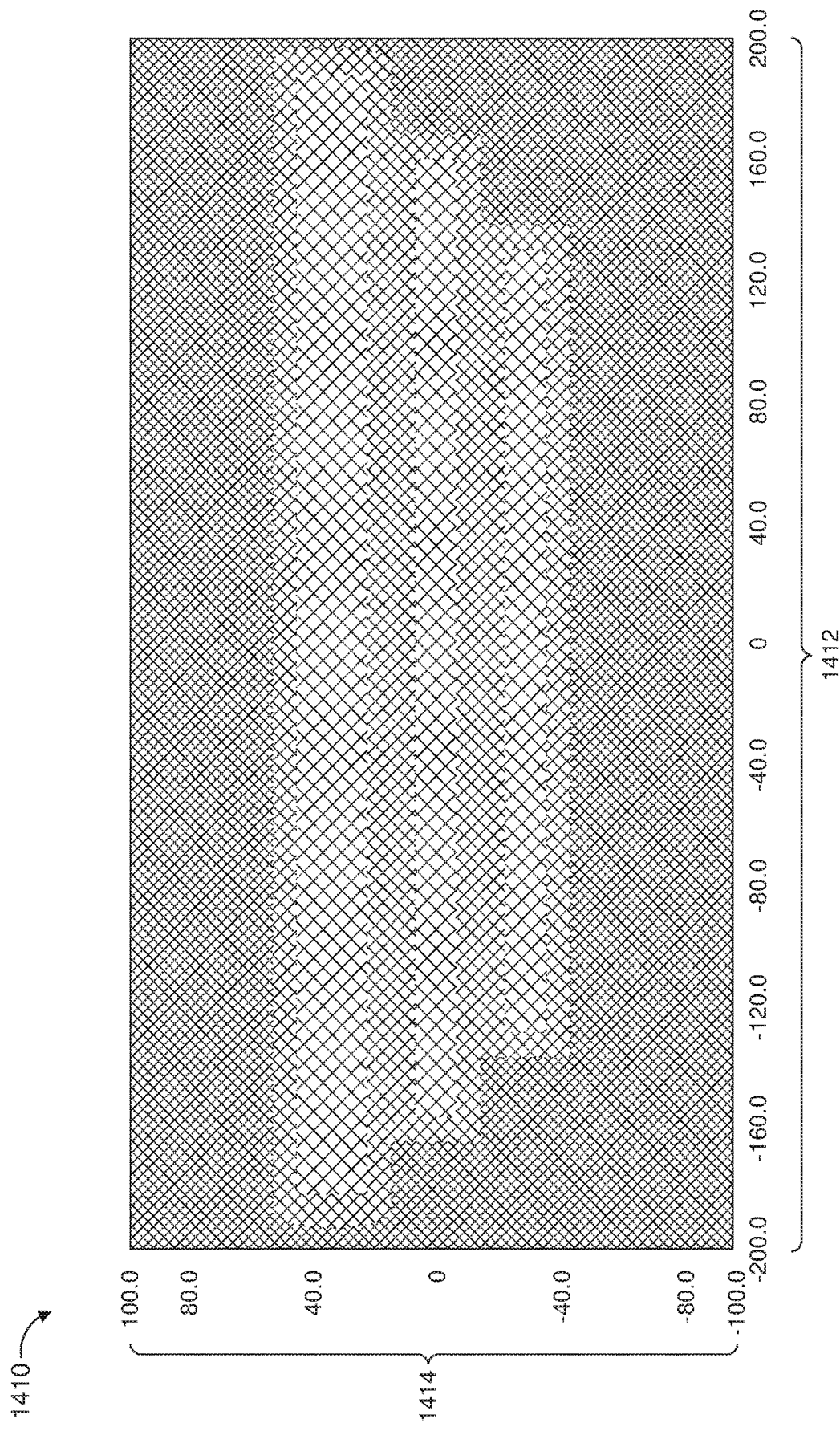
FIG. 14B is a graph of incoherent irradiance for example red, green, and blue light sources with a diffuser according to some embodiments.

FIG. 14B is a graph of incoherent irradiance for example red, green, and blue light sources with a diffuser according to some embodiments. FIG. 14B shows a graph 1410 of a distribution with a beam spreading diffuser in an x-coordinate value 1412 and y-coordinate value 1414 spatial environment. Now the separate spots are fused together, and FIG. 14B confirms that the total intensity distributions are quite even.

Figure 14C:
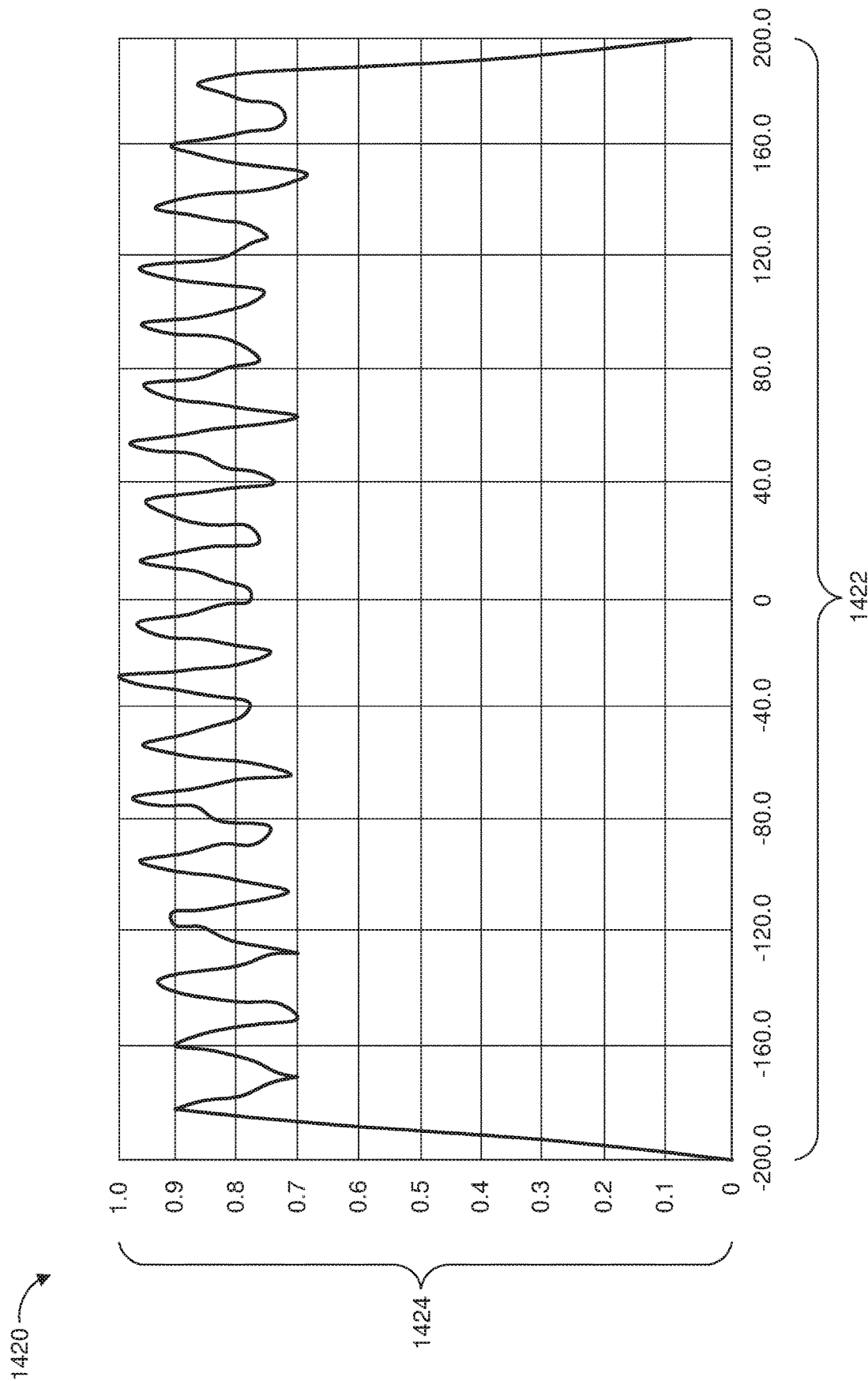
FIGS. 14C-14E are graphs of incoherent irradiance (respectively) for example red, green, and blue light sources without a diffuser for a horizontal cross section according to some embodiments.
Figure 14D:
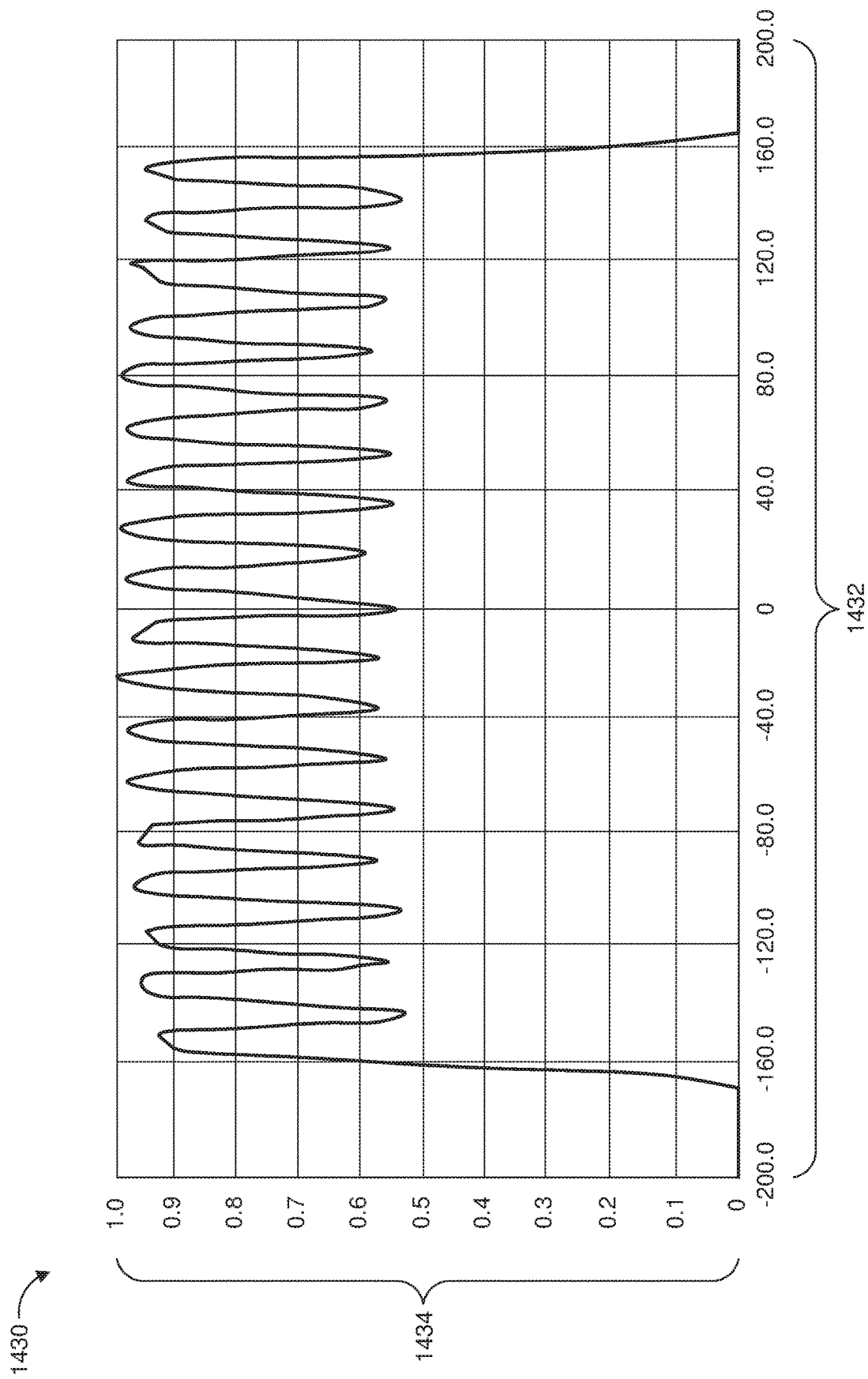
Figure 14E:
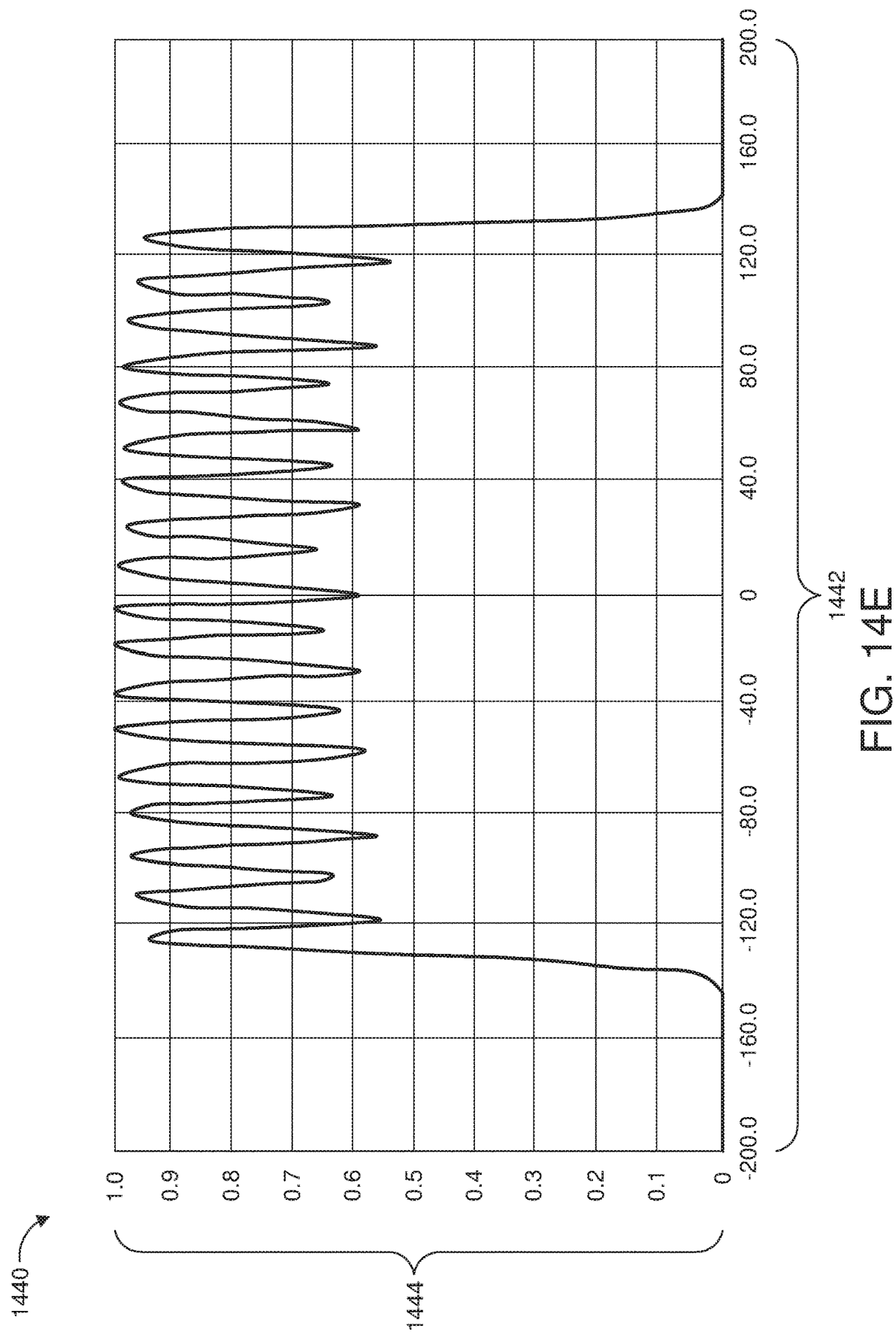

FIGS. 14C-14E are graphs of incoherent irradiance (respectively) for example red, green, and blue light sources without a diffuser for a horizontal cross section according to some embodiments. FIG. 14C shows a graph 1420 of incoherent irradiance 1424 vs. x-coordinate value 1422 for a line of red µLED pairs without a diffuser. FIG. 14D shows a graph 1430 of incoherent irradiance 1434 vs. x-coordinate value 1432 for a line of green µLED pairs without a diffuser. FIG. 14E shows a graph 1440 of incoherent irradiance 1444 vs. x-coordinate value 1442 for a line of blue µLED pairs without a diffuser. FIGS. 14C-14E show 18 beam peaks that correlate to 18 µLEDs for each color for a horizontal cross section.

Figure 14F:
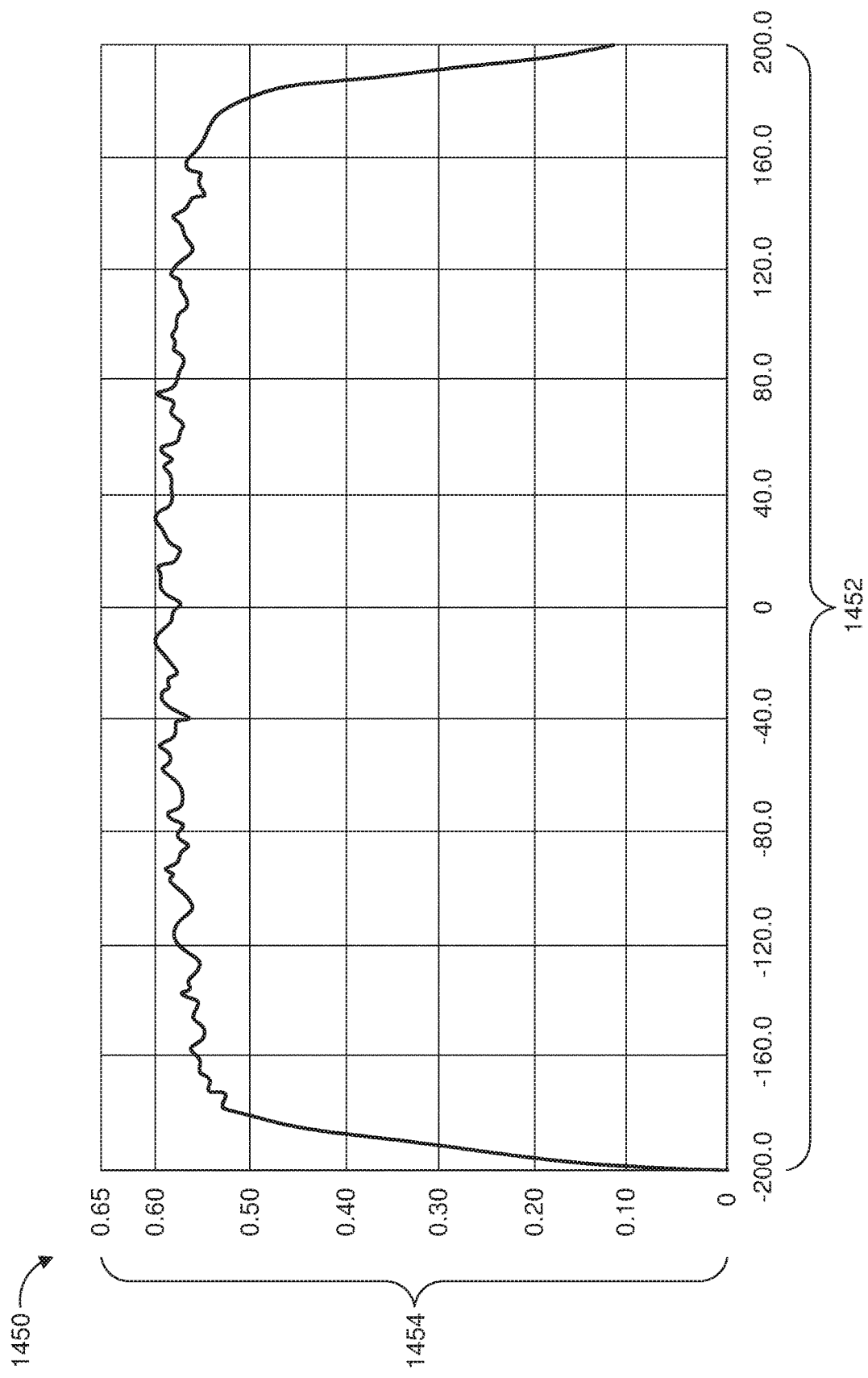
FIGS. 14F-14H are graphs of incoherent irradiance (respectively) for example red, green, and blue light sources with a diffuser for a horizontal cross section according to some embodiments.
Figure 14G:
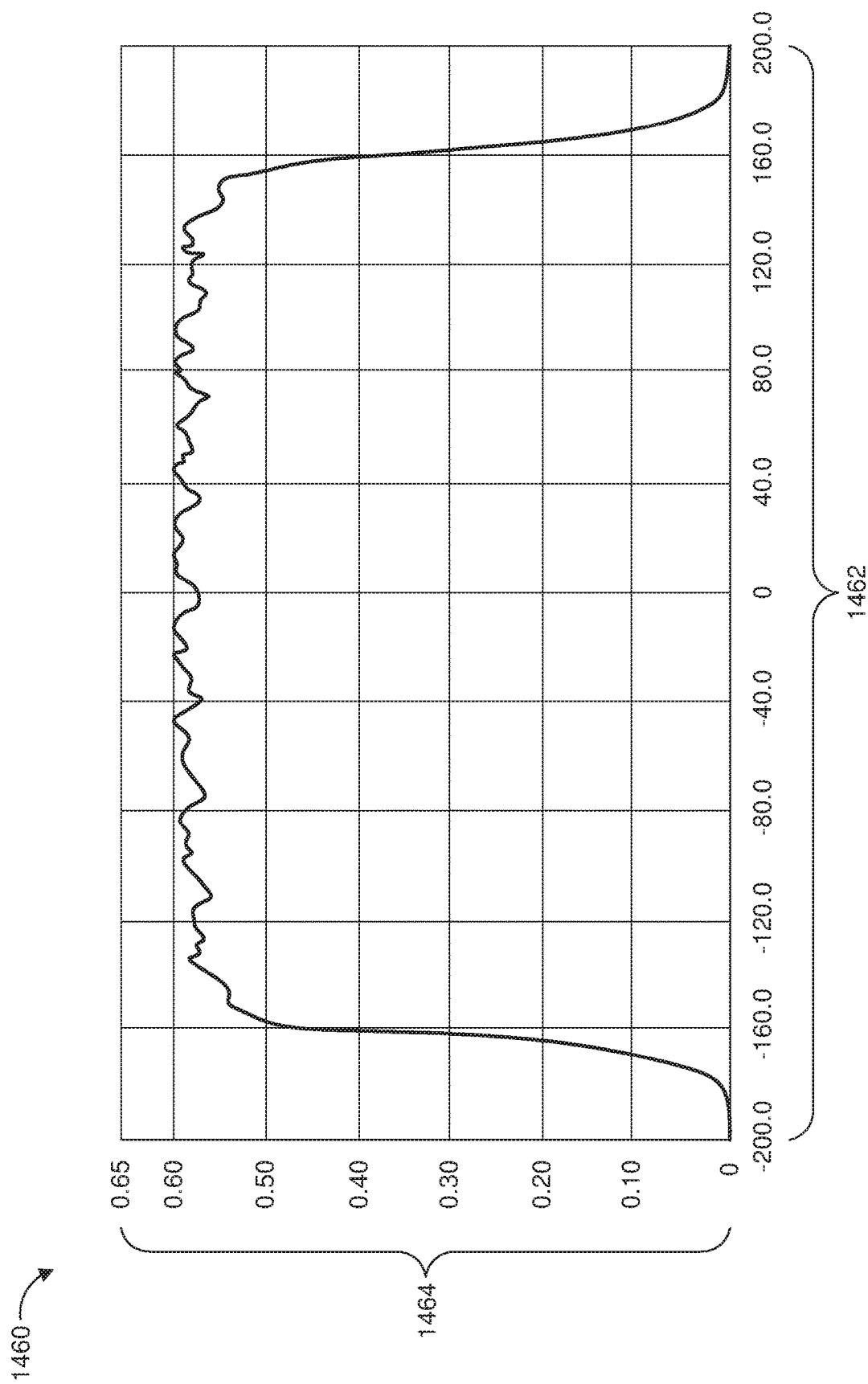
Figure 14H:
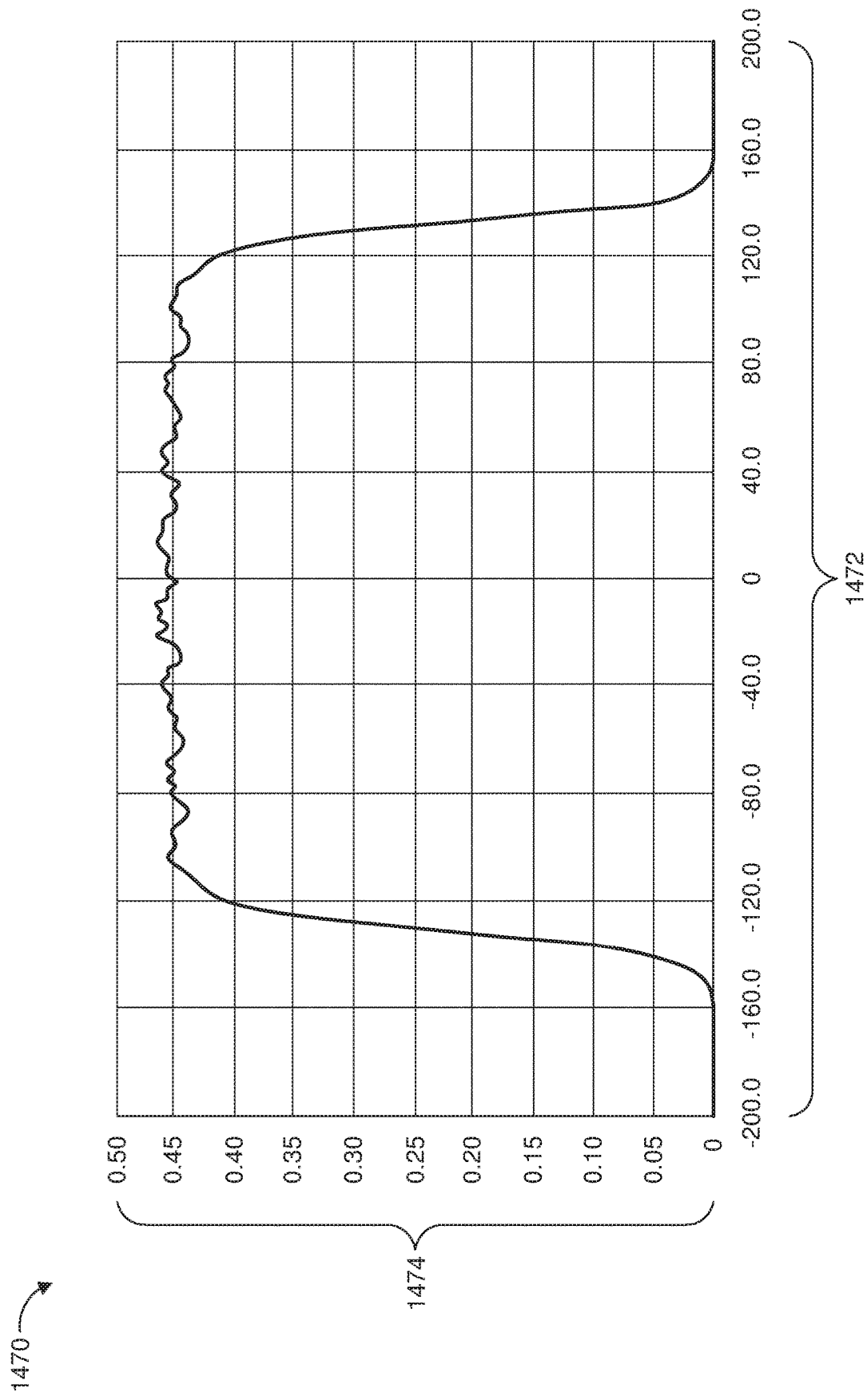

FIGS. 14F-14H are graphs of incoherent irradiance (respectively) for example red, green, and blue light sources with a diffuser for a horizontal cross section according to some embodiments. FIG. 14F shows a graph 1450 of incoherent irradiance 1454 vs. x-coordinate value 1452 for a line of red µLED pairs with a diffuser. FIG. 14G shows a graph 1460 of incoherent irradiance 1464 vs. x-coordinate value 1462 for a line of green µLED pairs with a diffuser. FIG. 14H shows a graph 1470 of incoherent irradiance 1474 vs. x-coordinate value 1472 for a line of blue µLED pairs with a diffuser. FIGS. 14F-14H show that the 18 beam peaks that are partially fused together depending on the component color used. This picture also shows clearly the different widths (FOV) of the different color beam bundles.

Figure 15A:
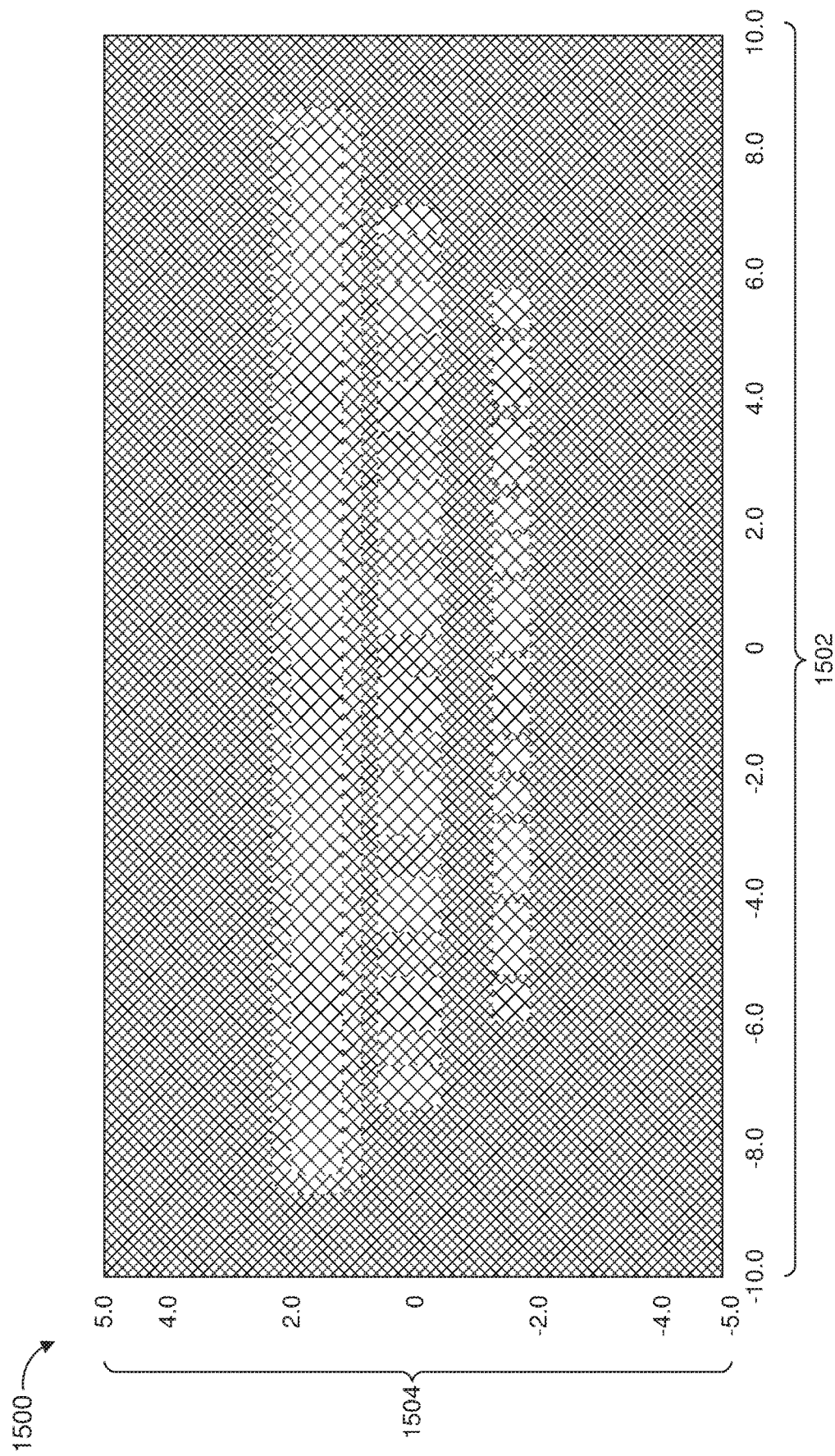
FIG. 15A is a graph of incoherent irradiance for example red, green, and blue µLED light source pairs according to some embodiments.

FIGS. 15A-15H show illumination distributions obtained with one projector cell on the LCD surface. FIG. 15A is a graph of incoherent irradiance for example red, green, and blue µLED light source pairs according to some embodiments. FIG. 15A shows a graph 1500 of a distribution in an x-coordinate value 1502 and y-coordinate value 1504 spatial environment. In FIG. 15A, the top line series of illuminated spots was formed with red µLED pairs. The middle line series of illuminated spots was created with green µLED pairs. The bottom line of illuminated spots was generated with blue µLED pairs. FIG. 15A shows the resulting spots if pairs of µLEDs are used for each color. Comparing FIG. 15A with FIG. 14A shows that the near-field distribution of FIG. 15A may not be as even as the far-field distribution of FIG. 14A. Because some of the spots overlap at the LCD surface (FIG. 15A), an SLM mask may be unable to selectively block all beam directions if both µLEDs in the pair are used.

Figure 15B:
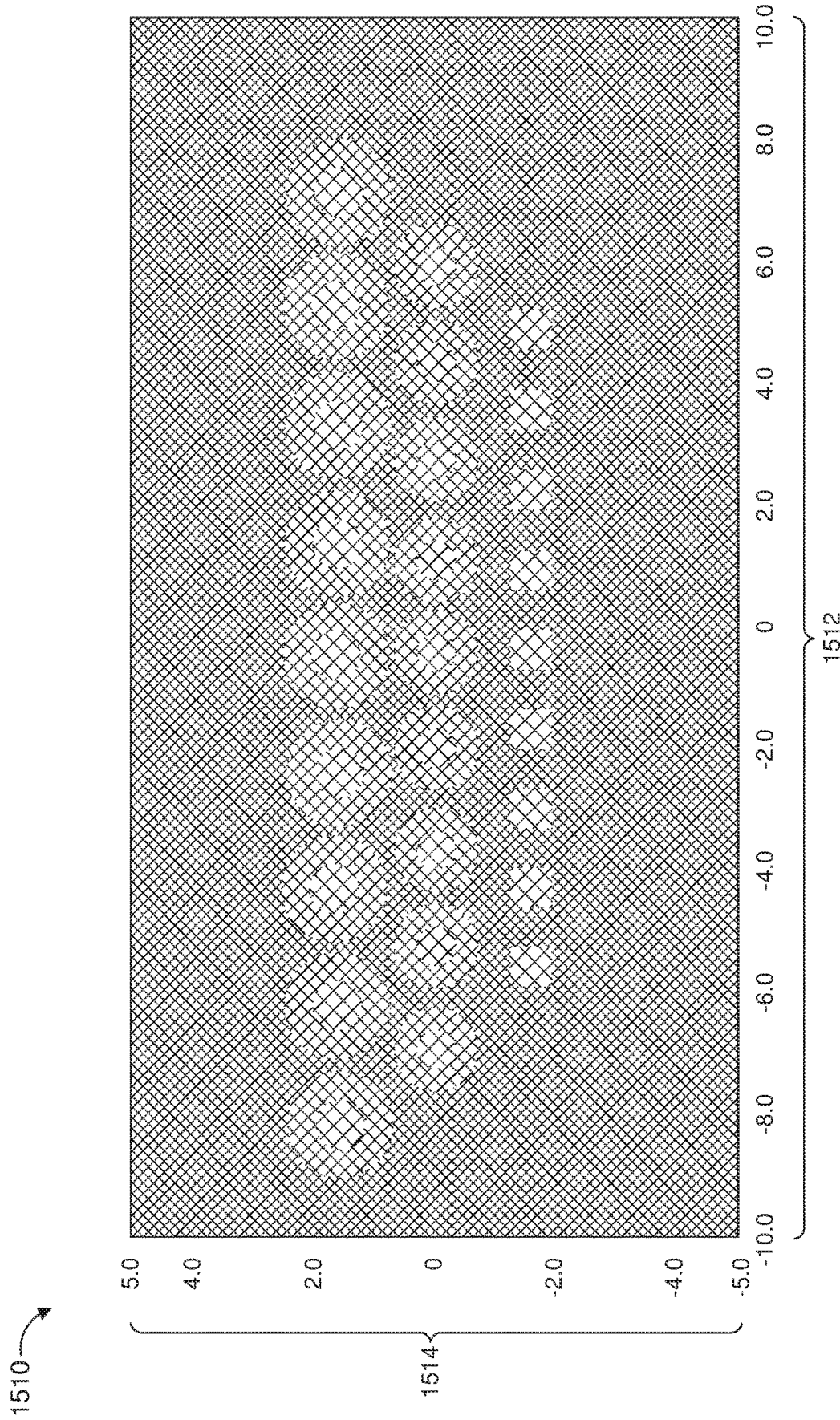
FIG. 15B is a graph of incoherent irradiance for example red, green, and blue single µLED light sources according to some embodiments.

FIG. 15B is a graph of incoherent irradiance for example red, green, and blue single µLED light sources according to some embodiments. FIG. 15B shows a graph 1510 of a distribution in an x-coordinate value 1512 and y-coordinate value 1514 spatial environment. In FIG. 15B, the top line series of illuminated spots was formed with single red µLEDs. The middle line series of illuminated spots was created with single green µLEDs. The bottom line of illuminated spots was generated with single blue µLEDs. FIG. 15B shows the distributions if only one µLED for each color is activated. If only one µLED for each color is used at one point in time, the directional beam spots may become separated and may be blocked by an LCD mask. This phenomenon may be a benefit of using a µLED pair. The distributions show that the separate spots are between 0.5-0.75 mm in size at the LCD distance and groups of 4-9 pixels may be used for blocking the light beams.

Figure 15C:
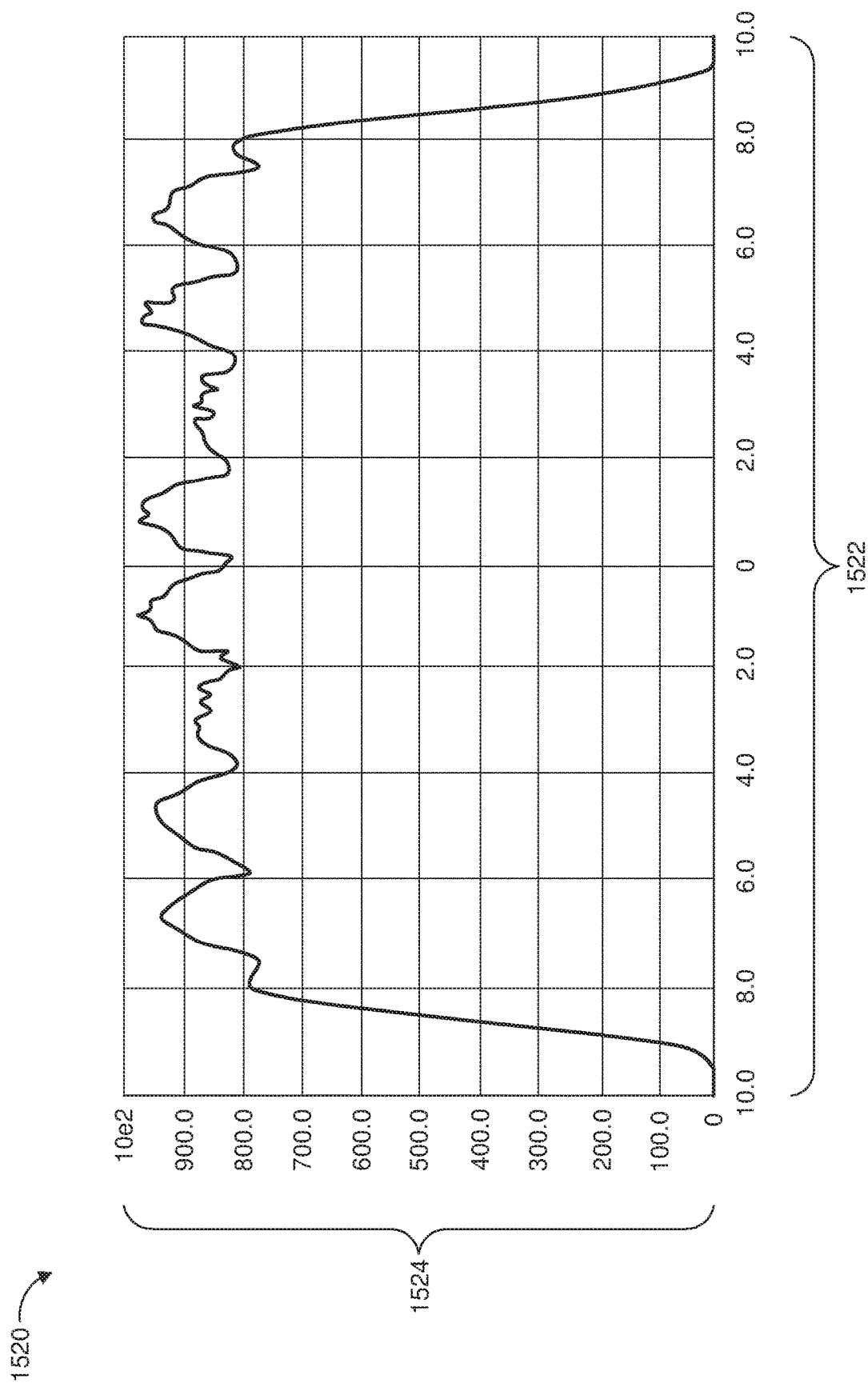
FIGS. 15C-15E are graphs of incoherent irradiance (respectively) for example red, green, and blue µLED light source pairs for a horizontal cross section according to some embodiments.
Figure 15D:
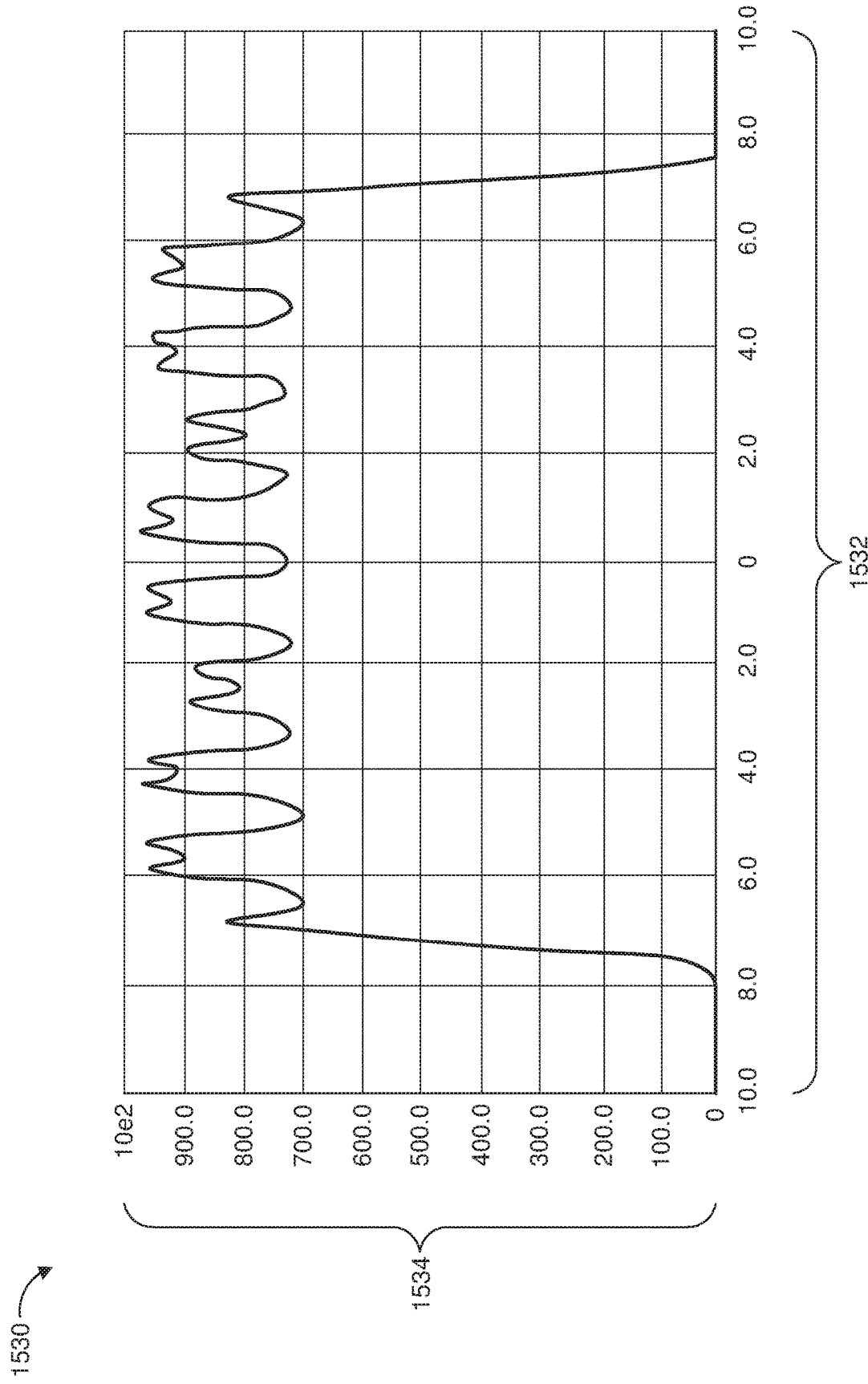
Figure 15E:
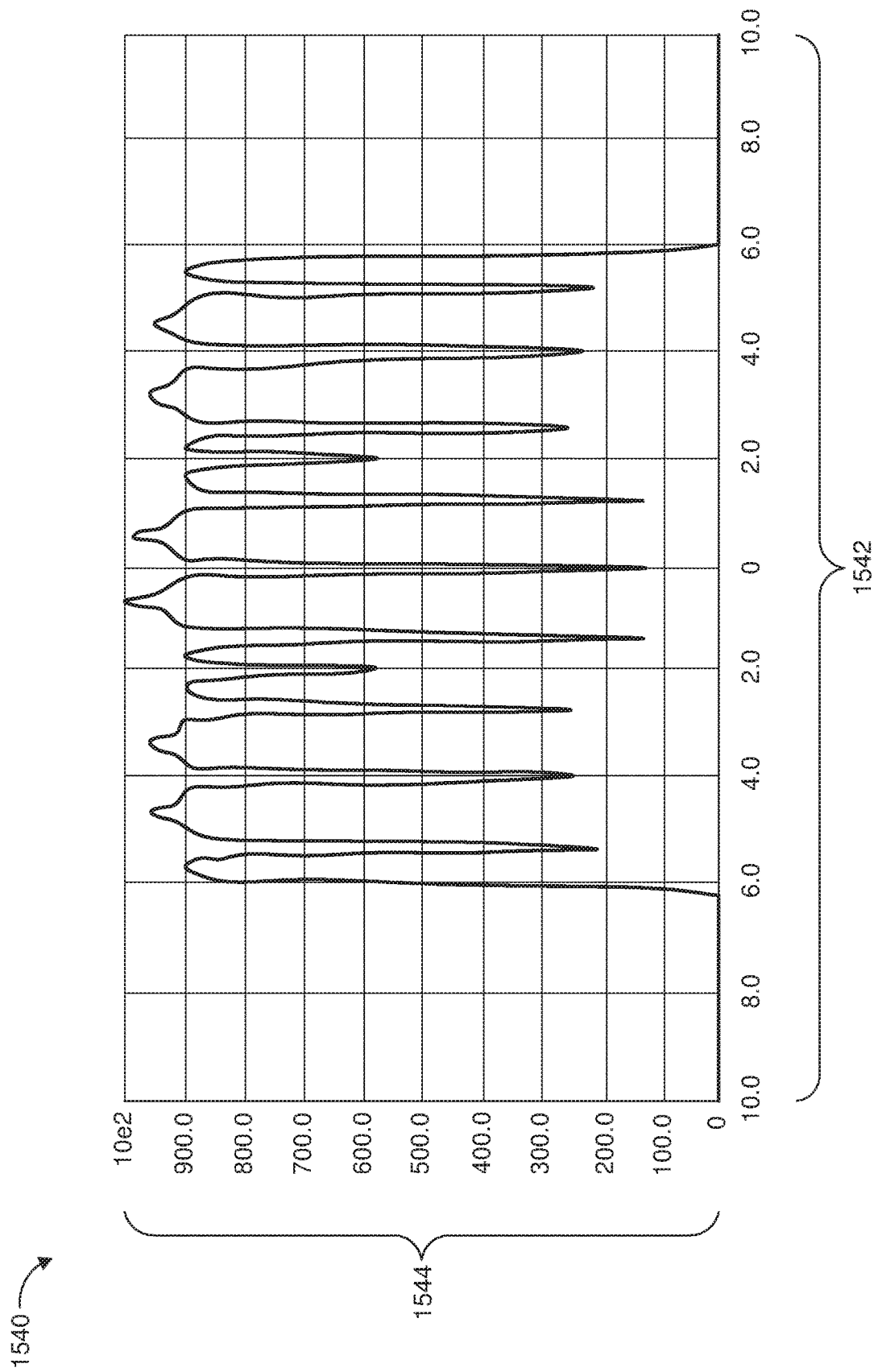

FIGS. 15C-15E are graphs of incoherent irradiance (respectively) for example red, green, and blue µLED light source pairs for a horizontal cross section according to some embodiments. FIG. 15C shows a graph 1520 of incoherent irradiance 1524 vs. x-coordinate value 1522 for a line of red µLED pairs. FIG. 15D shows a graph 1530 of incoherent irradiance 1534 vs. x-coordinate value 1532 for a line of green µLED pairs. FIG. 15E shows a graph 1540 of incoherent irradiance 1544 vs. x-coordinate value 1542 for a line of blue LED pairs.

Figure 15F:
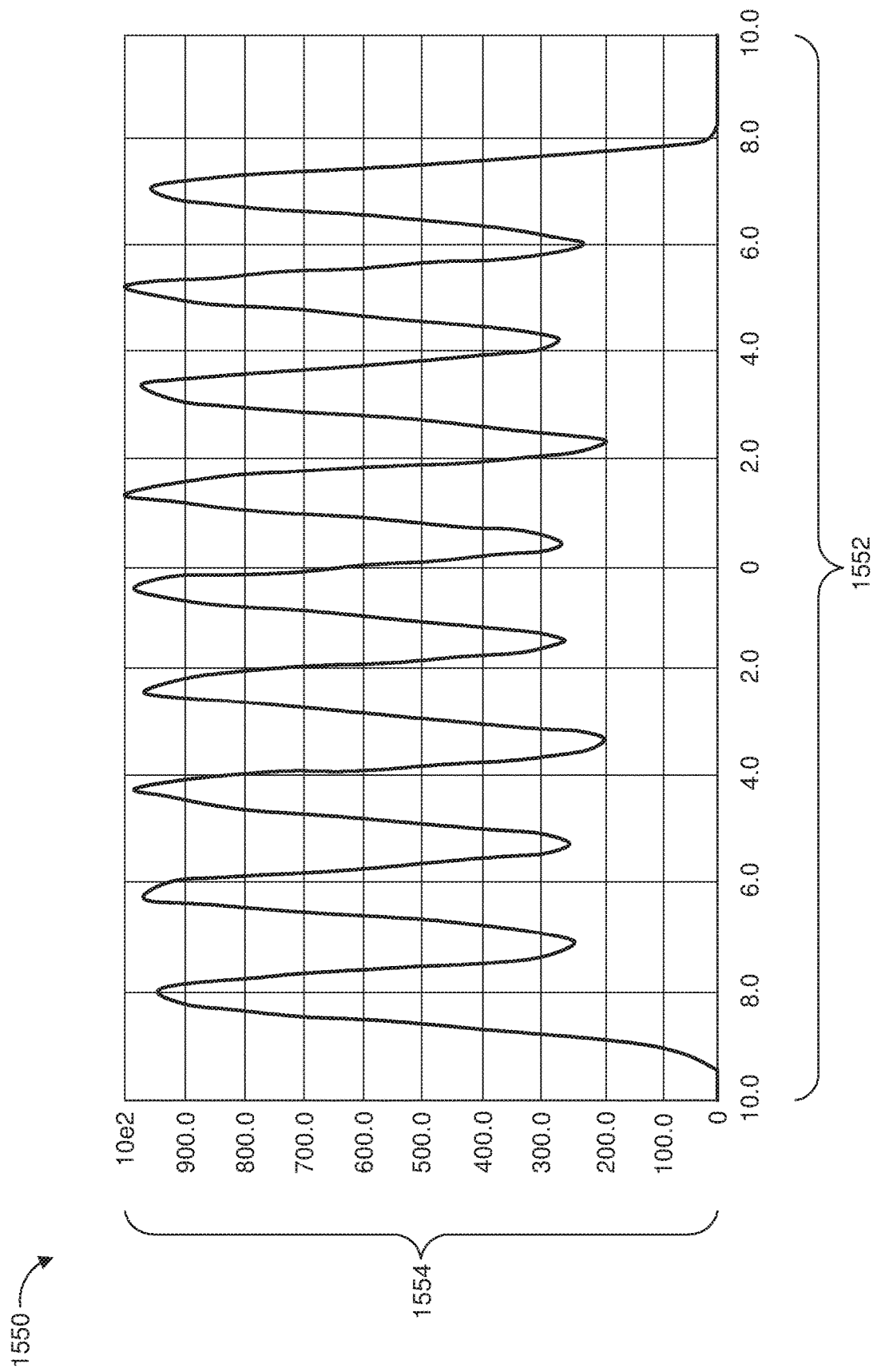
FIGS. 15F-15H are graphs of incoherent irradiance (respectively) for example red, green, and blue single µLED light sources according to some embodiments.
Figure 15G:
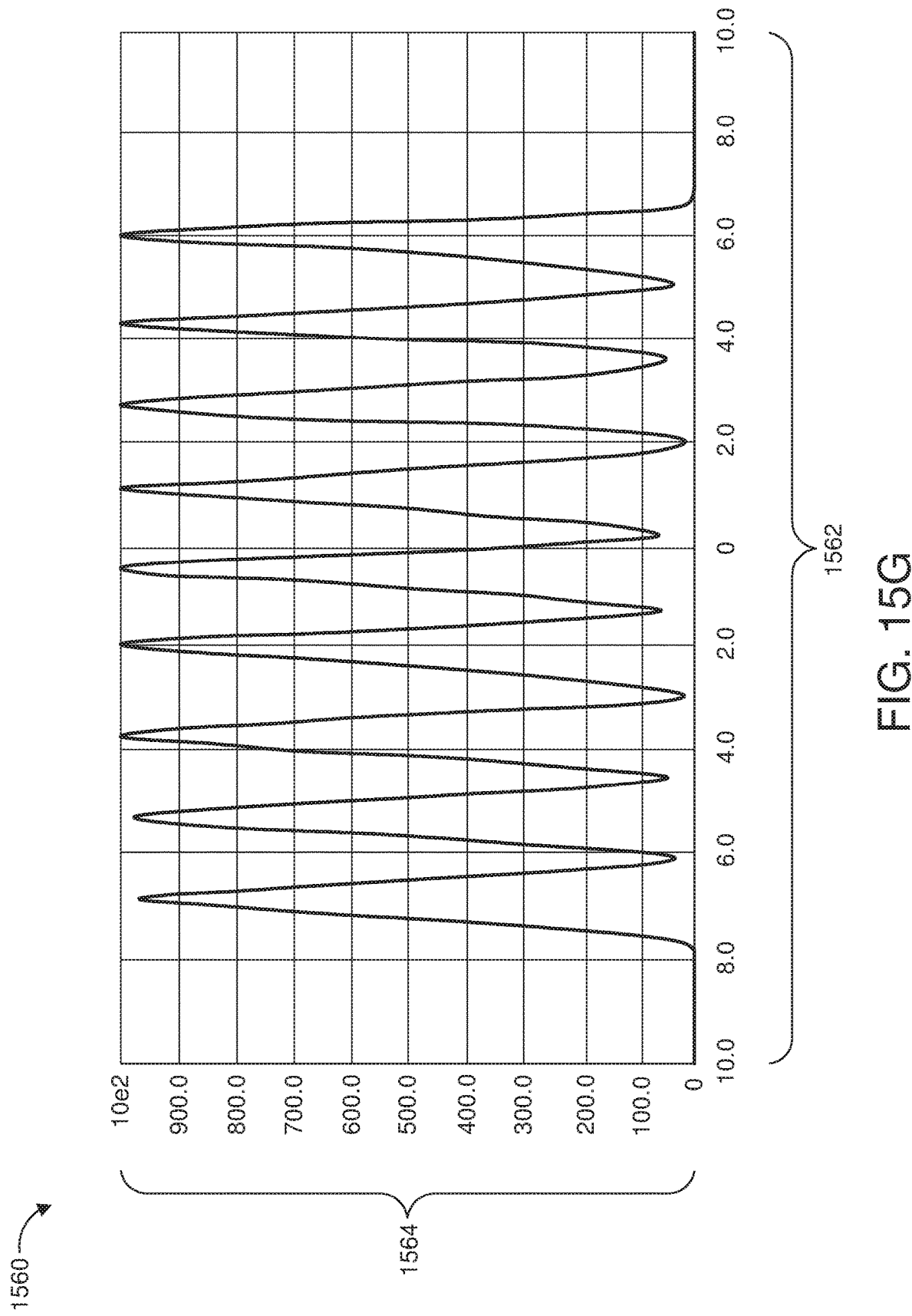
Figure 15H:
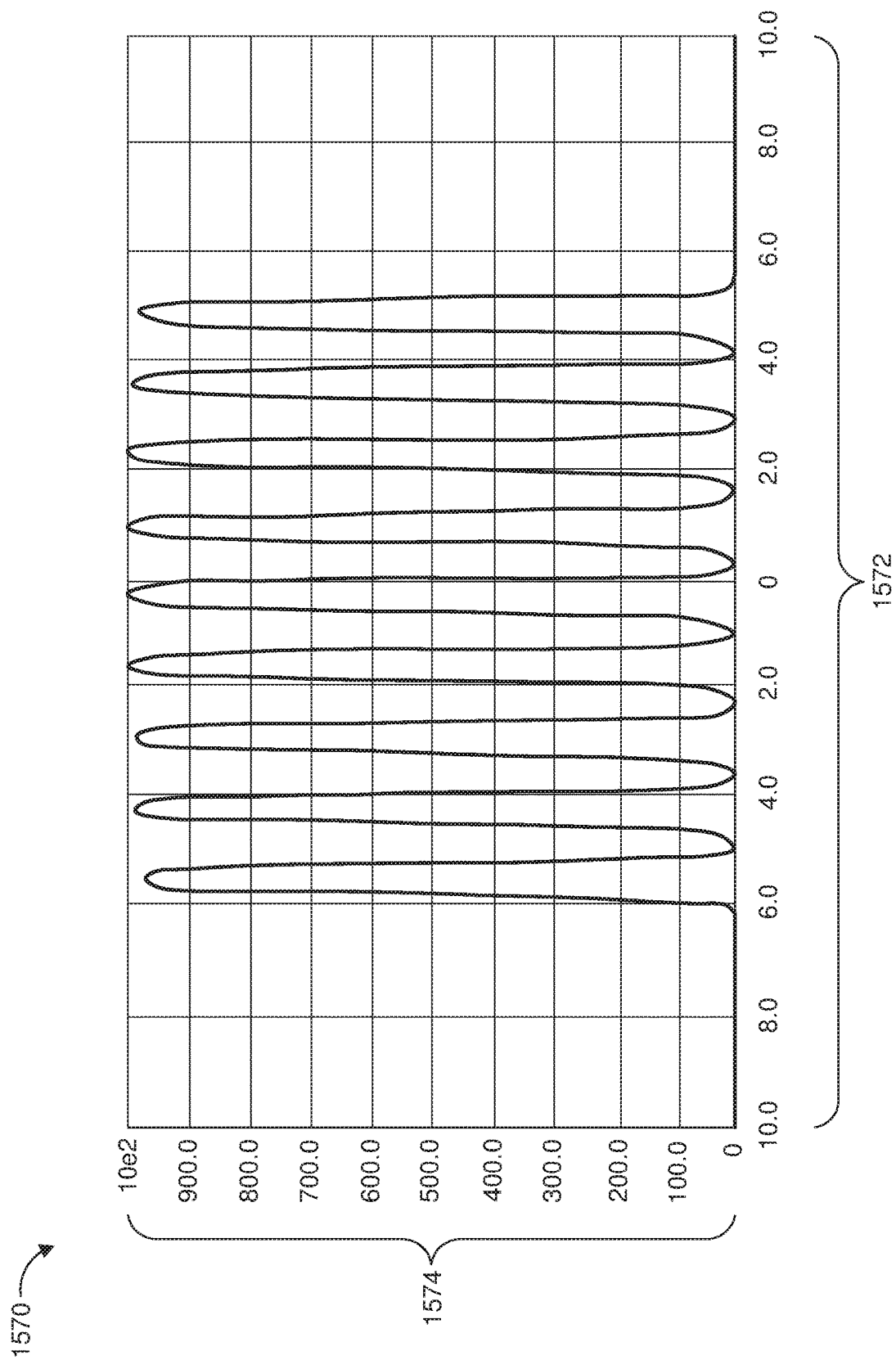

FIGS. 15F-15H are graphs of incoherent irradiance (respectively) for example red, green, and blue single µLED light sources according to some embodiments. FIG. 15F shows a graph 1550 of incoherent irradiance 1554 vs. x-coordinate value 1552 for a line of single red µLEDs. FIG. 15G shows a graph 1560 of incoherent irradiance 1564 vs. x-coordinate value 1562 for a line of single green µLEDs. FIG. 15H shows a graph 1570 of incoherent irradiance 1574 vs. x-coordinate value 1572 for a line of single blue µLEDs.

Figure 16A:
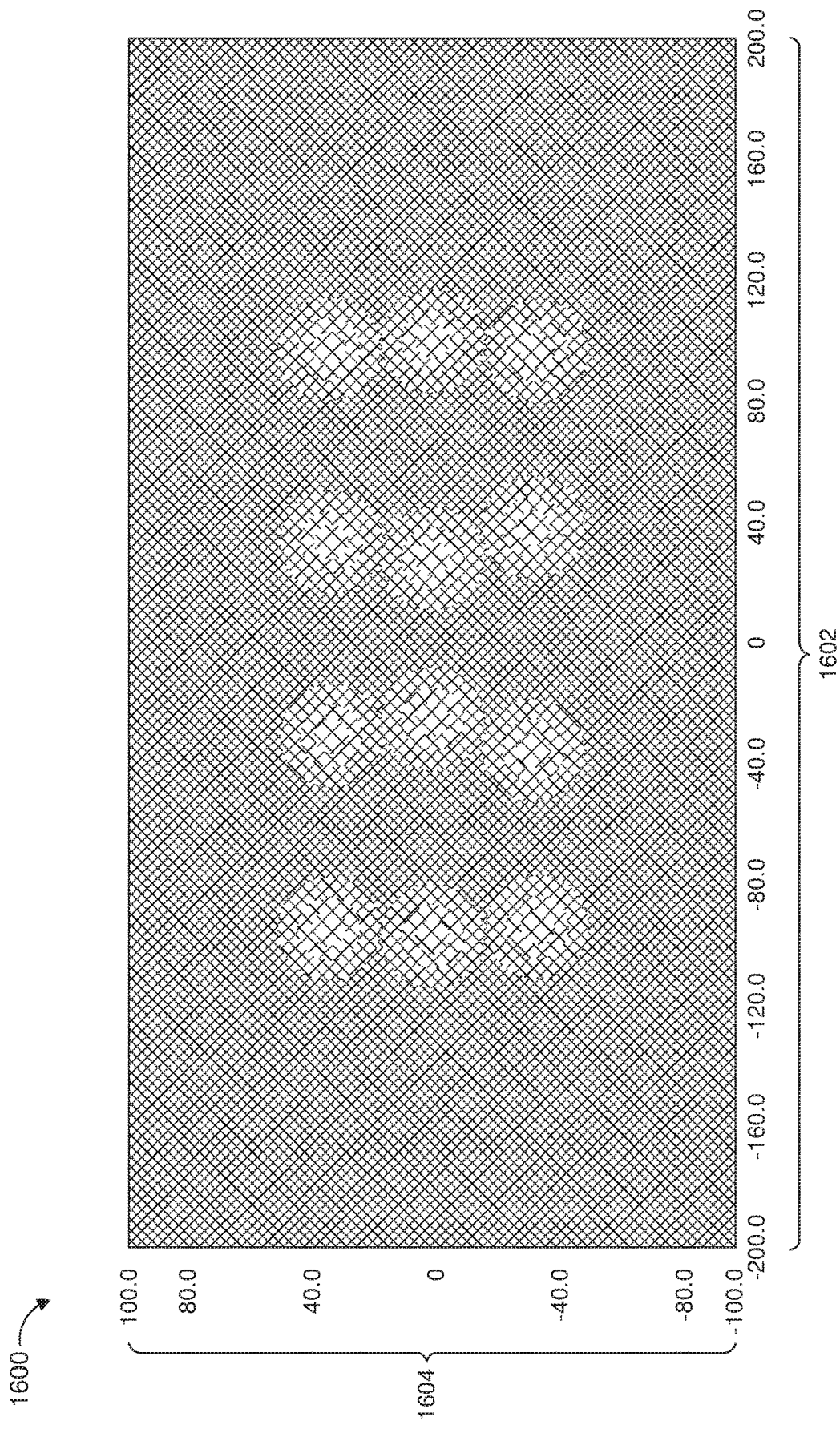
FIG. 16A is a graph of incoherent irradiance for example red, green, and blue light source clusters separated in the vertical direction according to some embodiments.
Figure 16B:
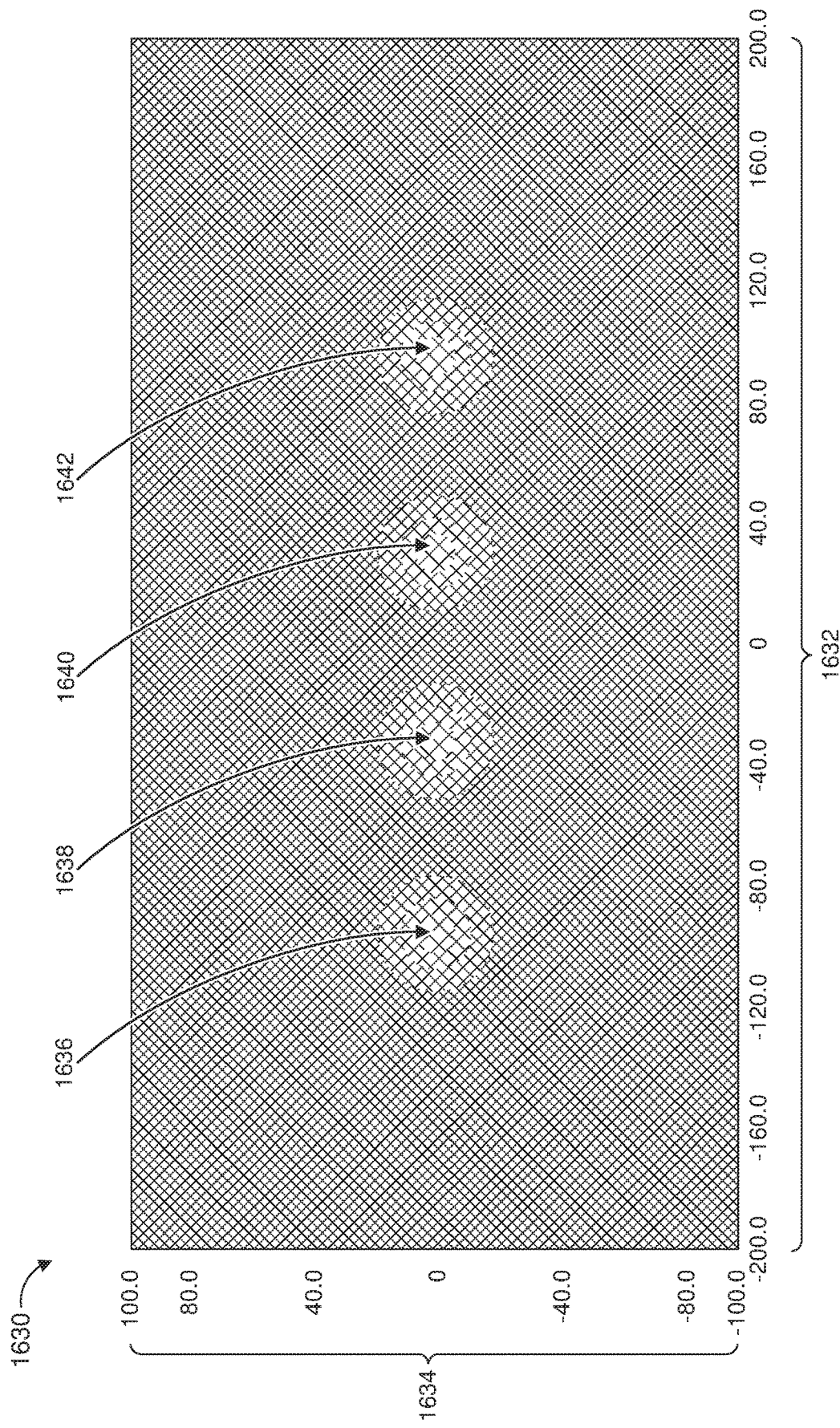
FIG. 16B is a graph of incoherent irradiance for example combined on-axis full color light sources according to some embodiments.
Figure 16C:
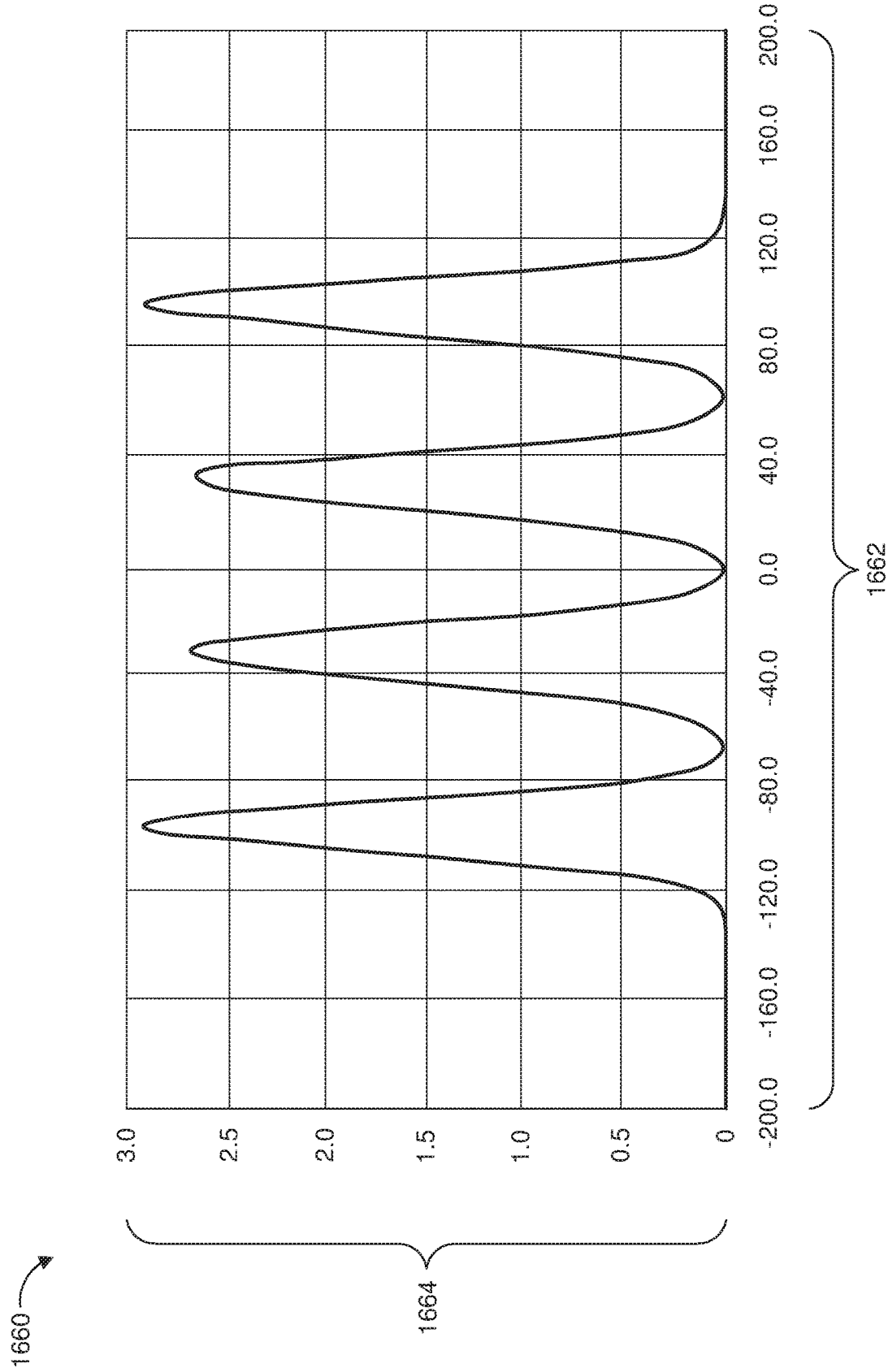
FIG. 16C is a graph of incoherent irradiance for example combined on-axis full color light sources for a horizontal cross section according to some embodiments.

A second set of raytrace simulations was performed in order to show the performance of the backlight illumination designs in stereoscopic illumination use. FIGS. 16A-16C show the illumination patterns that were obtained at the 1 m viewing distance if source components were activated from the µLED cluster for one backlight projector cell and only selected diffracted beams were allowed to pass through the LCD. FIG. 16A is a graph of incoherent irradiance for example red, green, and blue light source clusters separated in the vertical direction according to some embodiments. FIG. 16A shows a graph 1600 of incoherent irradiance in an x-coordinate value 1602 and y-coordinate value 1604 spatial environment for the different colored beams separated in the vertical direction. The beams are not at the same horizontal locations, as shown by the unaligned spots.

FIG. 16B is a graph of incoherent irradiance for example combined on-axis full color light sources according to some embodiments. Because the spots are fairly wide, the spots may be combined to form a series of full-color spots 1636, 1638, 1640, 1642 as shown in the graph 1630 of FIG. 16B. In this latter picture, the components were placed on axis and the different color spots overlapped. For some embodiments, in an x-coordinate value 1632 and y-coordinate value 1634 spatial environment, the four spots 1636, 1638, 1640, 1642 shown in the image are centered on the y=0 axis and evenly spaced at ~64 mm intervals in the x-axis. Three stereoscopic image pairs may be projected to the eyes of a viewer positioned at three different locations at the viewing distance and inside the viewing window.

FIG. 16C is a graph of incoherent irradiance for example combined on-axis full color light sources for a horizontal cross section according to some embodiments. FIG. 16C is a graph 1660 of incoherent irradiance 1664 vs. x-coordinate value 1662 for the same four full color light sources shown in FIG. 16B. This simulation also shows that colors may be combined in spite of the diffraction grating color dispersion characteristics that tend to separate colors. Colors may be combined due to different color emitted beam bundles are overlapping and the beams have a fairly large divergence. The SMV condition also may be met by using two side-by-side beams that partially overlap at the viewer eyes and view transitions may be made smoother with this technique creating a high-quality 3D image experience.

For some embodiments, μLEDs may be used for the light sources of the light emitting layer. For some embodiments, the μLED clusters under each backlight module microlens may be made as sub-assemblies on separate substrates and bonded to the backplane as packaged components.

FIG. 17 is a flowchart for an example process for synchronizing a spatial light modulator (SLM) with an illumination of light beams based on the content displayed according to some embodiments. For some embodiments, a method 1700 may include emitting 1702 a light beam from each light-emitting element of an addressable array of light-emitting elements to generate a plurality of light beams. For some embodiments, the method 1700 may further include collimating 1704 each of the plurality of light beams to generate a plurality of collimated light beams. For some embodiments, the method 1700 may further include diffracting 1706 each of the plurality of collimated light beams to generate a plurality of diffracted light beams. For some embodiments, the method 1700 may further include synchronizing 1708 an optical mask to the addressable array of light-emitting elements based on content embodied in the plurality of diffracted light beams. For some embodiments, the SLM may be an LCD display. In some embodiments, the addressable array of light-emitting elements may be a plurality of light emitting element blocks.

Figure 18:
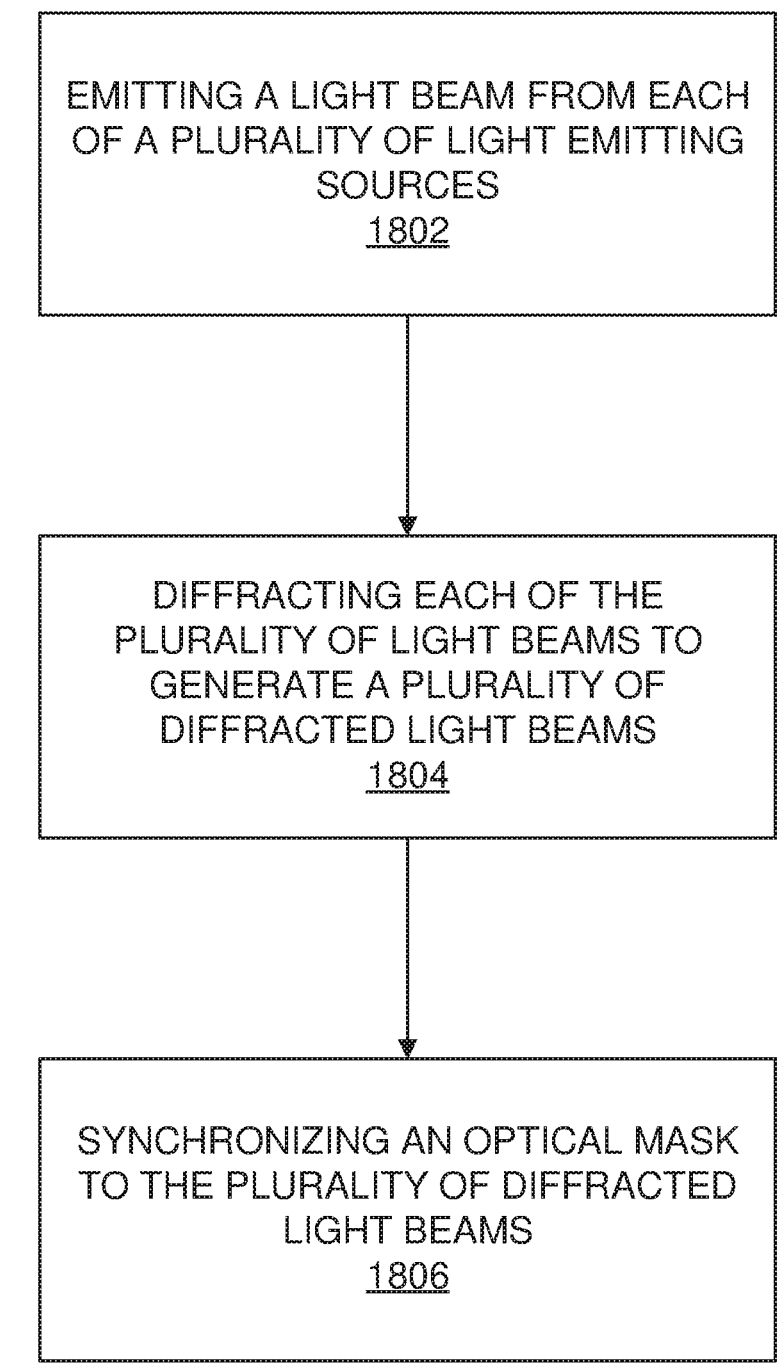
FIG. 18 is a flowchart illustrating an example process for synchronizing an optical mask to a plurality of diffracted light beams according to some embodiments.
Figure 19:
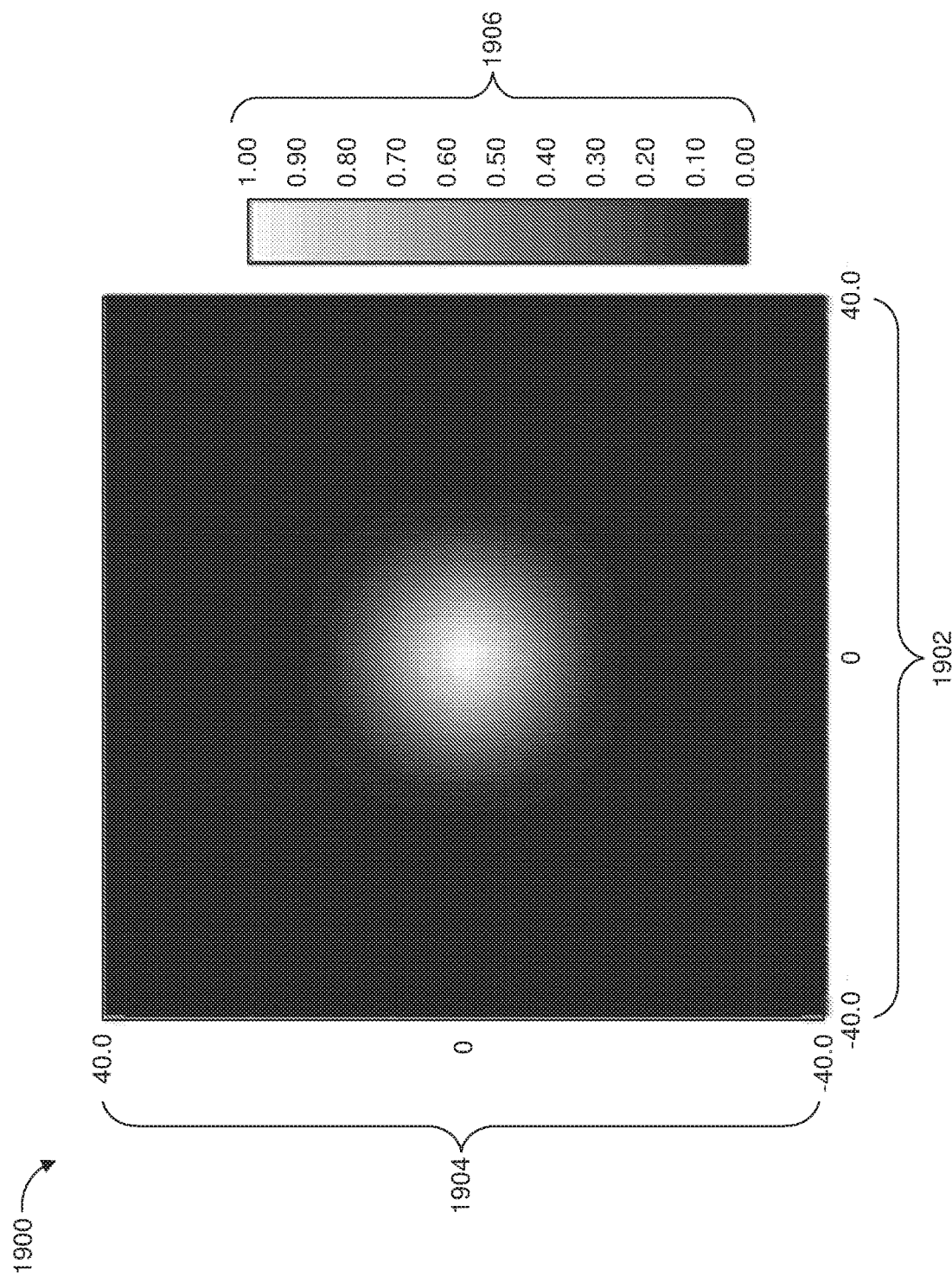
FIGS. 19-30 are grayscale versions of native images corresponding to FIGS. 13A, 13B, 13C, 13G, 13H, 13I, 14A, 14B, 15A, 15B, 16A, and 16B, respectively.
Figure 20:
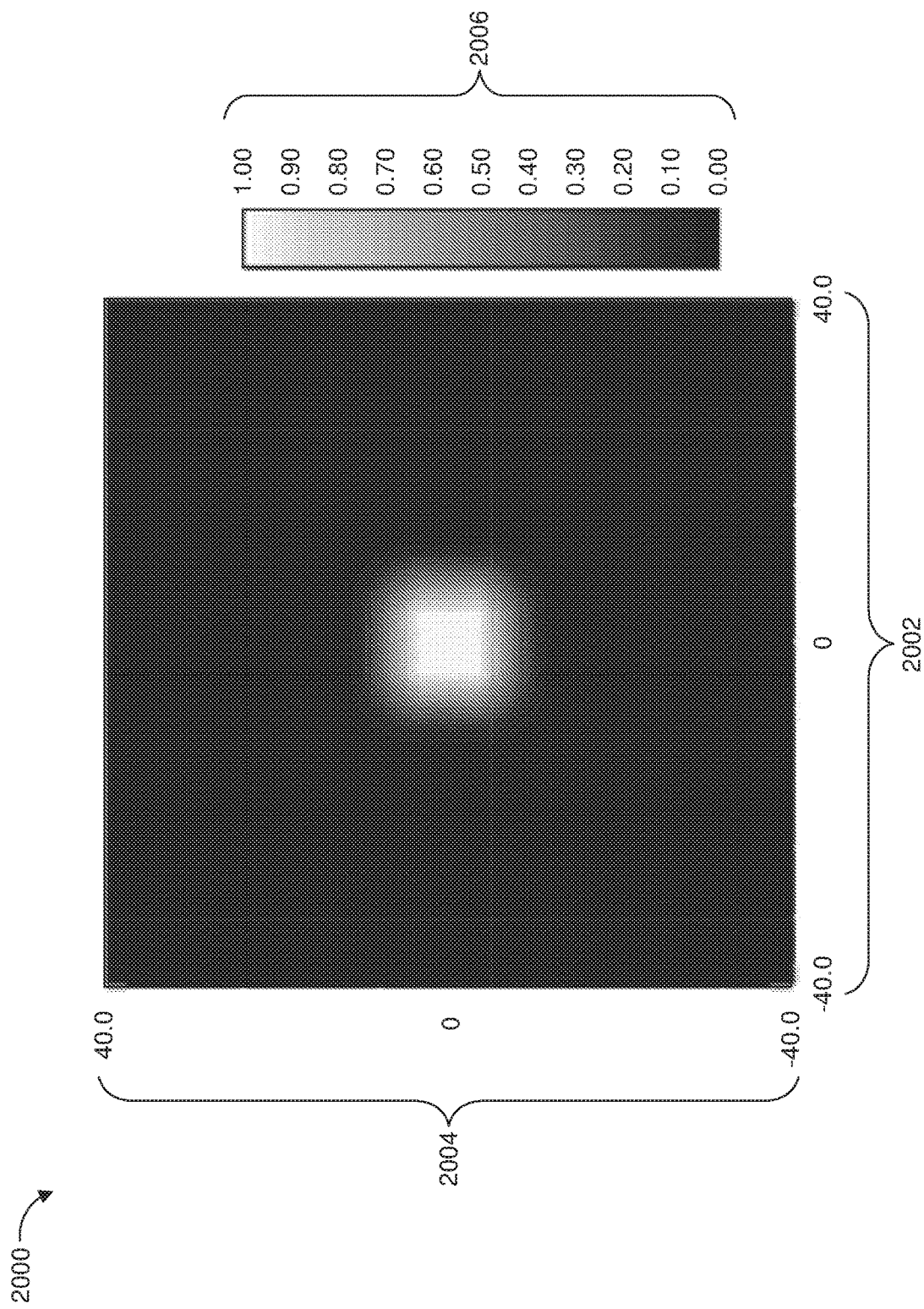
Figure 21:
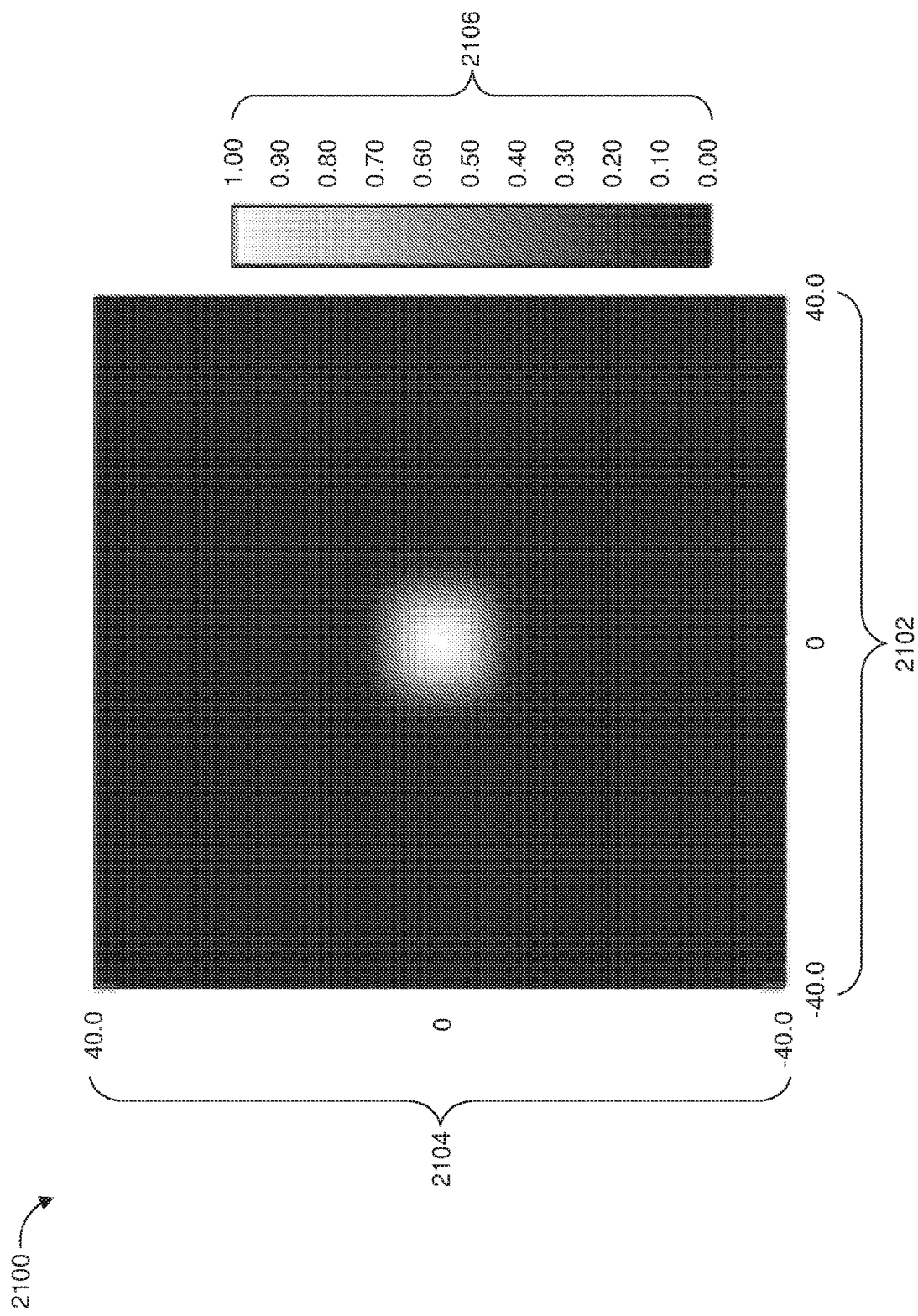
Figure 22:
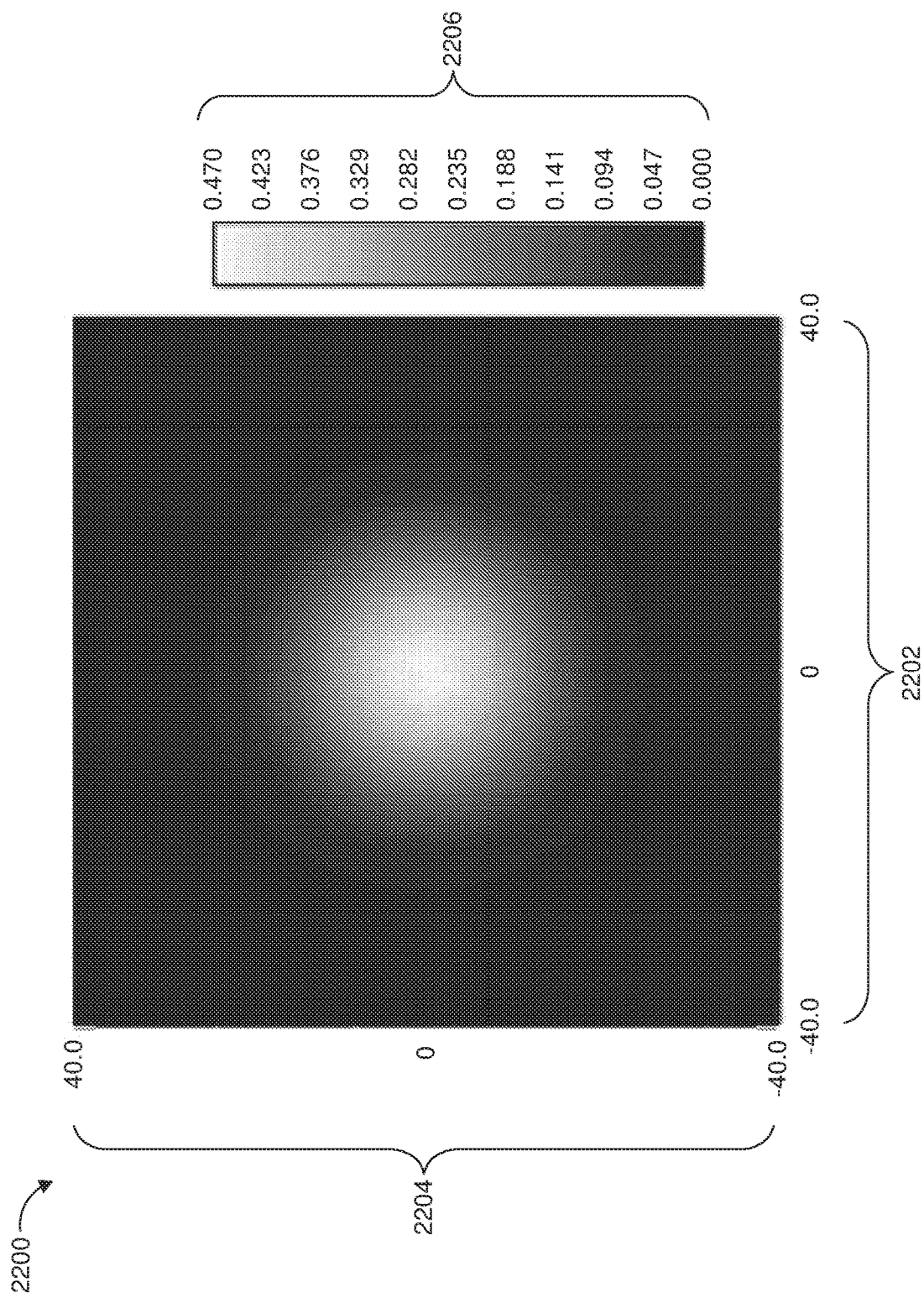
Figure 23:
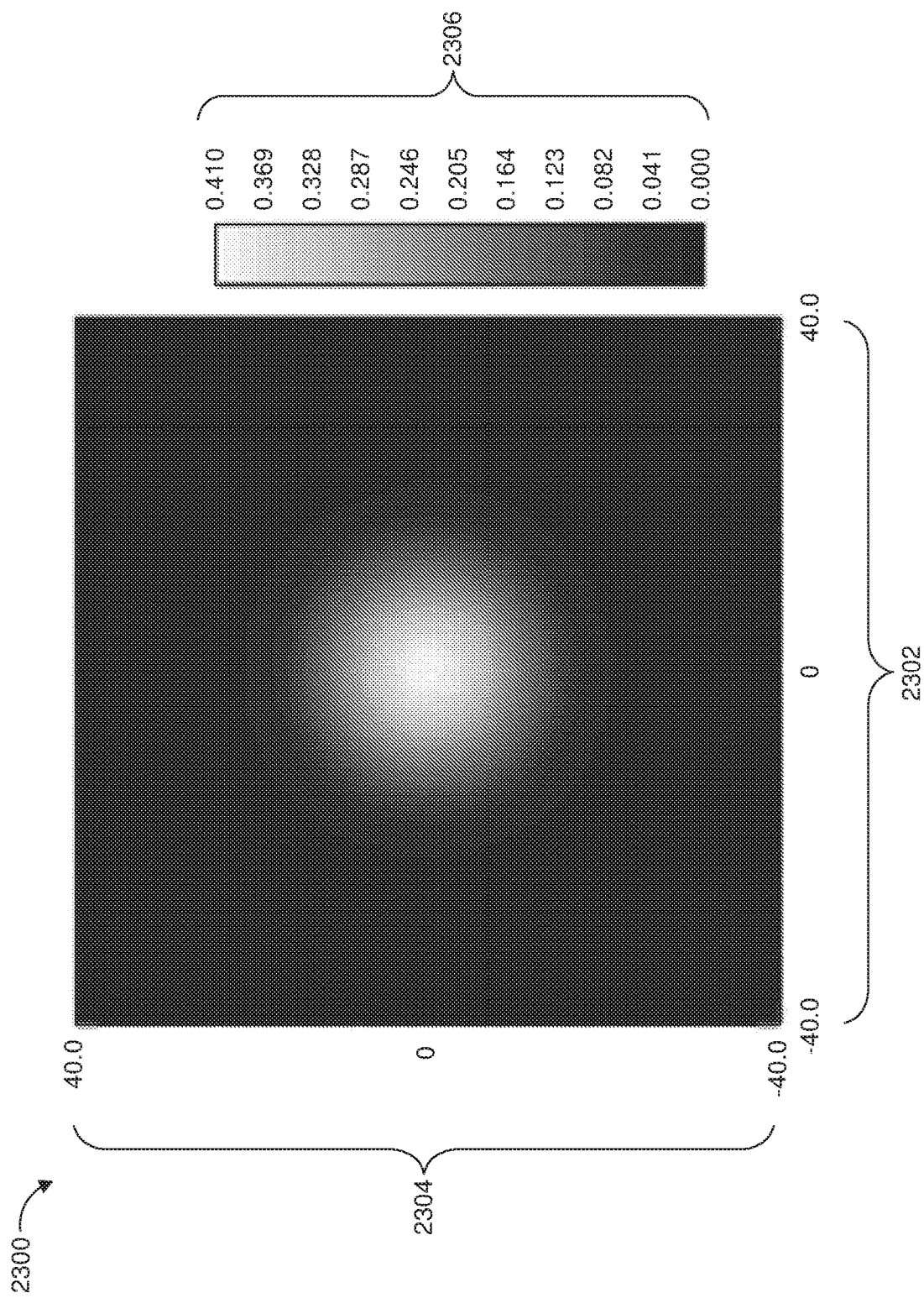
Figure 24:
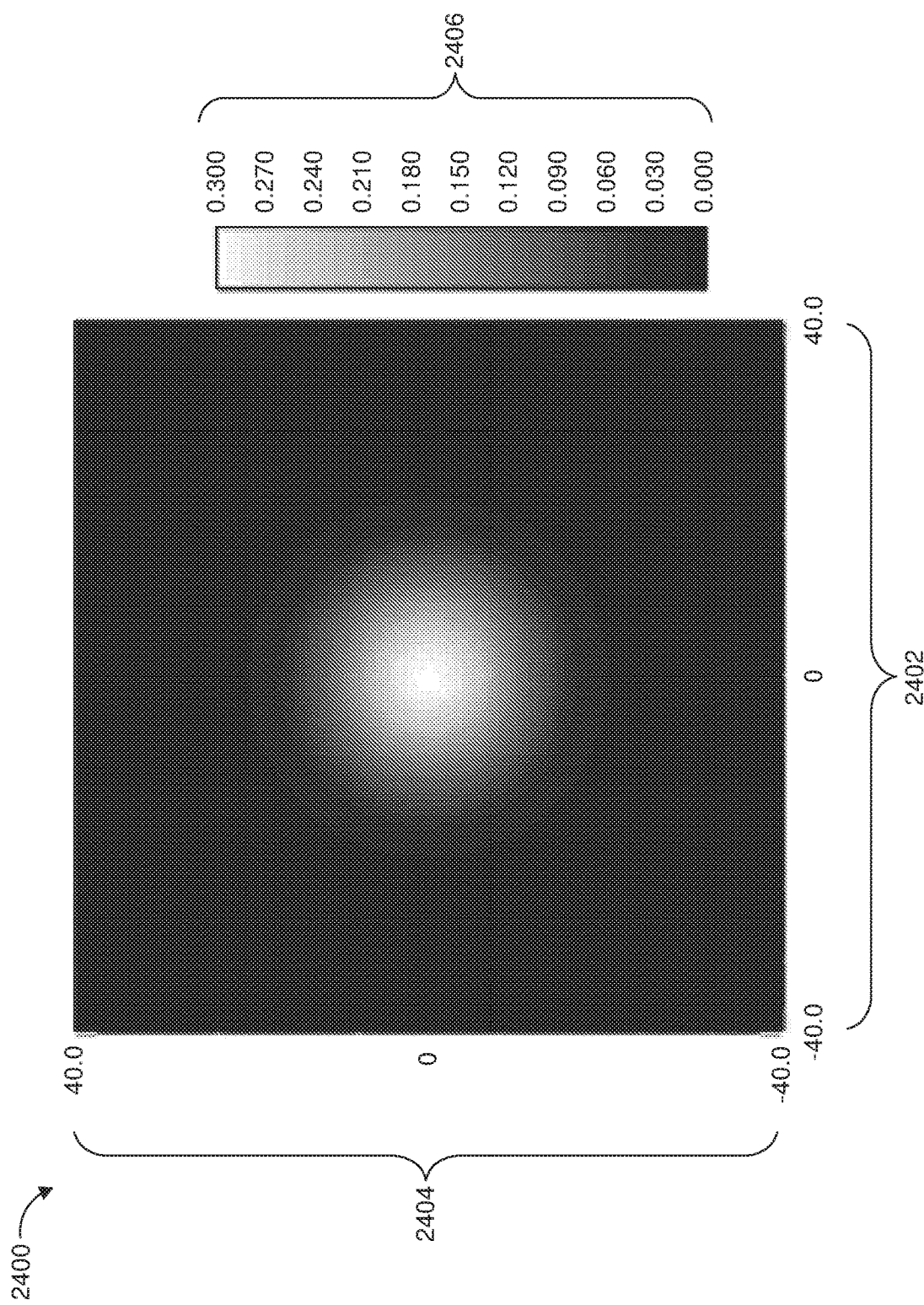
Figure 25:
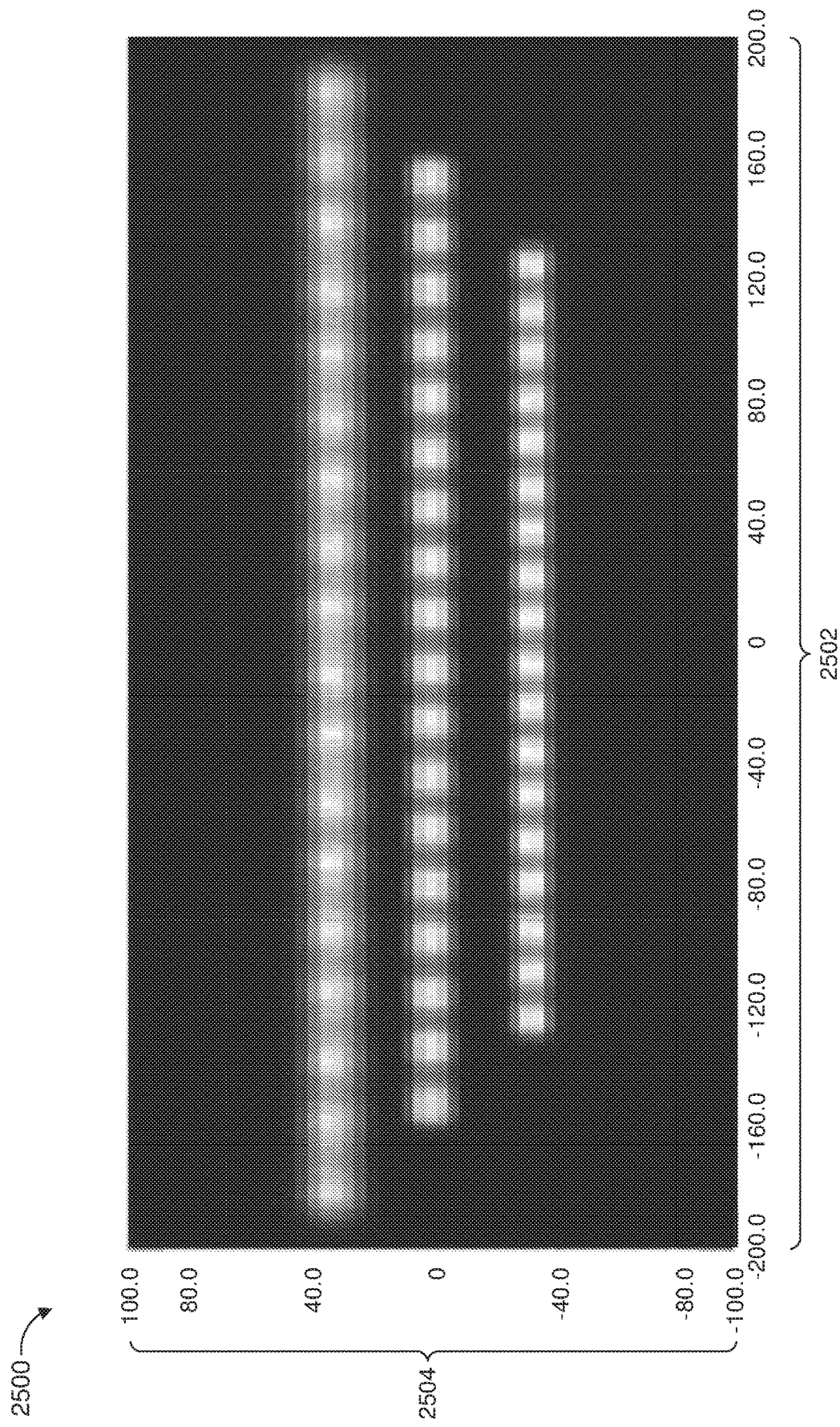
Figure 26:
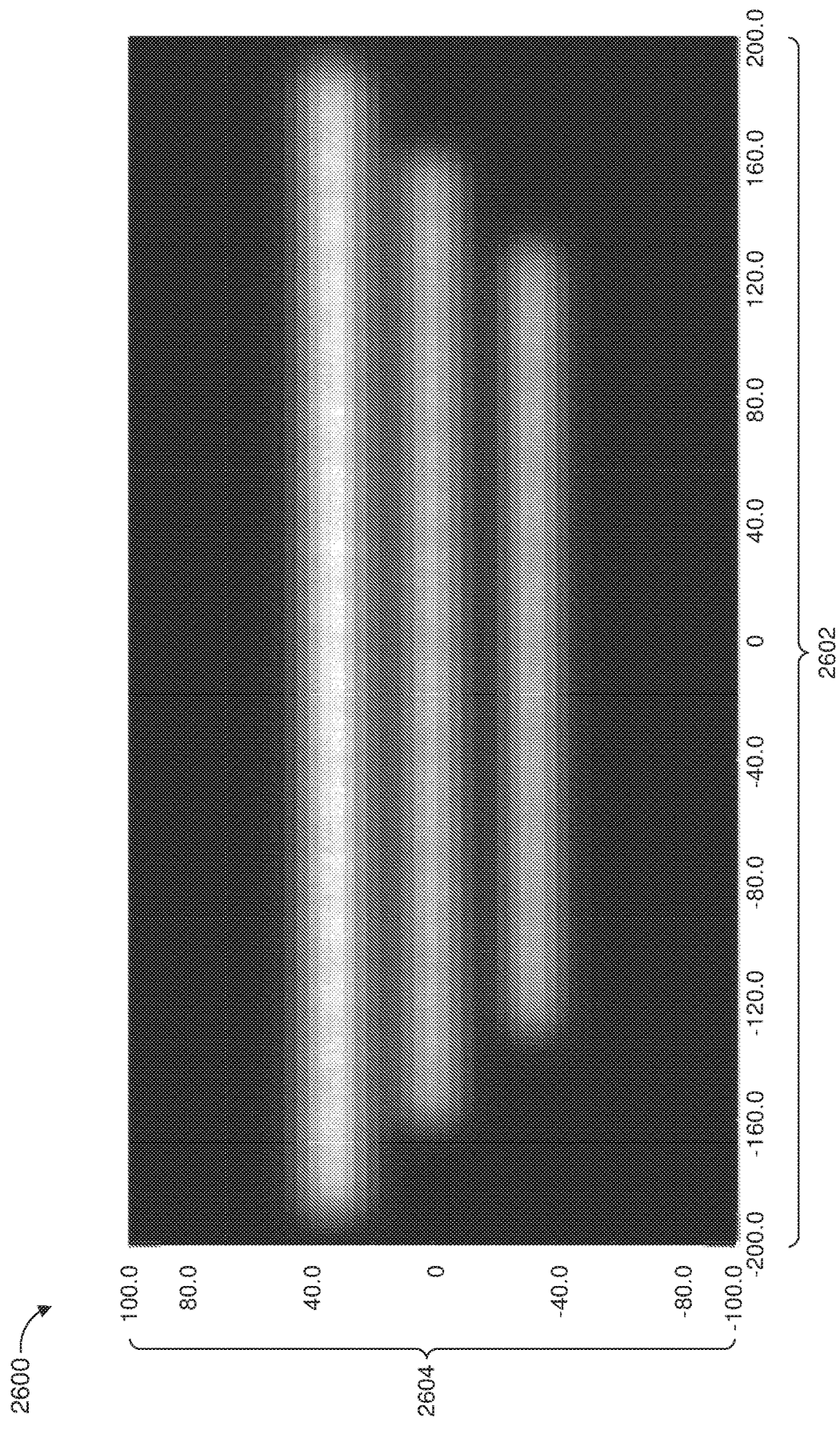
Figure 27:
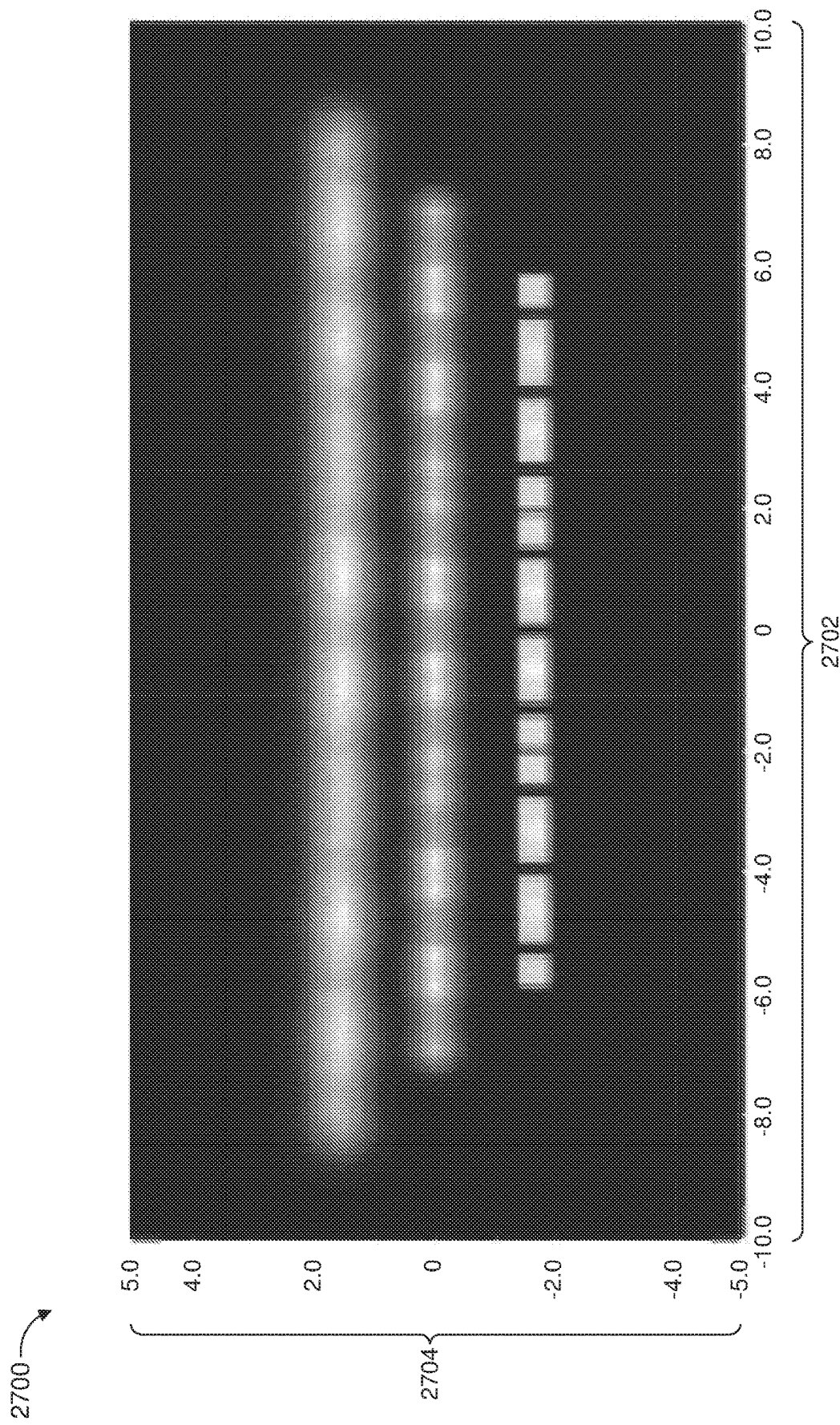
Figure 28:
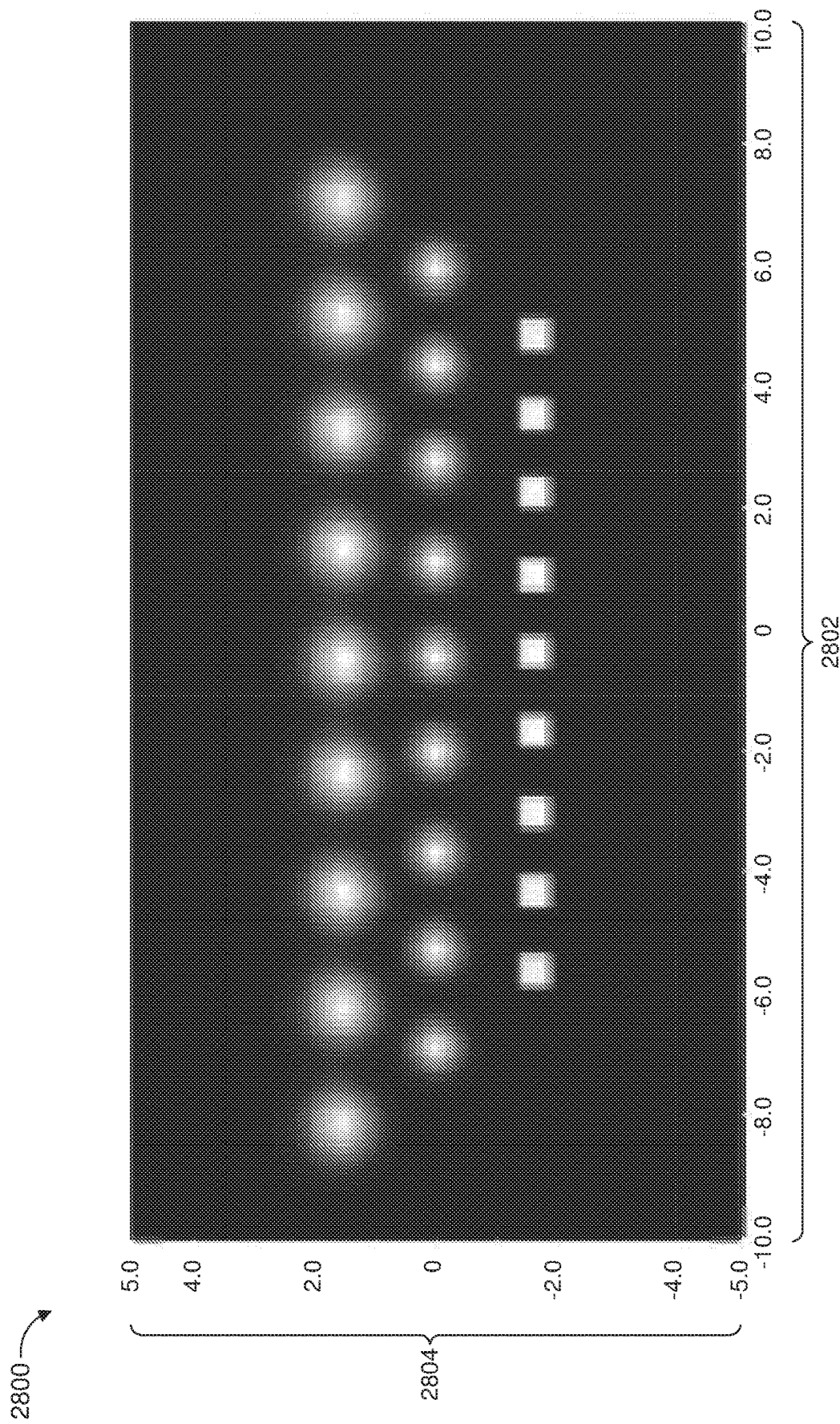
Figure 29:
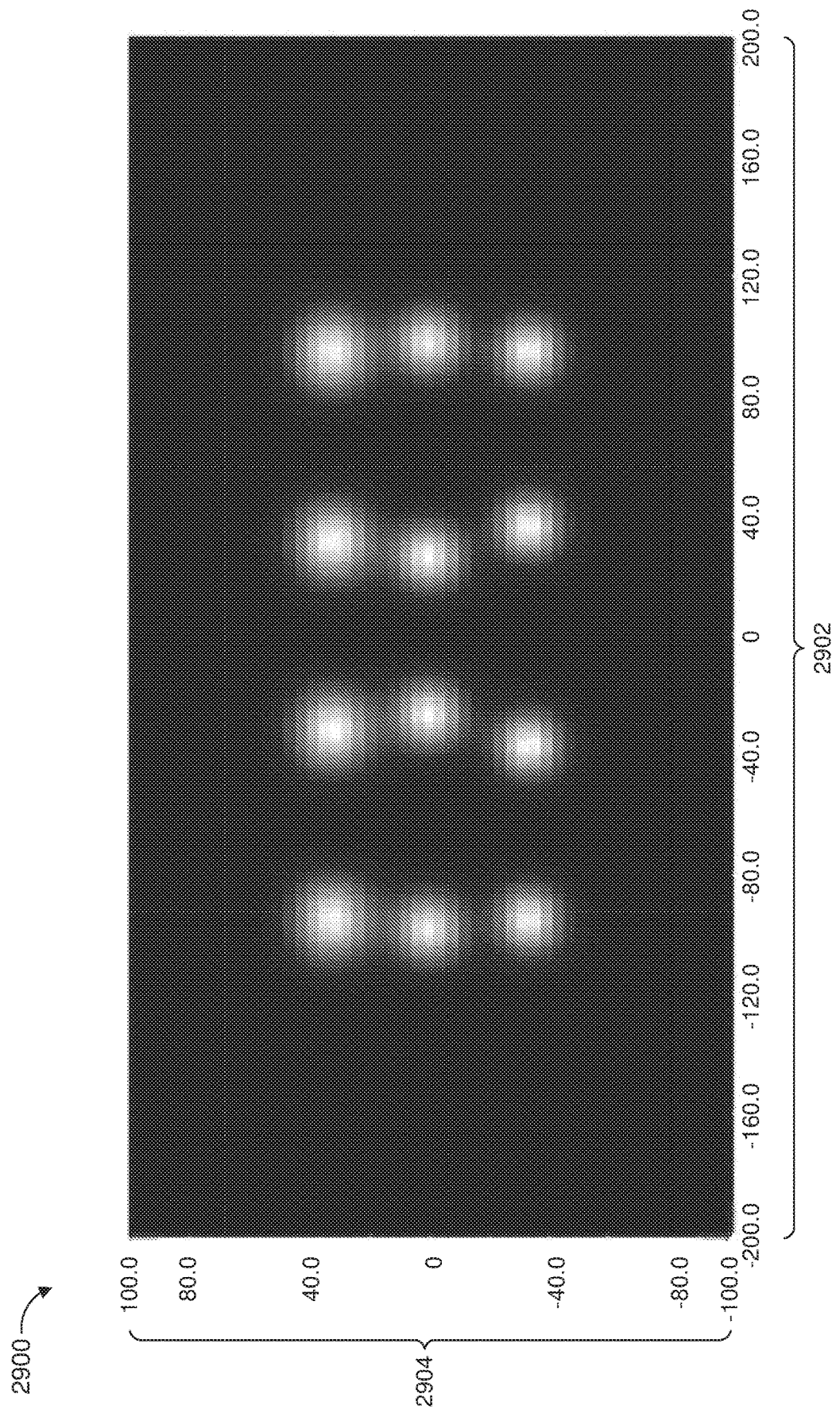
Figure 30:
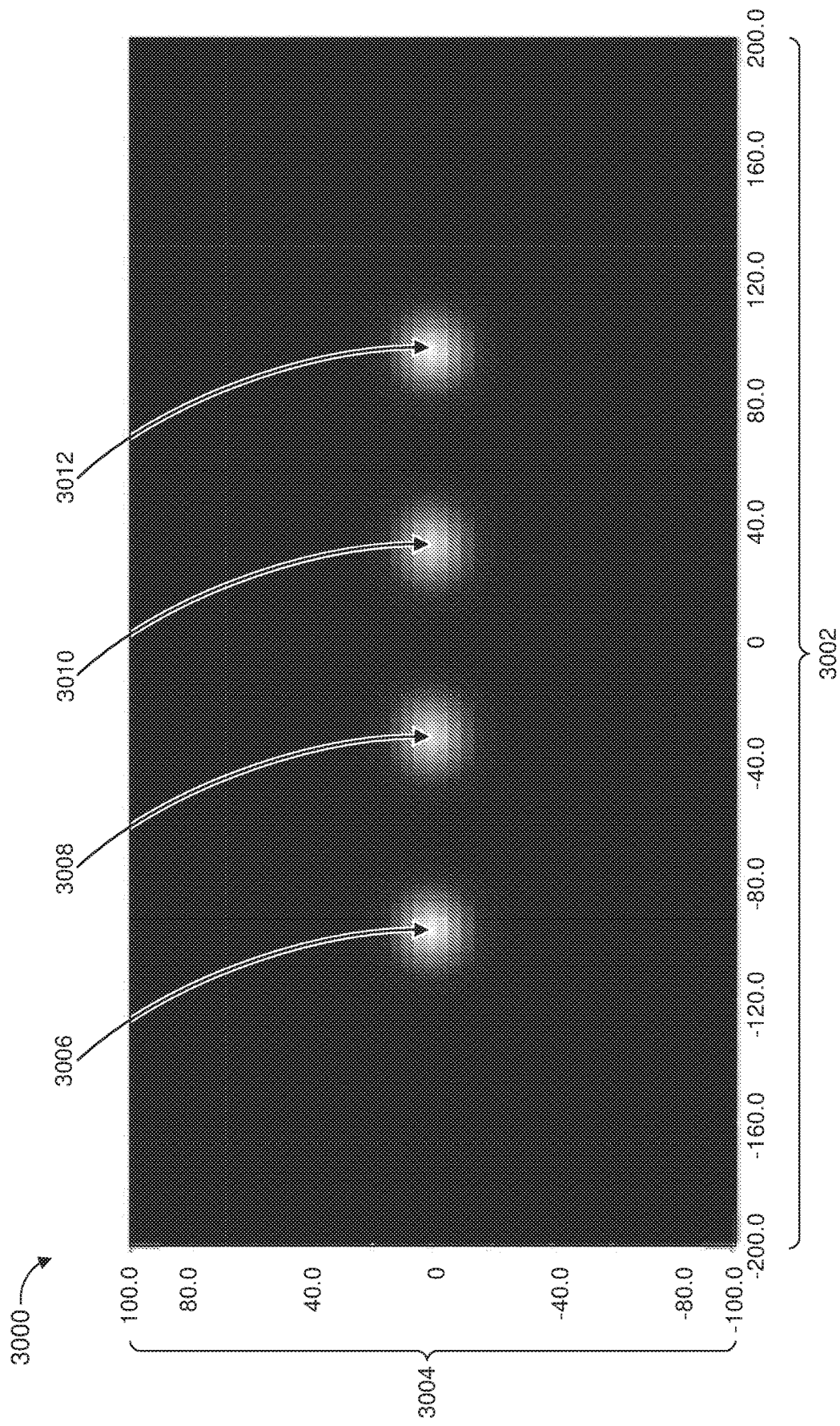

FIG. 18 is a flowchart illustrating an example process for synchronizing an optical mask to a plurality of diffracted light beams according to some embodiments. For some embodiments, an example process 1800 may include emitting 1802 a light beam from each of a plurality of light emitting sources. For some embodiments, the example process 1800 may further include diffracting 1804 each of the plurality of light beams to generate a plurality of diffracted light beams. For some embodiments, the example process 1800 may further include synchronizing 1806 an optical mask to the plurality of diffracted light beams. For some embodiments of the example process 1800, synchronizing the optical mask to the plurality of light beams may include: determining a location of a multidirectional display pixel (MDP) within the optical mask based on a light beam selected from the plurality of diffracted light beams and content embodied in the plurality of diffracted light beams; and rendering the optical mask, wherein the light beam selected from the plurality of diffracted light beams passes through the optical mask, and wherein rendering the optical mask synchronizes the optical mask with the content embodied in the plurality of diffracted light beams.

FIGS. 19-30 are grayscale versions of native images corresponding to FIGS. 13A, 13B, 13C, 13G, 13H, 13I, 14A, 14B, 15A, 15B, 16A, and 16B, respectively, as shown in the Table 2 below.

TABLE 2

Drawing Mappings

| Grayscale Drawing | Black and White Line Drawing |
|---|---|
| 19 | 13A |
| 20 | 13B |
| 21 | 13C |
| 22 | 13G |
| 23 | 13H |
| 24 | 13I |
| 25 | 14A |
| 26 | 14B |
| 27 | 15A |
| 28 | 15B |
| 29 | 16A |
| 30 | 16B |

An example apparatus in accordance with some embodiments may include: an addressable array of light-emitting elements; an array of collimating optical elements; one or more diffractive grating layers; and an array of optical mask elements synchronized to illumination of the addressable array of light-emitting elements based on content displayed.

For some embodiments of an example apparatus, the addressable array of light-emitting elements may include a plurality of sets of light-emitting elements, and each collimating optical element of the array of collimating optical elements may be associated with a particular set of light-emitting elements of the plurality of sets of light-emitting elements.

For some embodiments of an example apparatus, one or more of the light-emitting elements of the addressable array of light-emitting elements may be selected from the group consisting of a μLED and an OLED.

For some embodiments of an example apparatus, the array of optical mask elements may be a spatial light modulator (SLM).

For some embodiments of an example apparatus, the array of optical mask elements may be a liquid crystal display (LCD).

Some embodiments of an example apparatus may further include a color filter.

Some embodiments of an example apparatus may further include an optical element, wherein the optical element may be configured to adjust emission direction angles of one or more of the optical mask elements.

For some embodiments of an example apparatus, the optical element may be configured to adjust the emission direction angles of the one or more of the optical mask elements to align with a viewing window of a viewer.

For some embodiments of an example apparatus, the addressable array of light-emitting elements may include a first plurality of sets of light-emitting elements and a second plurality of sets of light-emitting elements, the first plurality of sets of light-emitting elements may be located less than a threshold distance away from a center of a display and may be arranged with an equal separation between each set of the first plurality of sets of light-emitting elements, and the second plurality of sets of light-emitting elements may be located more than the threshold distance away from the center of the display and may be arranged with an unequal separation between each set of the second plurality of sets of light-emitting elements based on how far each of the second plurality of sets of light-emitting elements is located from the center of the display.

For some embodiments of an example apparatus, the one or more diffractive grating layers may be passive, continuously-diffractive structures.

An example method in accordance with some embodiments may include: emitting a light beam from each light-emitting element of an addressable array of light-emitting elements to generate a plurality of light beams; collimating each of the plurality of light beams to generate a plurality of collimated light beams; diffracting each of the plurality of collimated light beams to generate a plurality of diffracted light beams; and synchronizing an optical mask to the addressable array of light-emitting elements based on content embodied in the plurality of diffracted light beams.

For some embodiments of an example method, synchronizing the optical mask to the addressable array of light-emitting elements may include selectively passing and blocking the diffracted light beams based on the content.

For some embodiments of an example method, selectively passing and blocking the diffracted light beams based on the content may include: multiplexing spatially control of the optical mask to selectively pass and block the diffracted light beams based on the content; and multiplexing temporally control of the optical mask to selectively pass and block the diffracted light beams based on the content.

For some embodiments of an example method, synchronizing the optical mask to the addressable array of light-emitting elements may include rendering a three-dimensional (3D) image.

For some embodiments of an example method, synchronizing the optical mask to the addressable array of light-emitting elements may include: determining a location of a multidirectional display pixel (MDP) within the optical mask based on a selected light beam selected from the plurality of diffracted light beams and the content embodied in the plurality of diffracted light beams; and rendering the optical mask, wherein the selected light beam selected from the plurality of diffracted light beams may pass through the optical mask, and wherein rendering the optical mask may synchronize the optical mask with the content embodied in the plurality of diffracted light beams.

Another example apparatus in accordance with some embodiments may include: a backlight, which may include: a layer of light sources, a collimating lens layer over the layer of light sources, and one or more diffraction grating layers over the collimating lens layer; and a spatial light modulator (SLM) panel configured to process light emitted by the backlight.

For some embodiments of another example apparatus, the layer of light sources may include one or more µLEDs.

For some embodiments of another example apparatus, the layer of light sources may include one or more OLEDs.

For some embodiments of another example apparatus, the SLM panel may be an LCD panel.

For some embodiments of another example apparatus, the SLM panel and the layer of light sources may be configured to be operated in synchronization.

Some embodiments of another example apparatus may further include a color filter.

For some embodiments of another example apparatus, the color filter may include quantum dot materials.

Some embodiments of another example apparatus may further include: a camera configured to track eye positions of a viewer; and one or more infra-red (IR) light emitting diodes (LEDs) enabled to illuminate a facial area of the viewer.

For some embodiments of another example apparatus, the camera may be a stereoscopic camera pair.

Another example method in accordance with some embodiments may include: emitting a light beam from each light-emitting element of an addressable array of light-emitting elements to generate a plurality of light beams; collimating each of the plurality of light beams to generate a plurality of collimated light beams; diffracting each of the plurality of collimated light beams to generate a plurality of diffracted light beams; and synchronizing an optical mask to the addressable array of light-emitting elements based on content embodied in the plurality of diffracted light beams.

For some embodiments of another example method, emitting the light beam from each light-emitting element may include illuminating sequentially a sequence of three-dimensional (3D) scene angular projection images.

Some embodiments of another example method may further include diffracting each of the plurality of diffracted light beams to generate a second plurality of diffracted light beams.

For some embodiments of another example method, diffracting each of the plurality of collimated light beams may generate the plurality of diffracted light beams with an off axis angular distribution.

For some embodiments of another example method, synchronizing the optical mask to the addressable array of light-emitting elements may include selectively passing and blocking the diffracted light beams based on the content.

For some embodiments of another example method, synchronizing the optical mask to the addressable array of light-emitting elements may include rendering a three-dimensional (3D) image.

For some embodiments of another example method, synchronizing the optical mask to the addressable array of light-emitting elements may enable more than one diffracted light beam, of the plurality of diffracted light beams, per pixel of the optical mask to pass through the optical mask.

Some embodiments of another example method may further include filtering the plurality of diffracted light beams with one or more color filters.

Some embodiments of another example method may further include adjusting emission direction angles of the optical mask.

For some embodiments of another example method, adjusting the emission direction angles of the optical mask may adjust the emission direction angles of the optical mask to align with a viewing window of a viewer.

Some embodiments of another example method may further include: tracking eye positions of a viewer, wherein synchronizing the optical mask to the addressable array of light-emitting elements may include: selecting a portion of the addressable array of light-emitting elements based on the eye positions of the viewer; and synchronizing the optical mask to the selected portion of the addressable array of light-emitting elements.

Some embodiments of another example method may further include illuminating a facial area of the viewer.

Some embodiments of another example method may further include adjusting a brightness of the plurality of light beams by pulse width modulating the light beam emitted from each light-emitting element of the addressable array of light-emitting elements.

For some embodiments of another example method, synchronizing the optical mask to the addressable array of light-emitting elements may include: determining a location of a multidirectional display pixel (MDP) within the optical mask based on a selected light beam selected from the plurality of diffracted light beams and the content embodied in the plurality of diffracted light beams; and rendering the optical mask, wherein the selected light beam selected from the plurality of diffracted light beams passes through the optical mask, and wherein rendering the optical mask synchronizes the optical mask with the content embodied in the plurality of diffracted light beams.

A further example apparatus in accordance with some embodiments may include: a plurality of light sources, wherein each of the plurality of light sources is configured to emit a respective light beam; one or more diffractive layers; and an optical mask configured to be synchronized to an illumination of the respective light beams.

For some embodiments of a further example apparatus, the optical mask may be a spatial light modulator (SLM).

A further example method in accordance with some embodiments may include: emitting a light beam from each of a plurality of light emitting sources to generate a plurality of light beams; diffracting each of the plurality of light beams to generate a plurality of diffracted light beams; and synchronizing an optical mask to the plurality of diffracted light beams.

For some embodiments of a further example method, synchronizing the optical mask to the plurality of light beams may include: determining a location of a multidirectional display pixel (MDP) within the optical mask based on a selected light beam selected from the plurality of diffracted light beams and content embodied in the plurality of diffracted light beams; and rendering the optical mask, wherein the selected light beam selected from the plurality of diffracted light beams may pass through the optical mask, and wherein rendering the optical mask may synchronize the optical mask with the content embodied in the plurality of diffracted light beams.

Another further example method in accordance with some embodiments may include generating a multiview display comprising generating a directional backlight using a diffraction grating.

Another further example apparatus in accordance with some embodiments may include a multiview display using a plurality of diffraction gratings configured to generate a directional backlight.

An additional example method in accordance with some embodiments may include generating a directional backlight using a sparse array of light-emitting elements.

An additional example apparatus in accordance with some embodiments may include a directional backlight comprising a sparse array of light-emitting elements.

A further additional example method in accordance with some embodiments may include generating an asymmetrical angular distribution of light by generating a directional backlight using a blazed diffraction grating.

A further additional example apparatus in accordance with some embodiments may include: a directional back-light light source; and a blazed diffraction grating configured to generate an asymmetrical angular distribution of light.

Some embodiments of an example apparatus may include: a plurality of light emitting element blocks comprised of light sources; a collimating lens; one or more diffractive grating sheets; and an optical mask synchronized to an illumination of the plurality of light emitting element blocks based on content displayed.

For some embodiments, the optical mask is a spatial light modulator (SLM).

For some embodiments, the plurality of light emitting element blocks may be arranged to support a display size larger than a threshold.

For some embodiments, the plurality of light emitting element blocks may be arranged to support a display size smaller than a threshold.

For some embodiments, the light sources may be µLEDs.

For some embodiments, the spatial light modulator may be a liquid crystal display (LCD).

Some embodiments may further include a color filter.

For some embodiments, the color filter may include quantum dot materials.

Some embodiments may further include an optical element, wherein the optical element is configured to adjust emission direction angles of the optical mask.

For some embodiments, the optical element may be configured to adjust emission direction angles of the optical mask to align with a viewing window of a viewer.

For some embodiments, a first plurality of light emitting element blocks selected from the plurality of light emitting element blocks and located less than a threshold distance away from a center of a display may be arranged with an equal separation between each of the first plurality of light emitting element blocks, and a second plurality of light emitting element blocks selected from the plurality of light emitting element blocks and located more than the threshold distance away from the center of the display may be arranged with an unequal separation between each of the second plurality of light emitting element blocks based on how far each of the second plurality of light emitting element blocks are located from the center of the apparatus.

Some embodiments may further include: a stereoscopic camera pair enabled to track eye positions of a viewer; and one or more infra-red (IR) light emitting diodes (LEDs) enabled to illuminate a facial area of the viewer.

For some embodiments, the camera may be a stereoscopic camera pair.

Some embodiments may further include a plurality of optical elements that shape light beams emitted from the plurality of light emitting element blocks.

Some embodiments of an example method may include: emitting a light beam from each of a plurality of light emitting element blocks to generate a plurality of light beams; collimating each of the plurality of light beams to generate a plurality of collimated light beams; diffracting each of the plurality of collimated light beams to generate diffracted light beams; and synchronizing an optical mask to the plurality of light emitting element blocks based on the content embodied in the diffracted light beams.

For some embodiments, the optical mask may be a spatial light modulator (SLM).

For some embodiments, the plurality of light emitting element blocks may be arranged to support a display size larger than a threshold.

For some embodiments, the plurality of light emitting element blocks may be arranged to support a display size smaller than a threshold.

For some embodiments, emitting a light beam from each of a plurality of light emitting element blocks may illuminate sequentially a sequence of three-dimensional (3D) scene angular projection images.

For some embodiments, diffracting each of the plurality of collimated light beams to generate diffracted light beams may include: diffracting the plurality of collimated light beams to generate a first plurality of diffracted light beams; and diffracting the first plurality of diffracted light beams to generate a second plurality of diffracted light beams, wherein the second plurality of diffracted light beams are the generated diffracted light beams.

For some embodiments, diffracting each of the plurality of collimated light beams may generate a plurality of diffracted light beams with an off axis angular distribution.

For some embodiments, synchronizing the optical mask to the plurality of light emitting element blocks may include selectively passing and blocking the diffracted light beams based on the content.

For some embodiments, synchronizing the optical mask to the plurality of light emitting element blocks renders a three-dimensional (3D) image.

Some embodiments may further include tracking eye positions of a viewer, wherein synchronizing the optical mask to the plurality of light emitting element blocks may be performed for a portion of the diffracted light beams selected based on the eye positions of the viewer.

Some embodiments may further include illuminating a facial area of the viewer.

For some embodiments, synchronizing the optical mask to the plurality of light emitting element blocks may enable more than one diffracted light beam per pixel of the optical mask to pass through the optical mask.

Some embodiments may further include filtering the diffracted light beams with one or more color filters.

Some embodiments may further include adjusting emission direction angles of the optical mask.

For some embodiments, adjusting the emission direction angles of the optical mask may adjust the emission direction angles of the optical mask to align with a viewing window of a viewer.

Some embodiments may further include adjusting brightness of the plurality of light beams by pulse width modulating the light beam emitted from each of the plurality of light emitting element blocks.

Some embodiments of an example apparatus may include: a plurality of light sources; one or more diffractive layers; and optical mask configured to be synchronized to an illumination of the plurality of light sources.

For some embodiments, the optical mask may be a spatial light modulator (SLM).

Some embodiments of an example method may include: emitting a light beams from each of a plurality of light emitting sources; diffracting each of the plurality of light beams to generate diffracted light beams; and synchronizing an optical mask to the plurality of light beams.

For some embodiments, synchronizing the optical mask to the plurality of light emitting element blocks based on the content embodied in the diffracted light beams may include: determining a location of a multidirectional display pixel (MDP) within the optical mask based on a light beam selected from the diffracted light beams and the content embodied in the diffracted light beams; and rendering the optical mask, wherein the light beam selected from the diffracted light beams passes through the optical mask, and wherein rendering the optical mask is synchronized with the content embodied in the diffracted light beams.

Some embodiments of an example system to produce a directional backlight for an LCD based display may include: a plurality of light sources; one or more collimating lenses; one or more diffractive grating sheets; a spatial light modulator synchronized to specific light emitting elements based on the complex content being displayed, wherein the specific light emitting elements are sparse arrays of light emitting elements, such as µLEDs.

Some embodiments of the example apparatus may include an apparatus configured to produce a directional backlight for an LCD-based display.

Some embodiments of the example apparatus may include a plurality of light sources.

Some embodiments of the example apparatus may include one of more collimating lenses.

Some embodiments of the example apparatus may include one or more diffractive grating sheets.

Some embodiments of the example apparatus may include a spatial light modulator synchronized to specific light sources or specific light-emitting elements based on content displayed.

For some embodiments of the example apparatus, one or more of the light sources or light-emitting elements may comprise an array of light-emitting elements or µLEDs.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for displaying a three-dimensional (3D) content, comprising:
an addressable array of light-emitting elements;

an array of collimating optical elements, configured to collimate light emitted by the array of light-emitting elements into a plurality of collimated light beams;

one or more diffractive grating layers, configured to diffract each of the collimated light beams into a plurality of diffracted light beams propagating in different angular directions; and an array of optical mask elements synchronized, based on 3D geometry and visual information representative of the 3D content, to the addressable array of light-emitting elements to enable viewing beams, of the diffracted light beams, propagating in respective angular directions, wherein the viewed beams represent a voxel at a spatial location in the content displayed.

2. The apparatus of claim 1,
wherein the addressable array of light-emitting elements comprises a plurality of sets of light-emitting elements, and
wherein each collimating optical element of the array of collimating optical elements is associated with a particular set of light-emitting elements of the plurality of sets of light-emitting elements.

3. The apparatus of claim 1, wherein one or more of the light-emitting elements of the addressable array of light-emitting elements is selected from a group consisting of a μLED and an OLED.

4. The apparatus of claim 1, wherein the array of optical mask elements is a spatial light modulator (SLM).

5. The apparatus of claim 1, wherein the array of optical mask elements is a liquid crystal display (LCD).

6. The apparatus of claim 1, further comprising a color filter.

7. The apparatus of claim 1, further comprising an optical element, wherein the optical element is configured to adjust emission direction angles of one or more of the optical mask elements.

8. The apparatus of claim 7, wherein the optical element is configured to adjust the emission direction angles of the one or more of the optical mask elements to align with a viewing window of a viewer.

9. The apparatus of claim 1,
wherein the addressable array of light-emitting elements comprises a first group of sets of light-emitting elements and a second group of sets of light-emitting elements,
wherein the sets of light-emitting elements of the first group are each located less than a threshold distance away from a center of the apparatus and are arranged with an equal separation between each other, and
wherein the sets of light-emitting elements of the second group are each located more than the threshold distance away from the center of the apparatus and are arranged with an unequal separation between each other based on how far each of the sets of light-emitting elements of the second group is located from the center of apparatus.

10. The apparatus of claim 1, wherein the one or more diffractive grating layers are passive, continuously-diffractive structures.

11. The apparatus of claim 1, wherein the array of optical mask elements is synchronized to the addressable array of light-emitting elements by:
transforming the 3D geometry and the visual information into control parameters; and activating, based on the control parameters, the light-emitting elements and the optical mask using spatial and temporal multiplexing to generate a 3D image of the 3D content.

12. A method for displaying a three-dimensional (3D) content comprising:
emitting a light beam from each light-emitting element of an addressable array of light-emitting elements to generate a plurality of light beams;
collimating each of the plurality of light beams to generate a plurality of collimated light beams;
diffracting each of the plurality of collimated light beams to generate a plurality of diffracted light beams propagating in different angular directions; and
synchronizing, based on 3D geometry and visual information representative of the 3D content, an optical mask to the addressable array of light-emitting elements to enable viewing beams, of the diffracted light beams, propagating in respective angular directions, wherein the viewed beams represent a voxel at a spatial location in the content displayed.

13. The method of claim 12, wherein synchronizing the optical mask to the addressable array of light-emitting elements comprises selectively passing and blocking the diffracted light beams based on the content embodied in the diffracted light beams.

14. The method of claim 13, wherein selectively passing and blocking the diffracted light beams based on the content comprises:
spatially multiplexing control of the optical mask to selectively pass and block the diffracted light beams based on the content; and
temporally multiplexing control of the optical mask to selectively pass and block the diffracted light beams based on the content.

15. The method of claim 12, wherein synchronizing the optical mask to the addressable array of light-emitting elements comprises:
rendering a three-dimensional (3D) image by projecting 3D image data of the 3D content at different angular directions using sequential activation of the light-emitting elements and the optical mask according to the angular directions.

16. The method of claim 12, wherein synchronizing the optical mask to the addressable array of light-emitting elements comprises:
determining a location of a multidirectional display pixel (MDP) within the optical mask based on a selected light beam selected from the plurality of diffracted light beams and the content embodied in the plurality of diffracted light beams; and
rendering the optical mask,
wherein the selected light beam selected from the plurality of diffracted light beams passes through the optical mask, and
wherein rendering the optical mask synchronizes the optical mask with the content embodied in the plurality of diffracted light beams.

17. The method of claim 12, wherein synchronizing the optical mask to the addressable array of light-emitting elements enables more than one diffracted light beam, of the plurality of diffracted light beams, per pixel of the optical mask to pass through the optical mask.

18. The method of claim 12, further comprising adjusting emission direction angles of the optical mask.

19. The method of claim 18, wherein adjusting the emission direction angles of the optical mask adjusts the emission direction angles of the optical mask to align with a viewing window of a viewer.

20. The method of claim 12, further comprising:
tracking eye positions of a viewer,
wherein synchronizing the optical mask to the addressable array of light-emitting elements comprises:
selecting a portion of the addressable array of light-emitting elements based on the eye positions of the viewer; and
synchronizing the optical mask to the selected portion of the addressable array of light-emitting elements.

21. The method of claim 12, further comprising adjusting a brightness of the plurality of light beams by pulse width modulating the light beam emitted from each light-emitting element of the addressable array of light-emitting elements.

22. The method of claim 12, wherein synchronizing of the optical mask to the addressable array of light-emitting elements comprises:
transforming the 3D geometry and the visual information into control parameters; and
activating, based on the control parameters, the light-emitting elements and the optical mask using spatial and temporal multiplexing to generate a 3D image of the 3D content.

\* \* \* \* \*